(12) United States Patent
Fuse

(10) Patent No.: US 6,324,015 B1
(45) Date of Patent: Nov. 27, 2001

(54) Fθ LENS

(75) Inventor: Keiji Fuse, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/630,019

(22) Filed: Jul. 31, 2000

(30) Foreign Application Priority Data

Aug. 10, 1999 (JP) .................................. 11-226430

(51) Int. Cl.$^7$ .............................. G02B 9/00; G02B 26/08
(52) U.S. Cl. ........................................ 359/662; 359/206
(58) Field of Search ..................... 359/206, 666

(56) References Cited

U.S. PATENT DOCUMENTS

| | | |
|---|---|---|
| 5,404,247 | 4/1995 | Cobb et al. . |
| 6,201,561 * | 3/2001 | Ichikawa .............. 359/662 |

FOREIGN PATENT DOCUMENTS

| | | |
|---|---|---|
| 58-17408 | 2/1983 | (JP) . |
| 58-88716 | 5/1983 | (JP) . |
| 61-30243 | 2/1986 | (JP) . |
| 4-93910 | 3/1992 | (JP) . |
| 6-79103 | 10/1994 | (JP) . |
| 2558255 | 9/1996 | (JP) . |
| 2576095 | 11/1996 | (JP) . |

* cited by examiner

Primary Examiner—Scott J. Sugarman
(74) Attorney, Agent, or Firm—McDermott, Will & Emery

(57) ABSTRACT

An fθ lens containing a first lens group having an object-side convex positive lens, a second lens group having an object-side concave negative lens, a third lens group having a positive refractive power, the third lens group being a single positive lens, an assembly of a positive lens and a negative lens or another assembly of a positive lens and another positive lens. The lens components satisfy the conditions (a) to (c);

(a) $-2.2 \leq f_2/f \leq -0.3$ (31)

(b) $0.4 \leq f_3/f \leq 0.9$ (32)

(c) $1.8 \leq d/f \leq 2.4$. (33)

where $f_2$ is the focal length of the second lens group, $f_3$ is the focal length of the third lens group, f is the focal length of the whole lens system and d is the distance from the front focus to the image plane. The material of the lens is zinc selenide (ZnSe) or germanium (Ge). Adoption of an aspherical lens facilitates the design of the fθ lens.

7 Claims, 24 Drawing Sheets

Embodiment 1

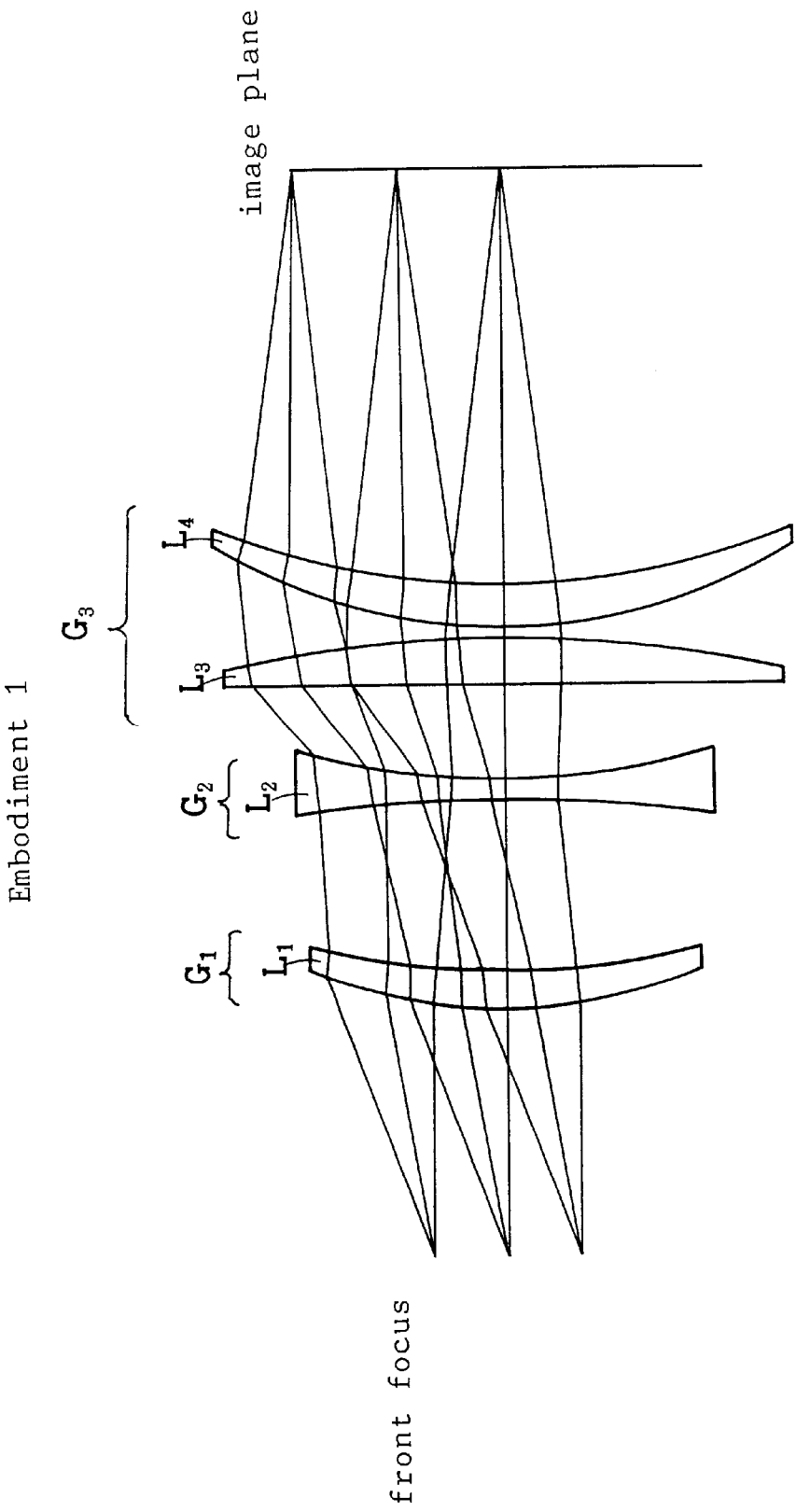

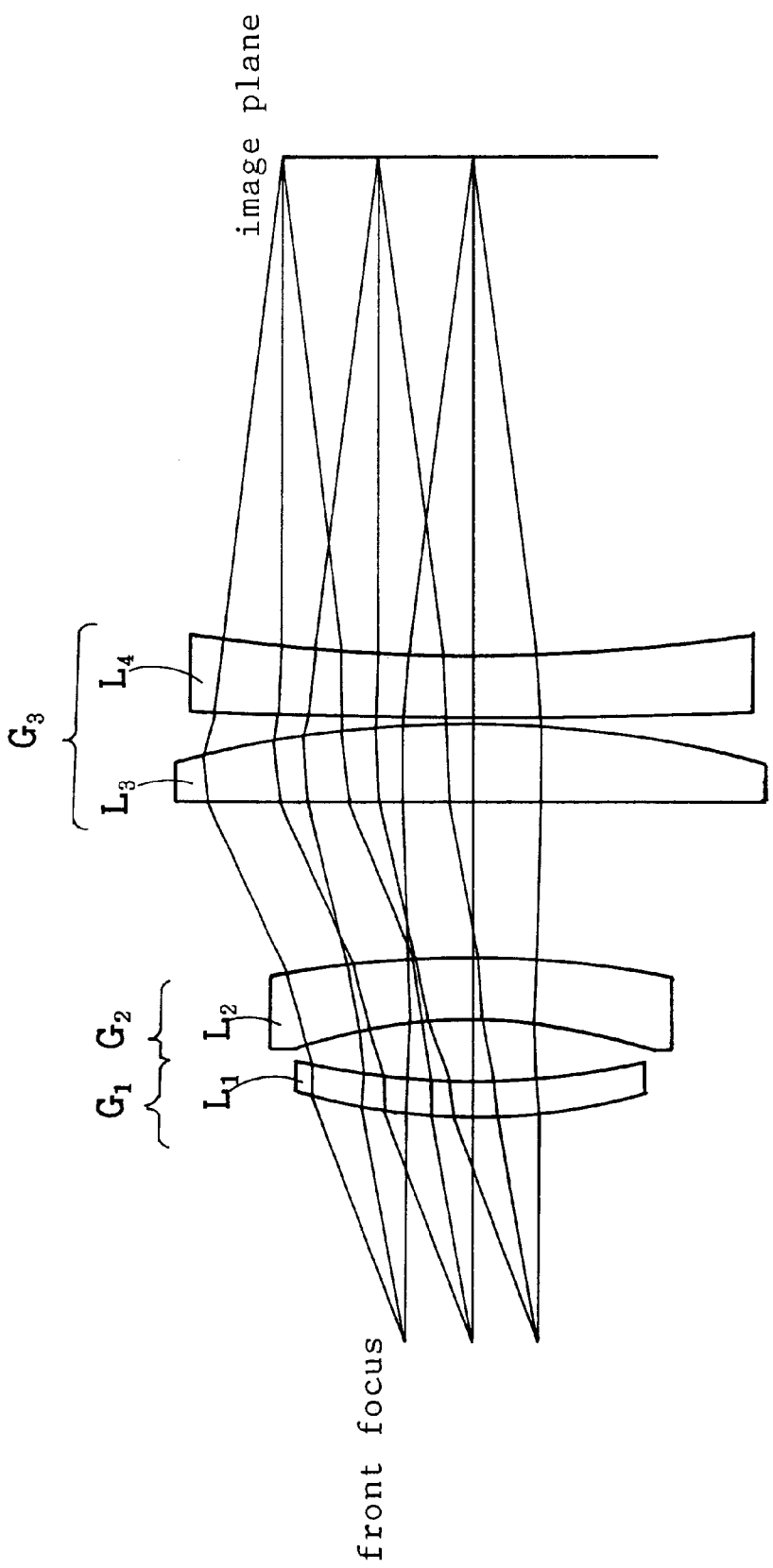

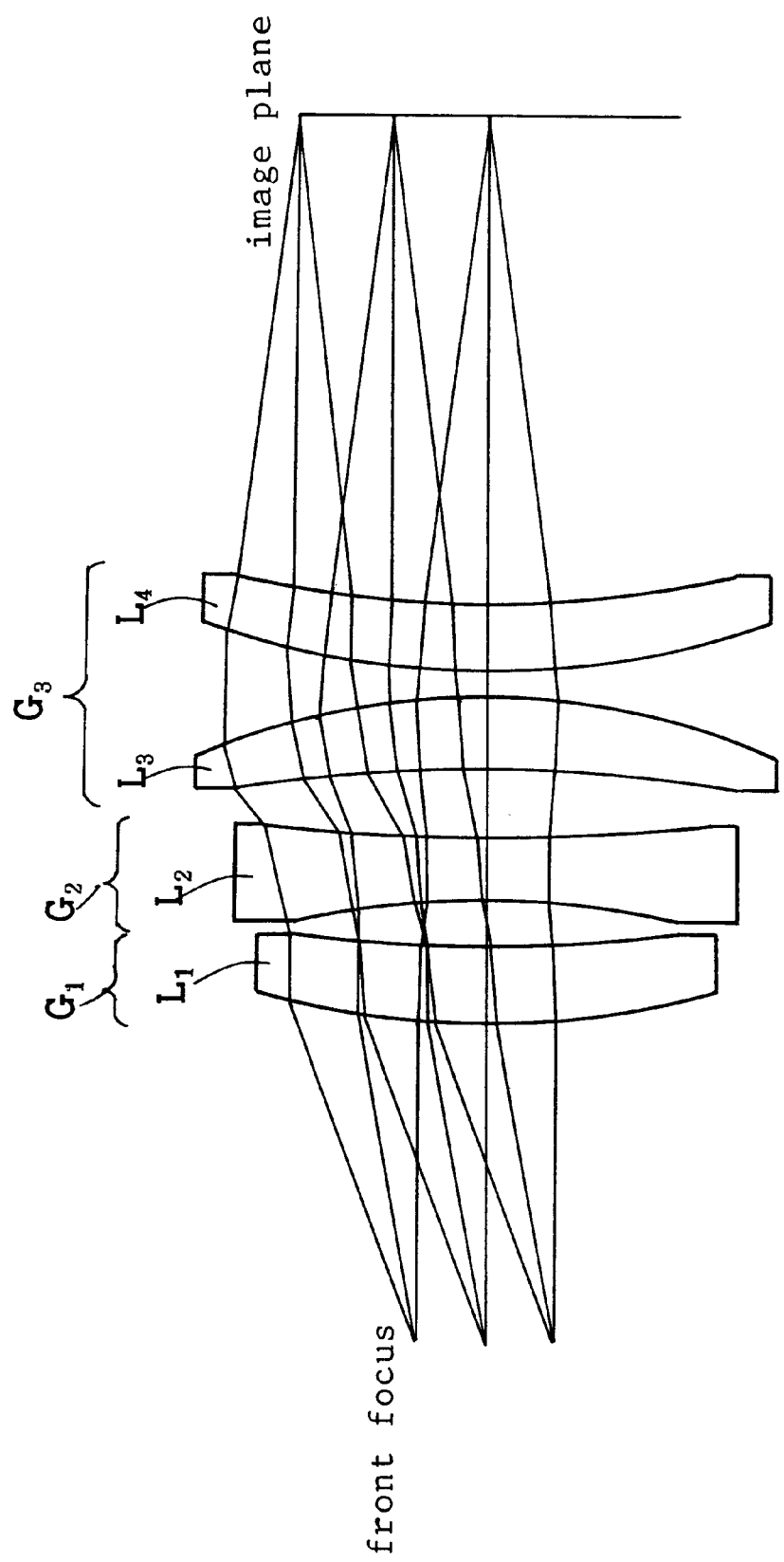

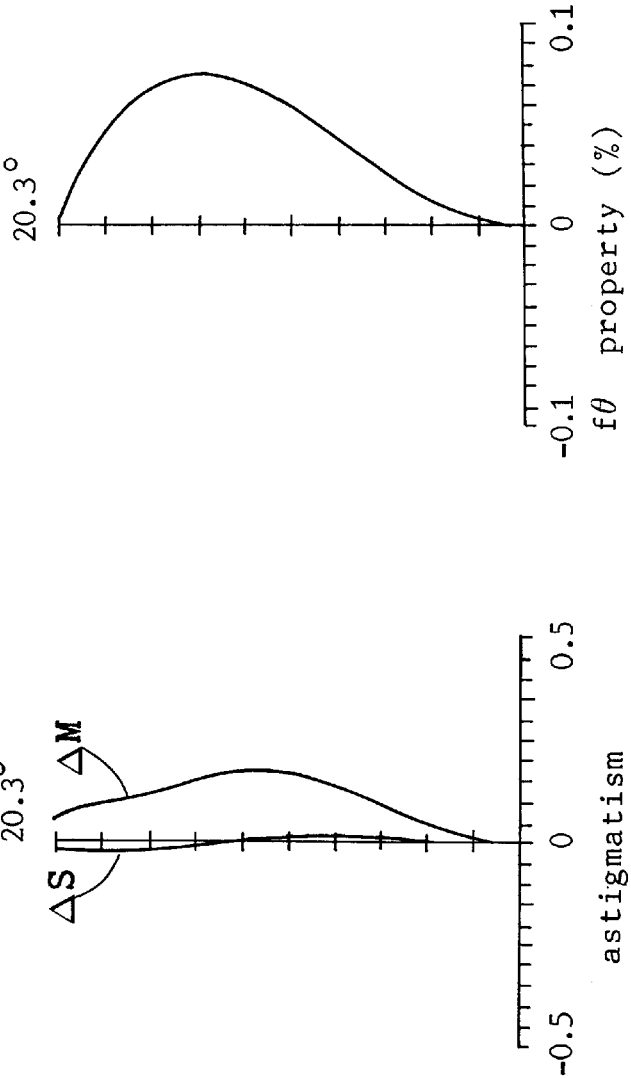
Fig.10
Fig.11
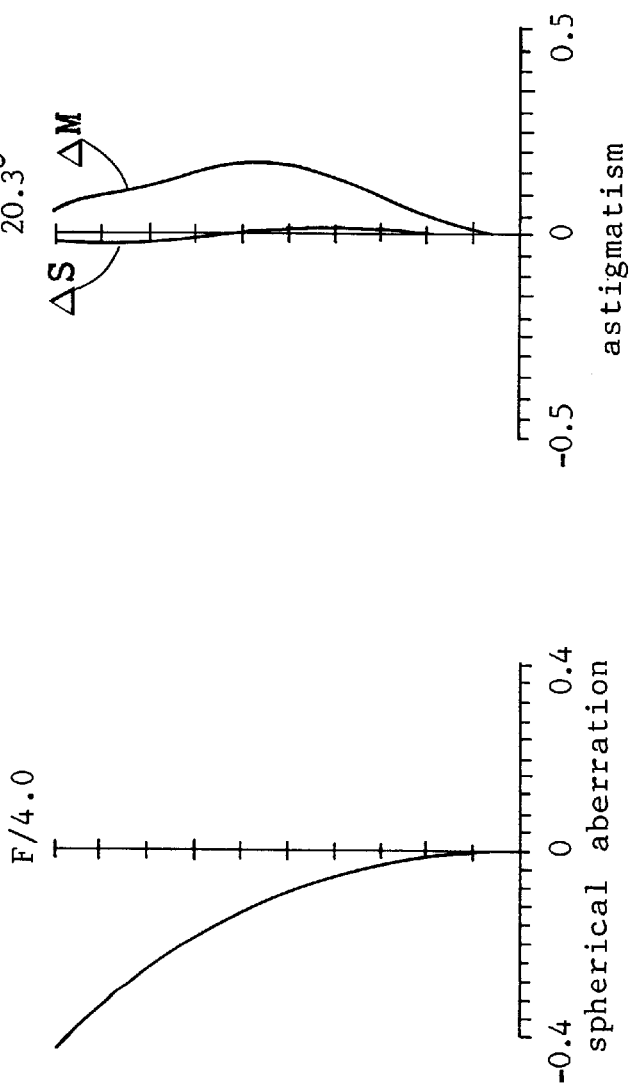
Fig.12

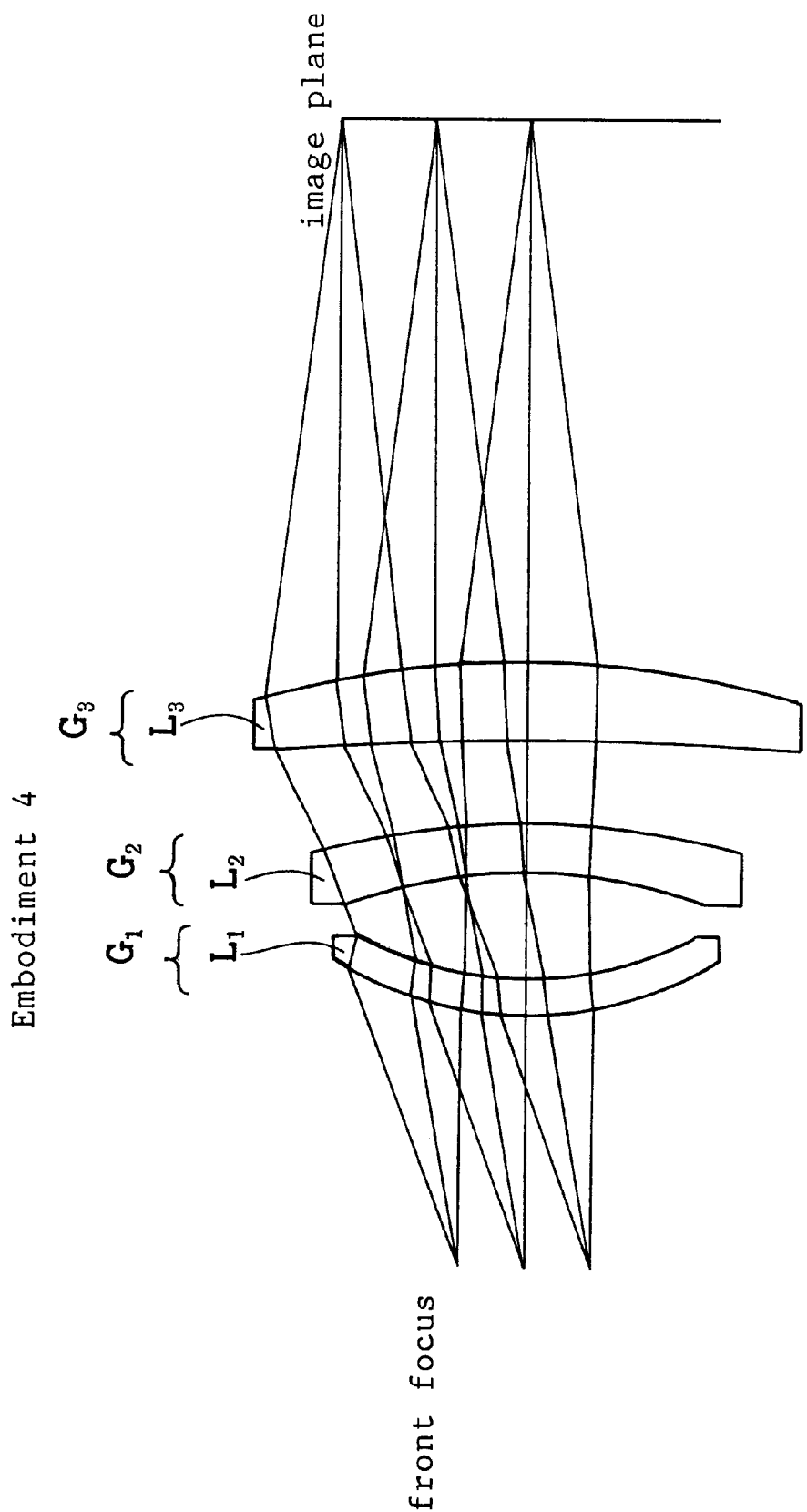

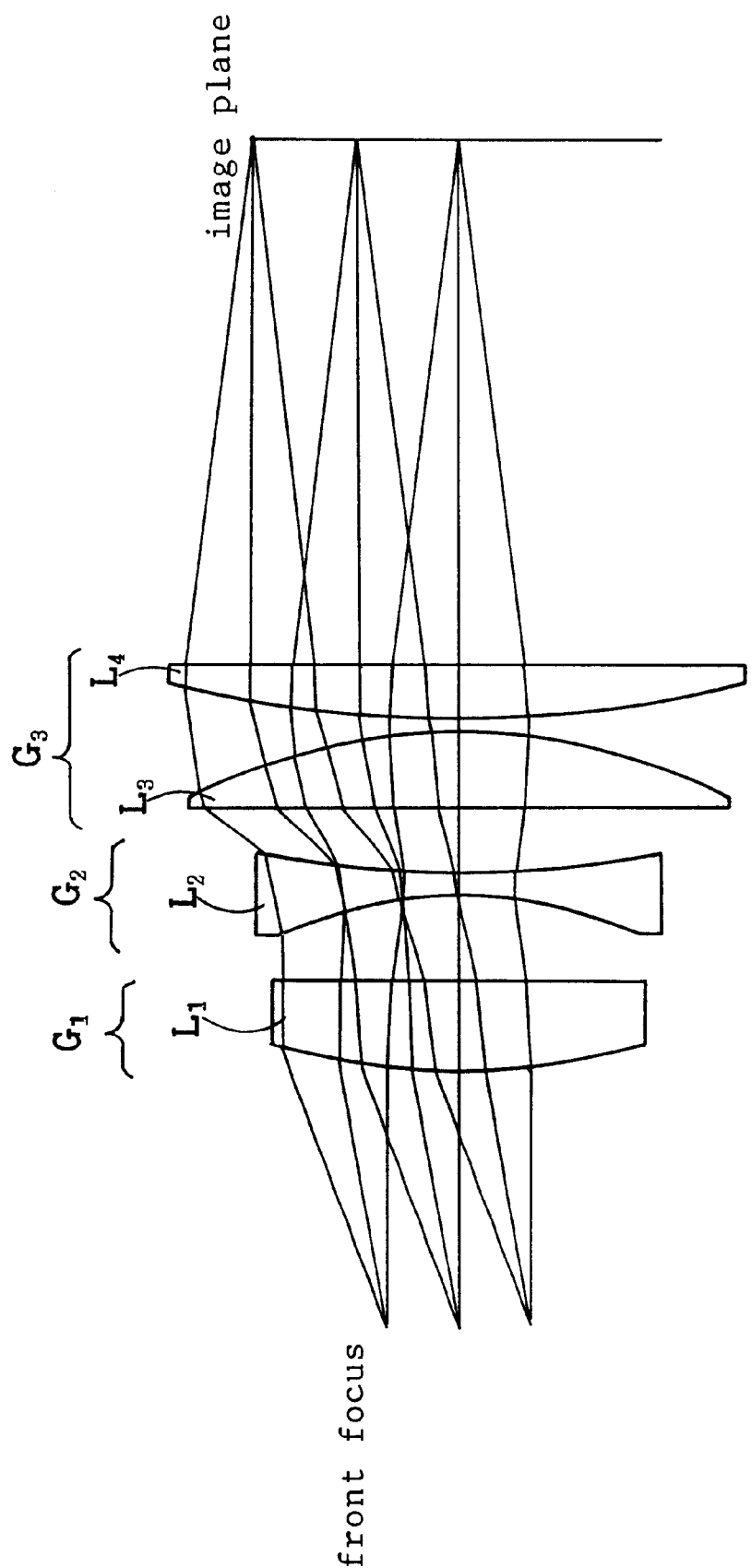

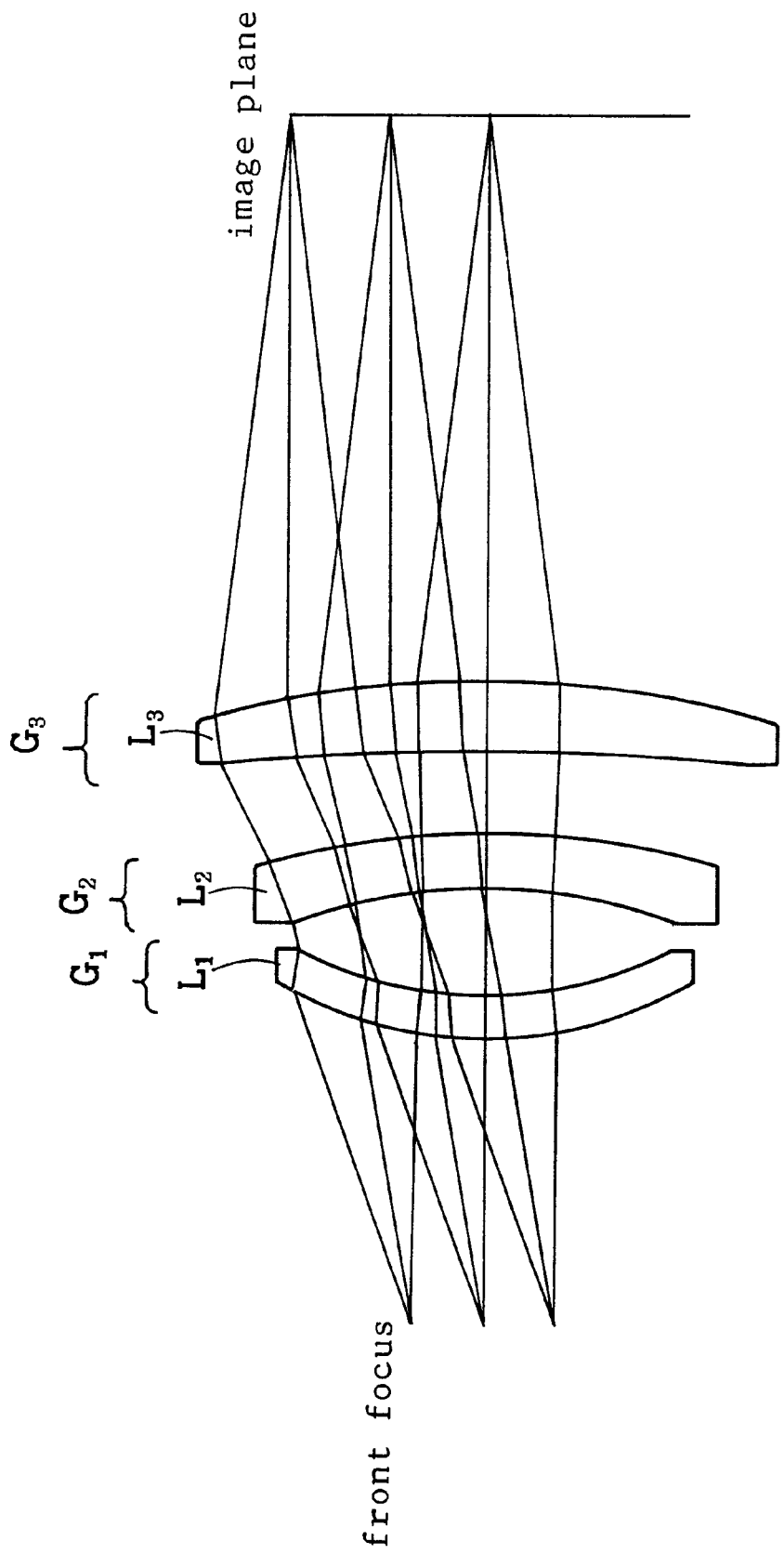

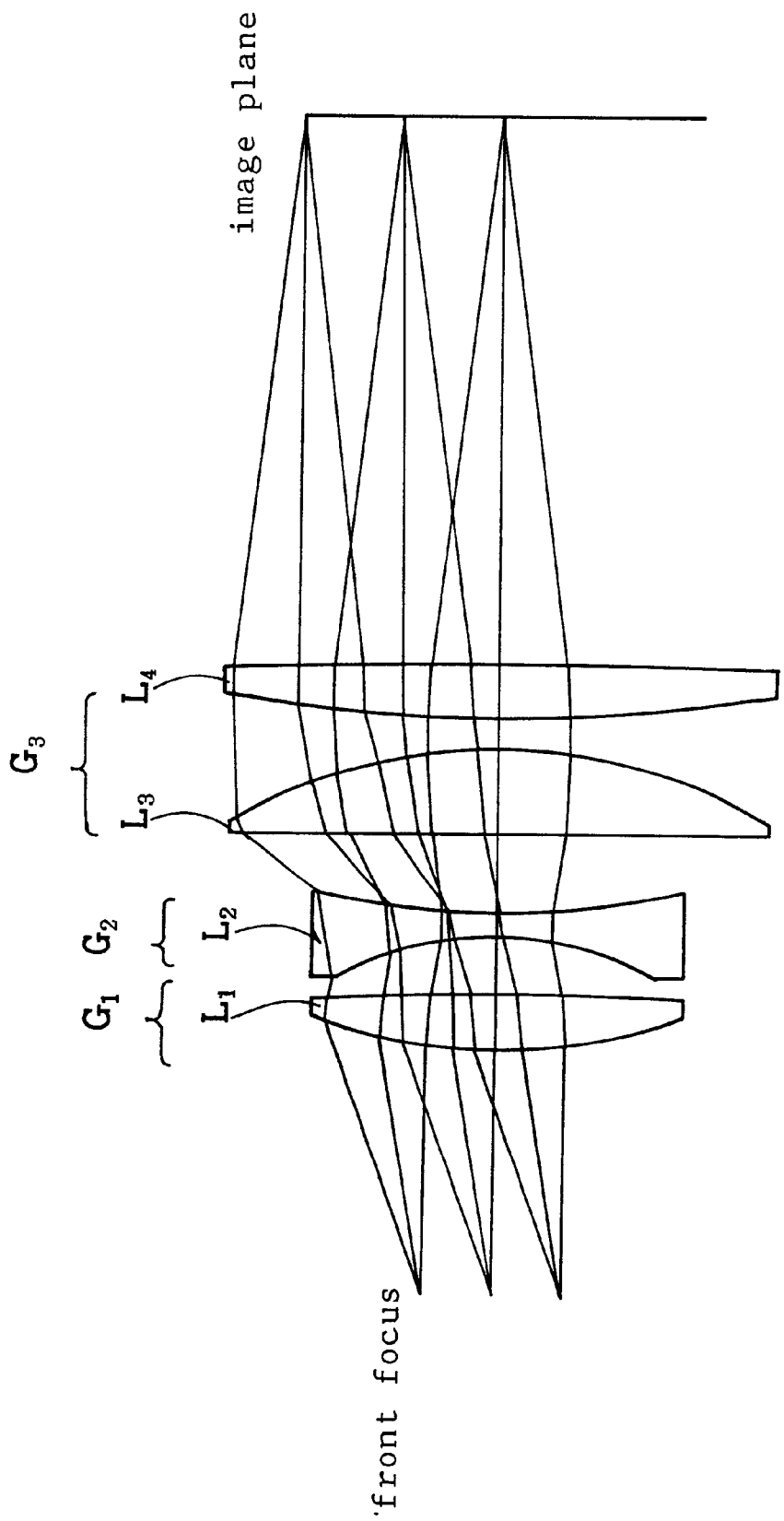

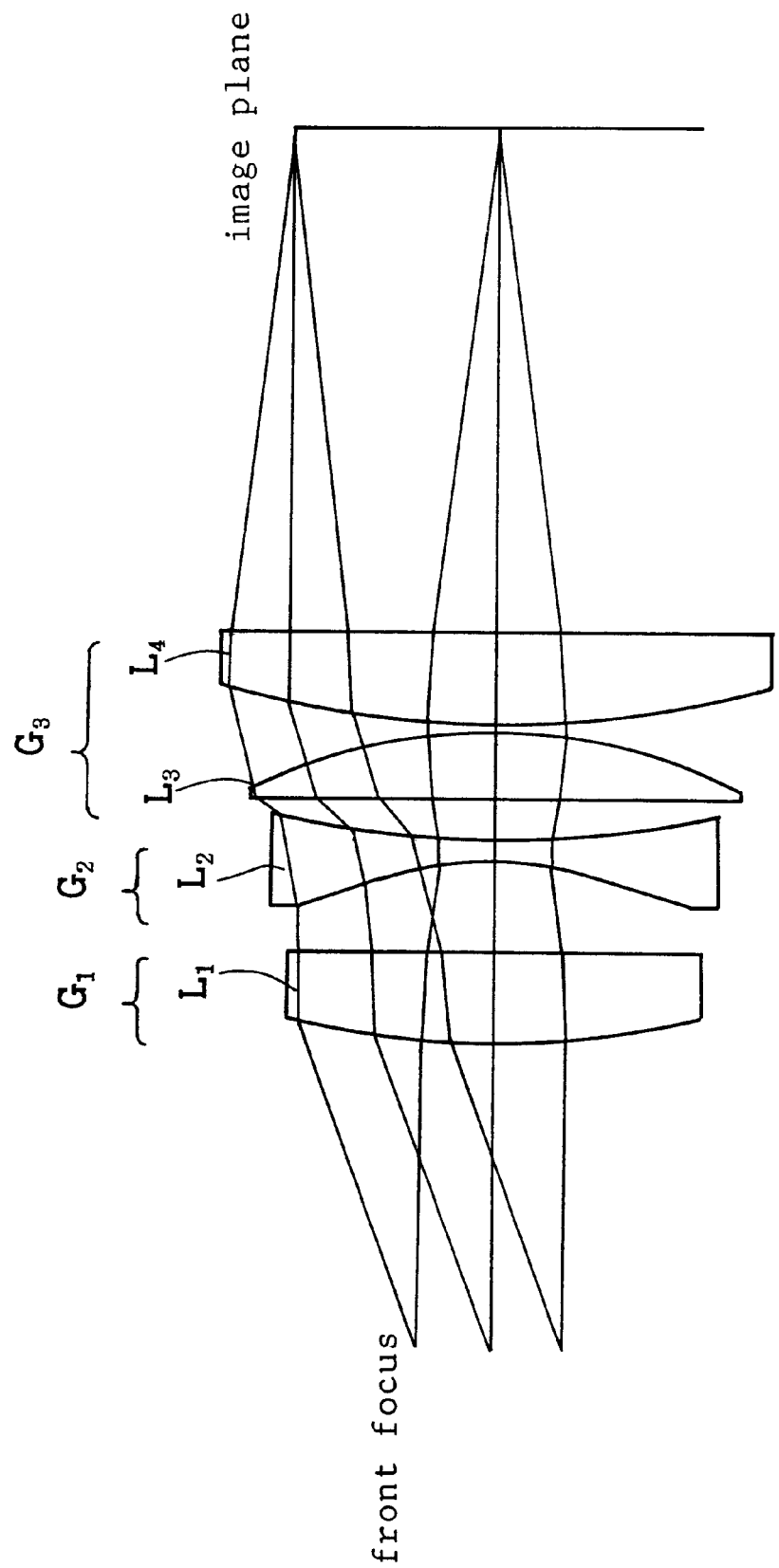

Comparison Example D

Comparison Example E

Comparison Example F

Fθ LENS

BACKGROUND OF THE INVENTION

1. Field of the Invention

The present invention relates to an fθ lens for converging scanned $CO_2$ laser beams, irradiating the beams on a printed circuit board and perforating a great number of holes at an ultrahigh speed on the print circuit board by the laser power. The idea of an fθ lens itself is not novel. The fθ lens means a lens which gives a linear relation h=fθ between an incident angle θ of the beam and the height h of an image. The proportion constant f is the focal length. But an fθ lens for $CO_2$ laser is a novel concept. Nobody has been aware of the necessity of fθ lens for $CO_2$ laser before this invention. Someone uses the word "laser drilling" for denoting the laser boring technology. In this description, however, we will use "perforation" or "boring" for signifying the laser boring technology for avoiding confusion from the mechanical drilling.

This application claims the priority of Japanese Patent Application No.11-226430(226430/1999) filed on Aug. 10, 1999, which is incorporated herein by reference.

Conventional fθ lenses have contributed to laser printers and laser COM systems (computer output microfilm systems). In the laser printers and laser COMs, a laser beam is deflected by a rotating polygon mirror and converged at a point h=fθ on a rotating drum by an fθ lens. Printer fθ lenses have experienced some improvements till now. The fθ lens proposed by the present invention is greatly different from the conventional printer fθ lens. The light source is a semiconductor laser of e.g., AlGaAs having low power. The light for printers is near-infrared or visible light having a short wavelength. The shortness of the light wavelength allows glass lenses or quartz lenses. The printer fθ lens needs no telecentricity because the printer light aims at removing locally electric charges on the drum precoated by a photoconductive material. The printer fθ lens features a laser of low power, non-telecentricity and a short wavelength.

The fθ lens of the present invention contributes to laser materials processing apparatus having a $CO_2$ laser or a YAG laser. The $CO_2$ laser or the YAG laser has far greater power than the printer laser. The wavelength of the $CO_2$ laser is longer than that of the printer laser. The telecentricity is indispensable for perforating vertical holes by burning the board material through in the vertical direction by the laser beams. The differences between the printer fθ lens and the laser processing fθ lens will be clarified more in detail later. Nobody has tried to improve an fθ lens in the technical field of the laser processing, as long as the Inventor is aware of The laser processing needs no fθ lens, since the laser processing has never confronted such a difficult processing as requires an fθ lens. The present laser processing technology exploits lenses or mirrors for converging laser rays to a narrow beam. The lenses have been an ordinary f tan θ lens which makes a spot distanced from the center by h=f tan θ, where θ is an incident beam angle and f is a focal length. The relation h=f tan θ represents quite a normal function of an ordinary lens. The relation h=fθ is an extraordinary and artificial property for lenses. The following is the reasons why the Inventor thinks of the necessity of the fθ lens in the field of the laser processing technology.

Enhancement of functions and quality of electronic devices requires higher packing density and multilayer structures of printed circuit boards. High-speed, fine perforation technique accompanies the fabrication of printed circuit boards. The holes for mounting devices have been bored on printed circuit boards by mechanical apparatuses for a long time till now. The mechanical apparatus perforates holes by lowering a rotating sharp microdrill on a board, boring a hole, raising the microdrill away, displacing the microdrill in a unit length, lowering the drill at another neighboring spot on the board and repeating the same steps. The mechanical boring has a long achievement. The mechanical perforation, however, has weak points. One weak point is the slow perforation speed, since the microdrill must move in vertical directions and in horizontal directions in a cycle of boring. Another drawback is the point-to-point drilling, since only a single hole is bored at a time by the single microdrill. The other weak point is the limitation of hole size. The requirement of the mechanical strength forbids microdrill from having a diameter less than a definite size. Then, the mechanical boring fails in perforating holes of a diameter smaller than 100 $\mu$m.

Attention is paid to laser boring technique for perforating microholes of a diameter less than 100 $\mu$m in stead of the mechanical apparatuses. The laser boring processing makes holes by burning the material locally by intense laser power.

The laser perforation bores holes on a print circuit board by scanning a short pulse laser beam of a high repetition rate in two dimensional directions by an X-galvanomirror and a Y-galvanomirror at a high speed, converging the scanned bear on the print board by an fθ lens, burning small regions vertically by the high power density and forming holes. Since light has neither mass nor inertia, the scanning rate of light beam is high enough. The galvanomirrors have some weights which would limit the scanning rate. The weight of the galvanomirror, however, can be alleviated. The laser perforation processing has a strong point of high perforation speed. Another advantage is the ability of boring a tiny hole of an under 100 $\mu$m diameter.

Object materials are epoxy resins, polyimides and other resins which can make circuit boards. The lasers for optical perforation are mainly $CO_2$ lasers. The light of a wavelength of 10.6 $\mu$m is adopted as usual. But another wavelength, e.g., 9 $\mu$m is sometimes used for enhancing boring performance for some materials. In the case of a YAG laser, a wavelength of 1.06 $\mu$m will be adopted. But this description will explain the case of the $CO_2$ laser light source of 9 $\mu$m to 10.6 $\mu$m of wavelength. The fθ lens for perforating holes on printed circuit boards is entirely different from the ordinary f tan θ lens which has been used in the laser processing, i.e., welding, cutting or annealing. The fθ lens is an extraordinary lens. This invention tries to propose a new fθ lens for the printed circuit board perforation.

Description of Related Art

This invention intends to suggest a novel fθ lens of the laser processing for boring holes on boards. The laser processing fθ lens has two different backgrounds. One is the background of the fθ lens. The other is the background of the laser processing. The two backgrounds should be explained for clarifying the importance and the novelty of the present invention.

The laser processing is a technique for cutting, welding or annealing of metals, ceramics, plastics or so by the heat generated by the converged high power beam shooting at the object. $CO_2$ lasers are the most prevalent lasers for the laser processing apparatuses. The high light power (up to several tens of kilowatt) ensures the application of $CO_2$ lasers to the cutting and the welding. The laser processing requires a plenty of optical parts, e.g., mirrors, lenses and so forth for guiding, reflecting or refracting $CO_2$ laser beams. The light of $CO_2$ lasers is infrared light having a wavelength longer than visible light or near-infrared light. The difference of wavelength requires different material for optical parts. Quartz or glass are useless because it is opaque for the $CO_2$ laser light. Zinc selenide (ZnSe) lenses are suitable for converging devices for the high power $CO_2$ laser up to several kilowatts of output power. Zinc selenide (ZnSe) is a material having high transparency and low absorption for the infrared light of the $CO_2$ laser wavelength region.

Gallium arsenide (GaAs) and germanium (Ge) are also infrared optical material. Both GaAs and Ge are transparent for the 10.6μm light and eligible for the material of refractive optical parts. The materials, however, have strong points and weak points for the optical devices of $CO_2$ lasers. Ge has a very high refractive index n=4 for $CO_2$ laser light. The high refractive index gives high freedom of designing Ge lenses. Diamond tools can easily cut Ge and can make aspherical Ge lenses mechanically. Ge is a good material for $CO_2$ laser light. But Ge has still a weak point. The bandgap of Ge is narrow. The narrow band gap allows Ge to maintain a plenty of free carriers. The free carriers can absorb photons (light quanta). When the Ge lens is heated, the extra many free carriers raise the absorption of the $CO_2$ laser light. The absorption enhances the temperature of the Ge lens and the energy loss of the laser power.

Having a lower refractive index n=2.4, zinc selenide (ZnSe) has a wide bandgap which prohibits heating from making free carriers. Poor free carriers can hardly absorb $CO_2$ laser power even when the ZnSe part is heated. ZnSe allows mechanical tools to shape aspherical surfaces. GaAs has a high refractive index of n=3.3. GaAs wafers and ingots are marketable materials. GaAs is one of the most popular semiconductor materials. GaAs has a drawback of poor processibility. Mechanical tools cannot cut GaAs and shape out an aspherical lens of GaAs. But spherical lenses can be made only by polishing.

Thus, GaAs should be shaped into an ordinary spherical lens. The non-existence of a GaAs aspherical lens lowers the freedom of the design of optical parts made of GaAs. If the optical parts were to be an assemble only of spherical lenses, the 10.6 μm optical parts could be made of GaAs. When the optical parts require aspherical lenses, the material is restricted to ZnSe and Ge. The infrared materials have higher refractive index to the infrared light than the visible light lens materials. The high refractive index characterizes the properties of the $CO_2$ laser optical devices.

Although ZnSe has low absorption for infrared light, a lens, refractive optical part, is unoperative for strong $CO_2$ lasers having power more than 5 kilowatts (kW). For the over 5kW high power laser, reflective type of optical parts (mirrors) is employed for guiding and converging beams. An example of a converging part is an off-axis parabolic mirror. Since the reflective type part absorbs little of the laser light, almost all of the light does not penetrate into the material. The poor absorption protects the optical parts from the thermal damage. The object is an improvement of not a mirror but a lens. The application to mirrors is not mentioned any further.

All the lenses which have been used in the laser processing are ordinary, simple converging f tan θ lenses. The commonplace f tan θ lens makes a spot at a height of h=f tan θ on an image plane for the incident inclination angle θ. The laser processing has taken only the ordinary f tan θ lenses for converging the strong $CO_2$ laser beams to the objects. The laser processing has not been aware of the need of an fθ lens.

There is nothing to cite as prior art of the fθ lens in the laser processing techniques.

The fθ lens has achievements in the laser printer technology. The printer reflects a near-infrared (800 nm–900 nm) light beam of an AlGaAs laser diode by a rotating polygon mirror and shoots a rotating drum coated with a photoconductive material and charged with electrons with the reflected beam. The polygon mirror has regular polygon surfaces for deflecting the laser beam in one dimension. The polygon mirror rotates at a constant angular velocity. For maintaining the scanning speed at a constant speed, the spot position h on the drum should be in proportion to the incident angle θ at the polygon mirror (h=fθ). The constant scanning speed on the drum requires the fθ property for the converging lens of the laser printer.

Laser printer lenses and laser processing lenses are quite different in the light wavelength, the function and the light power. The prior printer fθ lenses are entirely different from the laser processing fθ lenses. The printer light source is a tiny AlGaAs semiconductor laser diode. The light is near-infrared (0.8 μm–0.9 μm). The object of irradiating is to reduce the resistivity of the photoconductive material on the drum surface for eliminating the charge from the spots locally. The light power is weak. The fast rotating polygon mirror scans the laser beam in the horizontal direction. The lens material is quartz, glass or plastics which are transparent for visible or near-infrared light. The visible, near infrared materials have low refractive indexes. For example, quartz has a low refractive index n=1.4. Various kinds of glass have low indexes n=1.5–1.8.

The power of bending a beam is proportional to a product of the refractive index and the curvature. A lower refractive index material must bear a higher curvature for accomplishing similar refraction. Aberrations accompany the curvature of a lens. The higher the curvature rises, the stronger the aberration increases. Low refractive index is unfavorable for reducing aberrations. Refractive index is a significant parameter of designing a lens. The fθ lenses having far different refractive indexes are different kinds of lenses. There is no prior art of the laser processing fθ lens. The following are prior art of the fθ lenses of printers and laser COM systems.

① Japanese Patent Laying Open No.58-88716, "High resolution constant speed scanning lens", Inventors; Sadatoshi Takahashi, Masamichi Tateoka, Applicant; Canon Corporation, proposed an fθ lens for an image read-in device making use of a helium-neon (He—Ne) laser as a light source (632.8 nm). ① has a special purpose to give a wide distance between a deflecting scanner and a lens. The refractive index is n=1.6 to 1.8. The fθ lens is made of a glass of a low refractive index. The fθ lens is an assembly of four groups of lenses. Each group has a single lens or plural lenses. The groups are defined as follows; the first group= positive lenses having a convex surface to the object side the second group=negative meniscus lenses having a concave surface to the object side the third group=more than two positive lenses the fourth group=negative lenses having a concave surface to the object side.

A "positive" lens signifies such a lens having the function of converging beams (positive focal length and refraction power). A "negative" lens means such a lens having the operation of diverging beams (negative focal length and refraction power). A meniscus lens denotes a lens having a convex surface and a concave surface. A meniscus lens can either be a positive lens or a negative lens. A lens has two surfaces. The front surface facing to the object is called a "first surface". The rear surface facing to the image is called a "second surface". The "front focus" is a front point converging rays which have entered parallely in the rear, second surface and gone from the front surface. The "rear focus" is a rear point converging rays which have entered parallely in the first, front surface and gone out of the rear surface. Since each group has at least one lens and the third group has at least two lenses, the fθ lens of ① has at least five lenses. The first purpose is to prolong the distance between the front focus and the first surface of the first lens. The normalized distance $d_0/f$ between the front focus and the first surface of the first lens is $d_0/f=0.82–0.91$. The long $d_0$ accomplished the purpose of enlarging the distance between the lens and the scanner. The enlargement has been done at the expense of another distance $d_{10}$ between the last lens and the image plane. The final normalized distance is only $d_{10}/f=0.22–0.26$.

② Japanese Patent Laying Open No.58-17408, "Constant speed scanning lens", Inventor; Yuko Kobayashi, Applicant; Olympus Kogaku Kogyo Corporation, proposed another fθ lens having six lenses. The lens is made from a glass of a refractive index n=1.66. The light source is a helium-neon laser of 632.8 nm. The first lens=positive lens. The second lens=negative lens. The third lens=negative meniscus lens having a concave surface to the object side. The fourth lens=positive meniscus lens having a concave surface to the object side. The fifth lens=positive lens. The sixth lens=positive lens.

The focal length is "f". The curvature radius of the first surface of the third lens is "$r_5$". The curvature radius of the first surface of the fifth lens is "$r_9$". S is the distance along the axis between the first surface of the third lens and the second surface of the fourth lens. ② defines the fθ lens by the following conditions;

$$-0.3f<r_5<-0.26f \qquad (1)$$

$$15.6f \leq |r_9| \qquad (2)$$

$$0.27f<S<0.31f \qquad (3)$$

Individual values for the lengths are insignificant for defining an fθ lens. The lengths are normally denoted by the values normalized by the focal length f. Lenses are numbered as $L_1$, $L_2$, ... from the lens closest to the object. Surfaces of the lenses are also numbered as $S_1$, $S_2$, ... from the objective surface of the first lens. Thicknesses of the lenses and lens-lens spatial distances are numbered $d_1$, $d_2$, ... without discriminating the lens thickness and the lens-lens spatial distance. The fθ lens allows the first lens and the second lens to produce positive refraction. Strong spherical aberration accompanies the positive refraction. The third lens has the function of canceling the negative spherical aberration. The cancellation requires the restriction of (1) $-0.3f<r_5<-0.26f$. Too large S causes excess image curvature. Too small S invites large distortion aberration. Thus, (3) determines an optimum S.

③ Japanese Patent Laying Open No.4-93910, "Telecentric fθ lens", (Inventor; Katsuaki Ono, Applicant; Ricoh Kogaku Corporation) suggested another fθ lens consisting of four groups of lenses. The lenses are made of a glass of a refractive index n=1.5–1.8. The second group is negative meniscus lenses having a concave surface to the object side. The third group is positive meniscus lenses having a concave surface to the object side. The fourth group is positive lenses having a convex surface to the image side.

The focal length of the whole system is denoted by f. The focal length of the third group is denoted by $f_3$. $R_3$ and $R_4$ are curvature radii of the first surface and the second surface of the second group lens. $D_4$ is the spatial distance along the axis between the second group and the third group. The refractive index of the third group lenses is denoted by $n_3$. ③ defines the invention by the following restrictions, $$0.4<f/f_3<0.95 \qquad (4)$$

$$-0.3<R_3/f<-0.2 \qquad (5)$$

$$-0.4<R_4/f<-0.3 \qquad (6)$$

$$0<D_4/f<0.06 \qquad (7)$$

$$1.6<n_3.$$

The first group lenses have some candidates. One candidate is a negative meniscus lens having a convex surface to the object side. Another candidate is a couple of a positive lens having a convex surface to the object side and a negative lens having a concave surface to the image side. The negative lens is in contact with the positive lens. Further candidate is a couple of a positive lens having a convex surface to the object side and a negative lens having a concave surface to the image side. The negative lens is separated from the positive lens toward the image side. The inventor asserted that the desirable refractive index is more than 1.6. But there is no material of a refractive index higher than 1.8 for the wavelength. The upper limit is only 1.8 (1.6<n<1.8) in this case.

④ Japanese Patent Publication No.6-79103, "Telecentric lens", (Inventor; Hiroyuki Shirota, Applicant; Dainippon Screen Manufacturing Corporaticn) proposed an fθ lens for a beam scanning apparatus of a laser printer. The fθ lens consists of five lenses. The light source is a He—Ne laser (632.8 nm) and an Ar laser (488 nm). The lenses are made of a glass of a refractive index of n=1.5–1.8.

The first lens=a positive meniscus lens, concave to the object side.

The second lens=a negative lens, concave to the object side.

The third lens=a positive meniscus lens, concave to the object side.

The fourth lens=a positive meniscus lens, concave to the object side.

The fifth lens=a positive lens having a flat first surface.

The fθ lens satisfies the following conditions;

$$-0.65<r_1/f<-0.25 \qquad (8)$$

$$0.4<d_8/f<1.16 \qquad (9)$$

$$1.61<f_5/f<3.5. \qquad (10)$$

Here $r_1$ is the curvature radius of the front surface of the first lens $L_1$, $d_8$ is the distance between the rear surface of the fourth lens and the front surface of the fifth lens, $f_5$ is the focal length of the fifth lens and f is the focal length of the whole system.

⑤ Japanese Patent Laying Open No.61-30243, "fθ lens", (Inventor; Mahito Shibuya, Applicant; Nihonkogaku Kogyo Corporation) proposed an fθ lens for converging beams scanned by a polygon mirror in a laser printer or a facsimile. The fθ lens has four groups of lenses. The first group has a negative lens and a positive lens which have in total negative refractive power. The second group is a meniscus lens with a convex surface to the object side. The third group is a meniscus lens with a convex surface to the image side. The fourth group consists of three lenses, i.e., a positive lens, a negative lens and a positive lens which have in total positive refractive power. The fθ lens consists of seven lenses in total. The curvature radius of the front surface of the second lens is $r_5$. The curvature radius of the image side surface of the second group lens is $r_6$. The curvature radius of the object side surface of the third group lens is $r_8$. The thickness of the third group is $d_7$. The distance between the third group and the entrance pupil imaged by the first group and the second group is denoted by "1". The fθ lens should satisfy the following inequalities;

$$|r_8|>|r_7| \quad (11)$$

$$1>|r_7| \quad (12)$$

$$1.0 \leq (|r_7|+d_7)/|r_8|<1.2 \quad (13)$$

$$0.8<r_6/r_5<1.1 \quad (14)$$

The lenses are made of quartz or glass. The refractive index n is enough low (n=1.4–1.77). The light sources are a He—Ne laser (632.8 nm) and a YAG laser (1064 nm). The lenses are achromatic for both the 632.8 nm light and the 1064 nm light. The fθ lenses are designed for visible light. The fourth group containing three lenses with strong positive refractive power generates negative distortion (aberration) for making the fθ property. The negative distortion invites image curvature. The image curvature should be compensated by the third group. The third group is concave to the object side for enlarging the beams. The lens of the third group is concentric for amending the image curvature. The radius $r_7$ is concave ($r_7<0$) and the radius $r_8$ is convex ($r_8>0$). Inequality (11) signifies insufficiently the concentricity of the group third lens.

Inequality (13) is settled for defining the concentricity of the group third lens. The thickness of the third group lens is $d_7$. If the sum of the inner radius $r_7$ and the thickness $d_7$ were equal to the outer radius $r_8$ ($(|r_7|+d_7)=r_8$; $r_7$ negative, $r_8$ positive), the lens would be completely concentric. Inequality (13) allows deviation of 20% toward the convex tendency from the complete concentricity.

The fourth group lens incurs inner coma (aberration). The third group lens tries to cancel the inner coma by yielding outer coma. The distance between the entrance pupil imaged by the first and the second lenses and the third group iens is denoted by "1". The desired outer coma is generated by giving the $r_7$ of the third group lens a value narrower than the distance 1. The condition is given by Inequality (12). The fourth group lenses make negative distortion which should be compensated by the second group lens. The second lens should be a meniscus lens being convex to the object side with little refraction power. A meniscus lens means a lens having a convex surface and a concave surface. The front surface $r_5$ of the second lens is positive and the rear surface $r_6$ is negative. No refraction power means $r_5=|r_6|$.

Inequality (14) signifies the weak refractive power of the second meniscus lens, having narrow margins of 0.8 to 1.0 and 1.0 to 1.1.

⑥ Japanese Patent No.2558255, "Telecentric fθ lens" (Inventor; Akiyoshi Hamada, Applicant; Minolta Corporation) proposes an fθ lens for a COM system which scans a laser beam by a rotating polygon mirror. The fθ lens of a printer has a long focal length between 200 mm and 400 mm. The fθ lens of a laser COM has a short focal length of about 50 mm. The fθ lens has five groups of lenses. The first group is at least one negative lens. The second group is one or two positive lenses. The third group is at least one positive lens. The fourth group is at least three lenses. The fifth group is an anamorphic (cylindrical) lens having strong refractive power in the sagittal direction. The light source is a He—Ne laser emitting 632.8 nm light. The refractive index of the lenses is n=1.5 to 1.8. The material of the lenses is glass. The least number of the lenses should be seven, since the fourth of the five groups has at least three lenses. The fθ lens is explained by embodiments having eleven lenses, ten lenses, nine lenses and eight lenses. Requirements are denoted by inequalities;

$$0.4<-\beta_s<0.8 \quad (15)$$

$$0 \leq f_M/r_A<1 \quad (16)$$

$$0.6<f_M/r_B<1 \quad (17)$$

$$0 \leq -f_M/r_C<1 \quad (18)$$

$$0.4<f_M/d_D<0.6. \quad (19)$$

$\beta_s$ is a magnification in the sagittal direction of the whole lens system. The symbol $r_A$ is an image-side curvature radius of the first group negative lens. The symbol $r_B$ is an object-side curvature radius of the third group positive lens. The symbol $r_C$ is an object-side curvature radius of the fourth group negative lens in the meridional direction. The term $d_D$ is the length on the axis of the whole lens system. $f_M$ is the focus length of the whole system in the meridional direction. The use of the anamorphic lens of the fifth group raises the magnification in the sagittal direction larger than the magnification in the meridional direction.

An anamorphic surface can also be formed on the lenses of the third group or the fourth group. All the embodiments have a vanishing meridional magnification $\beta_M=0$, which corresponds to the use of the anamorphic lens as the fifth group. The use of the anamorphic lenses to the fifth, third or fourth group is coherent to the purpose of the one-dimensional laser beam scanning. The feature is briefly expressed by $\beta_M=0$. The lenses without rotational symmetry forbids the inventors from diverting the system to the wo dimensional scanning.

⑦ Japanese Patent No.2576095, "Telecentric fθ lens" (Inventor; Akiyoshi Hamada, Applicant; Minolta Corporation) suggests an fθ lens consisting of four groups of lenses for converging the beams scanned in one dimension by a polygon mirror for a laser COM system. The axial length of the whole fθ lens is denoted by $d_D$. The whole focal length is denoted by f. The problem is that the distance from the fθ lens to the polygon mirror is insufficient in prior fθ lenses, since the focal length f is nearly equal to the lens length $d_D$. This invention tried to propose an fθ lens having a small $f/d_D$ between 0.4 and 0.7. The first group contains at least one negative lens. The second group has one or two positive lenses. The third group is a positive lens convex to the object-side. The fourth group is three lenses: positive, negative, positive lenses or four lenses: positive, positive, negative, positive lenses. The minimum number of lenses is six. One embodiment has nine lenses. Four embodiments contain eight lenses. Seven embodiments are based upon seven lenses. Four embodiments have six lenses. The following inequalities are required;

$$0 \leq f/r_A<1 \quad (20)$$

$$0.6<f/r_B<1 \quad (21)$$

$$0 \leq -f/r_C<1 \quad (22)$$

$$0.4<f/d_D<0.7. \quad (23)$$

The number $r_A$ is an image-side curvature radius of the first group negative lens. The parameter $r_B$ is an object-side curvature radius of the third group lens. The radius $r_C$ is an object-side curvature radius of the fourth group negative lens. The axial length of the whole lens is denoted by $d_D$ and f is the focal length of the whole lens system. The condition (20) gives the system the fθ property by generating large distortion. The next condition (21) cancels the astigmatic aberration and the distortion yielded by (20). Inequality (22) means the condition for correcting the spherical aberration and the coma produced by other lenses. Inequality (23) shows the purpose of the invention for prolonging the distances between the lens and the image and between the lens and scanning device.

Many improvements of the fθ lens have been proposed. All the proposals have been directed to visible light or near-infrared light for laser printers or laser COMs. In the case of the laser printer, the fθ lens is provided at a spot following a polygon mirror for converging AlGaAs laser beams scanned by the polygon mirror. The embodiments have adopted He—Ne lasers (632.8 nm) or argon lasers (488 nm) as light sources instead of AlGaAs lasers, since gas lasers were more convenient for carrying out the experiments. The true light sources are AlGaAs lasers emitting visible or near-infrared light ranging from 600 nm to 900 nm. Lenses are made of various kinds of glass. There is no material having a high refractive index for the range of the wavelength. The lenses have all low refractive ndices between 1.5 and 1.8. Such a low refractive index less than two is a common feature of the prior visible light or near-infrared fθ lenses. The power of the light source is weak, that is, less than 1 mW. Weak power is another feature of the prior fθ lenses. Telecentricity is not required, since the printer fθ lens aims at scanning the laser beams for discharging locally the photoconductive rotating drum. The distance between the lens and the image is enough short for the prior printer fθ lenses.

This invention aims at perforating holes on a printed circuit board by laser beams at higher speed than by the conventional mechanical drills. For the purpose, this invention tries to scan the laser beams in two dimensions, converge the beams by an fθ lens and shoot the scanned beams at the printed circuit board. The scanned laser beams burn small spots vertically and bore narrow plumb holes on the printed circuit board. The holes should be small and vertical. The scanned laser beams should be converged. The order of the scanning and the convergence has two cases.

In one case, the scanning succeeds the convergence (convergence+scanning). It is called a post-objective scanning. In another case, the scanning precedes the convergence (scanning+convergence). It is called a pre-objective scanning. Simple laser processing, for example, cutting or welding, allows scanning to succeed convergence. In this case of scanning the converged beams, any set of lenses or mirrors cannot maintain the beam to be perpendicular to the surface of the work piece (Non-telecentricity). Furthermore, the image plane is not flat. On the contrary, the simple laser processing can take another order of the preceding scanning and the succeeding converging. The use of an ordinary f tan θ lens cannot keep the proportional relation between the scanning angle and the image height (the distance from the optical axis to the spot on the image plane). Telecentricity is not realized by the ordinary f tan θ lens. However, laser cutting or laser welding allows the non-telecentricity of the converged laser beams.

The orthogonality of beams is essential for perforating a number of microholes vertically at a definite interval by scanned laser beams. This means that microhole perforation requires the telecentricity of the scanned and converged laser beams. Furthermore, it is more convenient that the image height h is in proportion to the scanning angle. The conventional f tan θ lens is useless for converging laser beams in the case of perforating microholes at a definite spatial interval even in the system of the preceding scanning and the succeeding convergence. Thus, an fθ lens is essential as converging optics for the microhole perforation by a power laser. The microhole perforation is a new utility of fθ lenses. The utility is itself novel. The microhole perforation requires the telecentricity more ardently than the fθ property. The laser processing fθ lens is so novel that even the skilled are not enough aware of the special properties and the functions required for the new fθ lenses. The properties and the functions; fθ property, telecentricity, diffraction limited convergence, long front working distance, long back working distance, complex and advanced aberration correction; are now clarified here.

[1. fθ Property]

The fθ property is the first feature required for the printed circuit board processing. This means that the focal point moves on the surface of the work piece (circuit board) exactly in proportion to the incident angle (deflection angle) of the laser beams. Here, f is the focal length of the lens. Namely, the laser beams deflected by a galvanomirror and going into the fθ lens at an incident angle θ should be converged at a spot distant by "h" from the center of the image plane;

$$h=f\theta. \tag{24}$$

The linearity holds between the angle θ itself and the image height h. On the contrary, a conventional lens gives another relation;

$$h=f\tan\theta. \tag{25}$$

The relation between θ and h is non-linear in the conventional lens. The f tan θ is an important property for imaging lenses, e.g., for cameras. The deviation from f tan θ is called "distortion". From the standpoint of the conventional lens optics, the fθ lens is a special lens intentionally endowed with negative distortion (because θ<tan θ). The above relation (24) requires the galvanomirror to deflect the laser beam at an incident angle $\theta_1$ to the fθ lens for perforating a hole at a spot $h=h_1$ on the circuit board, $$\theta_1=h_1/f. \tag{26}$$

The swaying angle α of the galvanomirror is half of the deflection angle θ ($\alpha=\theta_1/2$). Instead of (26), if an ordinary lens were to be adopted, the galvanomirror should deflect the beam by a complex angle $\theta_1$, $$\theta_1=\tan^{-1}(h_1/f): \tag{27}$$

This relation would require a difficult movement to the galvanomirror, because the deflection distance $h_1$ is not in proportion to the deflection angle $\theta_1$. The non-linearity prohibits the galvanomirror from swaying at a constant interval angle for boring microholes at a definite angle on the object. The galvanomirror should sway more rapidly at the center and more slowly at the periphery. Such a complex movement may be realized by adjusting the driving device of the galvanomirror. But it is impossible to give such a difficult movement to a rotating polygon-mirror. The non-linearity between h and θ is a difficulty of the conventional lenses as the converging element of scanned laser beams.

The fθ lens reveals an excellent merit for swaying the galvanomirror at a constant angular velocity for boring holes at a constant interval on an object. If the galvanomirror swaying angular velocity ω is constant, the scanning velocity v of the laser spot on the image plane is given by, $$v = dh/dt = fd\theta/dt = 2fd\alpha/dt = 2f\omega. \tag{28}$$

The scanning velocity v is constant. This is the strong point of the fθ lens. The constant velocity is a simple expression, which is the advantage of the fθ lens.

An conventional lens cannot realize such a simple movement of the moving spot. A constant angular velocity would give a complex scanning speed depending upon the angle, $$v = dh/dt = f\sec^2\theta d\theta/dt = 2f\sec^2\theta d\alpha/dt = 2f\omega\sec^2\theta. \tag{29}$$

The non-linearity forbids the conventional lens to act as the converging optics for the scanned beams. The fθ lens is indispensable for the beam scanning of laser printers, as explained with reference to many prior art. The reason lies at the linearity between the scanning angle θ and the spot location h.

Conventional laser printers employ polygon mirrors for deflecting laser beams. The polygon mirror is a regular polygon column. The movement of the polygon mirror is rotation instead of oscillation (swaying). The angular velocity ω of the polygon mirror is constant. The constant rotation maintains the time change of the incident angle of the reflected beams to the lens to be constant. An fθ lens is indispensable for converging the laser beams scanned by the polygon mirror on the photoconductive drum at a constant velocity in the axial direction. Visible or near-infrared fθ lenses have been employed in the beam scanning optics of laser printers for this reason. A number of fθ lenses have been proposed. Some of them have been explained hitherto. But all of the proposed fθ lenses have been directed to laser printers.

Here, the purpose of the present invention is the laser microhole perforation. The optical part of reflecting the laser beams is not a polygon mirror but a galvanomirror. The galvanomirror does not rotate but oscillates (sways). The gaivanomirror is not necessarily rotated at a constant speed unlike the rotating polygon mirror. The angular velocity can be controlled at an arbitrary speed. For example, it may be possible to control the galvanomirror for satisfying the non-linear relation of Eq.(27). Even if the non-linear movement is employed of Eq.(27), the fθ property is still necessary.

The scanning of laser printers is one-dimensional. On the contrary, the printed circuit board processing compels the galvanomirror to scan laser beams in two dimensions. The two-dimensional scanning doubles the difficulty of designing the fθ lens. The two-dimensional scanning requires two galvanomirrors. One is an X-scanning galvanomirror and the other is a Y-scanning galvanomirror. Two galvanomirrors are placed at an enough distance for prohibiting them from interfering (contacting with each other).

The two-dimensional scanning by two galvanomirrors has two deflecting points. The existence of the two deflecting points generates two-dimensional distortion, i.e., a "positioning error" which never appears in the one-dimensional scanning. The error may be rather difficult to understand. The first X-scanning galvanomirrcr scans the laser beams in the X-direction. The second Y-scanning galvanomirror receives the X-scanned beams distant from the center and deflects (reflects) the beams in the Y-direction. The scope of the Y-deflection depends upon the first X-deflection. The correlation between the X-deflection and the Y-deflection causes image distortion in two dimensions. If the X-galvanomirror and the Y-galvanomirror swayed in turn in the X-direction and in the Y-direction, the locus of the scanned beam would not describe a regular square. The locus is a distorted square which expands in the X-direction but shrinks in the Y-direction. Even if one mirror were to be at rest and the other mirror were swaying around a definite axis, the beam spot deflected by the mirrors would not depict a straight line but a curved line on an image plane.

For correcting the positioning errors, the deflection angle of the resting mirror should be fine-tuned in accordance with the deflection position of the scanning mirror for making the doubly reflected spot depict a correct square. The positioning error can be corrected by moving the resting mirror as a function of the position of the scanning mirror. The mirror driving device can cancel the positioning error by regulating the correlation between the scanning mirror and the resting mirror. The laser hole perforation of printed circuit boards requires rigorous conditions, for example, a perforation speed of boring more than 500 holes per second and a position tolerance of less than ±20 µm. High speed scanning and high accuracy characterizes the laser microhole processing. The fθ property, i.e., the h- θ linearity (h=fθ) is essential for regulating the deflection angles of the correlating mirrors with high accuracy.

A conventional lens would require the complex non-linear oscillation of Eq.(27) for the scanning galvanomirror. The resting mirror should be fine-tuned with the Eq.(27)-scanning mirror for canceling the positioning error. It would be quite difficult to correlating two mirrors one of which moves at rapidly-changing speeds. The fθ property alleviates the difficulty of canceling the positioning error by correlating the movement of the two.

[2. Telecentricity]

The second feature is the telecentricity which is rather more important than the fθ property. Print circuit boards have a thickness of more than 10 µm. If the holes were not vertical but slanting to the board, the connection of wirings and the insertion of lead pins would be hindered. Slanting holes should be excluded. Vertical (orthogonal) holes should be bored. Perforation of vertical holes requires vertical incidence of the laser beams to the object. For the purpose, the beams converged by the fθ lens should shoot the board (image plane) exactly at right angles. Namely, the beams passing the fθ lens should be converging beams being parallel with the main optical axis, irrespective of the incident angle θ.

The property that all of the beams converged by the lens are parallel with each other and orthogonal to the image plane is called "telecentricity". The vertical beams are called "telecentric beams". The telecentricity requires a big lens having an effective diameter larger than the scanning field on the image plane. The outgoing beams from the fθ lens ideally should be parallel to the optical axis which is equivalent to a vertical line to the image plane. But the outgoing beams sometimes deviate from the optical axis direction. The deviation of the outgoing beams from the axial direction is called "telecentric error". The printed circuit board processing demands that the tolerance of telecentric error should be less than six degrees. Six degrees is a big tolerance from the common sense of the one dimensional scanning. But the two-dimensional scanning by double galvanomirrors feels a serious difficulty in reducing the telecentric errors below 6 degrees.

The laser printer gives electric charges to the rotating photoconductive drum, eliminates the unnecessary charges by shooting the laser beams at the parts and makes the dotted region which will be covered with toner. The fθ lens of the printer need not have telecentricity, because the laser beams do not bore holes on the drum.

Another prior device using a galvanomirror and an fθ lens is the scanning laser marker. The laser marker aims at giving marks on surfaces of products. The fθ lens has no telecentricity in the laser marker. Only the printed circuit board (microhole boring) processing requires the fθ lens to have the telecentricity. The fθ lens for the microhole boring processing is large in size and difficult to design.

[3. Diffraction Limited Convergence]

The third feature of the present invention is that the lers should have the diffraction limited performance of convergence. This condition is also difficult to understand. Since the laser beam bores tiny holes, the spot size of the converged laser beam should be very small. An infinitely small spot would be able to perforate an ideally tiny hole. If the beam were ideally converged into an infinite small spot in geometric optics, the actual beam would not be an indefinitely small beam due to the diffraction caused from the wave propagation of light. Stronger diffraction is caused by the larger wavelength λ and the longer focal length f. The diffraction would be smaller when the incidence beam diameter (B) is bigger. When the beam would be converged to an infinitely small diameter in geometrical optics, the diffraction gives a definite diameter to the beam. The minimum spot diameter for the 0-diameter in geometric optics is called a spot diameter "b" of the diffraction limited convergence. The "b" is the lower limit of the diameter of the beam converged by a lens. The diffraction limited spot diameter b depends upon the wavelength λ, the incident beam diameter B and the focal length f. If the incidence beam is assumed to be a Gaussian beam having a Gaussian distribution of intensity, the diffraction limited spot diameter b is given by, $$b=4\lambda f/\pi B. \tag{30}$$

The diameter B of the Gaussian beam is defined as the diameter where the light intensity falls to $e^{-2}$ of the beam central (peak) intensity. The diffraction limited spot diameter b is the least beam diameter obtained by converging the beam by lenses. The requirement of the diffraction limited convergence depends upon the purpose of the fθ lenses. The property is not required for the fθ lenses of laser printers or laser markers. The value of the diffraction limited convergence is contingent upon the wavelength, the focal length, the requested beam spot size, the fluctuation of the spot sizes in the scanning region.

Then, the reason why the laser microhole perforation requires the difficult diffraction limited convergence is now explained. This is originated from the rigorous request for the accuracy of boring the microholes. The important conditions for the hole-boring of print circuit boards are miniaturization of hole diameters, small fluctuation of hole diameters (less than several percent) and circularity of the holes (more than 95% of circularity). Besides, the small curvature of the image plane is another requisite for the printed circuit board hole perforation. If the image plane were not even, the fluctuation of the diameters would be large.

The conditions for the fθ lens of the hole-boring of printed circuit boards are explained. The focal length of the fθ lens should be 60 mm to 120 mm. Two dimensional scanning area should be 30 mm×30 mm (42.4 mm orthogonal length) to 50 mm×50mm (70.7 mm orthogonal length), which is wide enough. The f-number (f/D) should be small, e.g., 2 to 6, since the lens should be fast. Vignetting should be prohibited even for off-axial beams.

The vignetting signifies the power loss caused by shielding peripheral rays by a lens frame. Conventional camera lenses have some vignetting unless the loss of power invites the decline of resolution and contrast at off axis region. The non-vignetting is an essential condition of the lens for high-power laser materials processing. The fθ lens for the hole-boring processing should have a clear aperture large enough to cover all the off-axis region where the laser beams transmit.

The light source is a $CO_2$ laser producing the far-infrared light having a long wavelength from 9 μm to 10.6 μm. The distance between the lens and the work piece (printed circuit board), that is called a back working distance (BWD), should be long due to realizing a wide scanning area. The long BWD requires a long focal length f of 60 mm to 120 mm. The large distance and the long focal length enhance the product λf of Eq.(30). The large λf gives a large least spot diameter b of (30). But the required hole diameters are diminishing. The request of accuracy is increasing. Thus, the fθ lens should have a small f number (f/D).

The diffraction limited convergence is not a condition required only for the normal incidence (θ=0). All incidence angles θ also require the diffraction limited convergence for the fθ lens. For the reason, the fθ lens should succeed in canceling all kinds of aberration (spherical aberration, coma, astigmatic aberration, field curvature, image distortion). This is a very difficult requirement. Conventional convex lenses cannot satisfy such a difficult condition. The conventional fθ lenses for laser printers and laser markers cannot attain to the diffraction limited convergence yet.

[4. Long Front Working Distance]

The new fθ lens for the printed circuit hole-boring requires a further feature of the long front working distance. Conventional laser printer mirrors scan a laser beam in one dimension. The one dimensional scanning requires only a single deflection device, for example, a polygon mirror or a galvanomirror positioned at the front focal point. In the case of one dimensional scan, telecentricity, irrespective of the deflection angle θ, is easily obtained. On the contrary, the galvanomirrors for the present invention should scan a laser beam on the printed circuit board in two dimensions. The two dimensional scan for the printed circuit board processing is accomplished by two deflection devices having deflection axes being orthogonal with each other. For example, two galvanomirrors should scan laser beams in orthogonal directions. There are two deflection points. The distance between the first galvanomirror and the second galvanomirror should be long enough for suppressing the interactive contact of two mirrors. In principle, complete telecentricity cannot be realized for both the X-direction scanning and the Y-direction scanning.

Then, two galvanomirrors should be placed at two points which sandwich the front focal point at the middle. Namely, the front focal point coincides with the middle point between the two galvanomirrors. This symmetric disposition alleviates the telecentric error to be as small as possible. The front focal point is defined as a point which gives a point light source lying there parallel rays passing the lens. On the contrary, the rear focal point is defined as the point at which the lens converges parallel incidence rays. The front focal point and the rear focal point are important attributes of a lens. The front focal point lies between the object and the lens. The rear focal point exists between the lens and the image. Thus, one galvanomirror is interposed between the object and the front focal point. The other galvanomirror is positioned between the front focal point and the lens. The disposition distributes the telecentric error equally into the X-direction and the Y-direction.

Such disposition requires a long front working distance (FWD), to allocate two distant deflection devices which oscillate independently in different directions. For instance, the FWD is 0.3 time to 0.6 time as long as the focal length f of the lens. If the lens has a focal length f=100 mm, the FWD should be 30 mm to 60 mm. This is a very long distance from the standpoint of view of the conventional fθ lens.

[5. Long Back Working Distance]

When the scanning laser beam bores microholes on the work piece by burning the board material, ash and fragments may sprinkle on the lens if the lens were in the vicinity of the work piece. Prohibiting the fragments or ash from staining the lens requires a long back working distance (BWD) between the lens and the image plane. For example, a focal length f=100 mm causes a 70 mm to 100 mm long BWD.

Unfortunately, the long FWD and the long BWD are contradictory. If the FWD is increased, the BWD should be shortened. The longer BWD decreases the FWD. The limits of the lengths are determined by the configuration of the lens. The aforementioned problem requires a new lens structure allowing long lengths to both the front and back working distances.

[6. Requisite For Correcting Complex Aberrations]

The lens system yields very complex aspects of aberration, because two galvanomirrors positioned at an interval scan the laser beam in two dimensions. When scanning were done only in the X-direction or in the Y-direction, the conventional treatment of aberration in one dimensional would be valid, since the lens has rotational symmetry. However, the printed circuit board processing must include both the X-scanning and the Y-scanning. In the case, the lens system loses rotational symmetry with regard to the deflection points, since the deflection point of the X-scanning differs from the deflection point of the Y-scanning. The loss of the rotational symmetry produces complex aberration.

Assembling various lenses for a single lens system is a traditional remedy for correcting aberrations. The use of monochromatic light of a laser succeeds in excluding chromatic aberrations caused from dispersion (dn/d λ). Even monochromat ic color invites other kinds of aberration, e.g., spherical aberration, astigmatism, coma, distortion, and field curvature.

Spherical aberration means that parallel rays starting from an object at infinity on the optical axis are converged at different points on the axis which depends on the ray height h which is a distance between a ray and the axis. The spherical aberration makes a focus of the rays further from the axis different from the paraxial focal point (h→0). A convex spherical lens produces a farthest focus for the paraxial rays and nearer focal points for farther-axis rays. The spherical aberration occurs similarly for an off-axis object which does not lie on the axis.

Astigmatism appears for an off-axis object which does not lie on the axis. The astigmatism means the difference of the image produced by meridional rays which are included in the meridional plane from the image produced by sagittal rays which are included in the sagittal plane. Here, the meridional plane is defined as a plane including the chief ray from the object to the center of entrance pupil and the optical axis. The sagittal plane is defined as a plane vertical to the meridional plane and including the chief ray. In other words, the astigmatism signifies that the sagittal focus differs from the meridional focus. The aberration originates from the difference between the meridional curvature and the sagittal curvature of field. The difference of lens surface curvatures in the two vertical directions makes different focal points for the sagittal rays and the meridional rays from the off-axis object.

Coma means that the rays lying asymmetric with regard to the sagittal plane cross at different heights to the image plane. An off-axis object p is assumed to make an image P by the paraxial rays passing near the center of the lens. An image plane Q is defined as a plane including the image P and being vertical to the beam axis. An assembly of conical rays emitted from the object in a cone of a top angle u is assumed. The lens refracts the conical rays and makes an image on the image plane. If the lens has coma, the image is different from the image point P. The coma makes a circular image of the conical rays on the image plane Q in the first order error. In general, the images for conical rays of different top angle u make irregular closed loops on the image plane. The closed loops are all in contact with a 60 degree wide fan-shaped region extending from P on the image plane. When the fan-shaped region extends outward from P, the coma is called "outer coma". When the fan-shaped region returns inward from the point P, the coma is called "inner coma".

Field curvature signifies that a planar object is imaged by the lens into a convex or concave image plane. Distortion means that a square object is imaged in a barrel shape or a pin-cushion shape by the lens. There are various kinds of aberration. In the one-dimensional scanning for laser printers, laser COMs or laser makers, the locus of scanned rays lies on the meridional plane, which simplifies the problem of aberration.

Two dimensional scanning required by the present invention does not restrict the scanning rays within the meridional plane but also develops the scanning rays on the sagittal planes. It increases the difficulty of correcting various kinds of aberration. For example, the distortion does not mean such a simple conversion from a square to a barrel or to a pin-cushion. This fact gives a difficulty to the angle compensation of the galvanomirror. The field curvature is not restricted within the conversion into the rotationally-symmetric convex curve or concave curve. In particular, the image plane drastically curves in the orthogonal directions. The correction of aberrations is far more difficult for the two-dimensional scanning fθ lens than the one-dimensional scanning fθ lens. The request for correcting aberrations still raises the difficulty of making the fθ lens for the printed circuit board processing.

A purpose of the present invention is to provide an fθ lens which satisfies the conditions required for a two-dimensional scanning lens of printed circuit board processing. Another purpose of the present invention is to provide an fθ lens which has a high fθ property, telecentricity and diffraction limited convergence in a wide scan field.

SUMMARY OF THE INVENTION

The fθ lens of the present invention contains a first lens group having an object-side convex positive lens, a second lens group having an object-side concave negative lens, a third lens group having a positive refractive power, the third lens group being a single positive lens, an assembly of a positive lens and a negative lens or another assembly of a positive lens and another positive lens.

The lens components satisfy the conditions (a) to (c);

(a) $-2.2 \leq f_2/f \leq -0.3$                                    (31)

(b) $0.4 \leq f_3/f \leq 0.9$                                        (32)

(c) $1.8 \leq d/f \leq 2.4$.                                        (33)

where $f_2$ is the focal length of the second lens group, $f_3$ is the focal length of the third lens group, f is the focal length of the whole lens system and d is the distance from the front focus to the image plane. Condition (a) (Eq.(31)) is the condition for the second lens group. Condition (b) (Eq.(32)) is a requirement for the third lens group. Condition (c) (Eq.(33)) is a condition for the whole lens system.

The material of the lenses is zinc selenide (ZnSe) or germanium (Ge), since ZnSe and Ge are transparent for $CO_2$ laser light. Both ZnSe and Ge are useful for making aspherical lenses in addition to produce spherical lenses. In the case of producing spherical lenses, gallium arsenide (GaAs) is also available. Aspherical lenses can be produced by diamond tools of ZnSe and Ge. Unlike ZnSe and Ge, aspherical lenses cannot be made of GaAs because of the impossibility of cutting GaAs by diamond tools.

The fθ lens of the present invention has several lens groups. The first lens group has a convex surface to the object side. Namely, the first group is a positive lens having a convex surface. The first lens group which is distant from the deflection point (galvanomirror) generates negative distortion. The second lens group and the third lens group induce strong distortion. The second lens-induced distortion and the third lens-induced distortion cancel with each other, because the direction of distortion is reverse. Thus, the fθ property mainly derives from the first lens group. The first lens group has a little spherical aberration but has a considerable amount of coma and astigmatism for balancing the aberrations with the second group and the third group.

The first lens has a convex first surface in the present invention. Another possibility is now considered. If the first surface of the first group were concave and the first group were a positive lens, the fθ property would be obtained by yielding negative distortion. However, other aberrations would be too small to cancel the counterpart aberration of the second and the third groups. The imbalance would result in bad fθ property and in poor convergence.

If the first surface of the first group were concave and the first group were a negative lens, the fθ property would not be obtained by the first lens by itself due to the positive distortion. Then, the fθ property would be obtained by giving negative distortion to the third lens group. The first lens group should be a thin dome-shaped lens with strong curvature for canceling another kinds of aberration with the second and the thifd groups. But the production of the thin dome-shaped lens would be very difficult owing to the narrow tolerance.

If the first surface of the first lens were concave to the object, the extension of the periphery of the first lens would shorten the front working distance in comparison with the case of the convex first lens. Thus, the convex first lens is useful also for the purpose of allotting a long front working distance. The first surface of the first lens group should be a positive lens being convex to the object.

The second lens group contains a negative lens concave to the object side. The entrance pupil imaged by the first lens group exists to the object side from the second group. Then, the second lens faces the concave surface to the image of entrance pupil. This suppresses coma and astigmatism at this concave surface. The positive spherical aberration by the concave surface corrects the negative spherical aberration which will be produced by the third lens group. The concave first surface of the second lens also produces a negative Petzval's sum for balancing with the positive Petzval's sum from the third group. The second surface of the second lens raises coma and astigmatic aberration for correcting the coma and astigmatism by the first and the third lens groups.

The third lens group has positive refractive power. The third group is constructed by a single positive lens, an assembly of two positive lenses or an assembly of a positive lens and a negative lens aligning in this order. The third group should have strong refraction power for increasing the brightness of lens by decreasing F-number (f/D). The third group produces telecentricity together with the second group. The cooperation of the negative second group and the positive third group succeed in prolonging the back working distance. The second group yields positive distortion. The negative distortion made by the third group cancels the positive distortion caused by the second group. The third group and the second group generate higher order distortion for ensuring the fθ property in the whole scanning region. The third group flattens the image by correcting the higher order field curvature produced by the first group.

Besides the above-explained correction of aberrations, the lens groups are assembled for balancing various kinds of aberration in order to accomplish the desired properties. The above explanations are valid for the case of constructing the lens groups with spherical lenses. If aspherical lenses are used, the functions will be more complex. The meaning of the critical values of the conditions (a) to (c) will be explained.

(a) $-2.2 \leq f_2/f \leq -0.3$ (31)

(b) $0.4 \leq f_3/f \leq 0.9$ (32)

(c) $1.8 \leq d/f \leq 2.4.$ (33)

As defined before, $f_2$ is the focal length of the second group, $f_3$ is the focal length of the third group and f is the focal length of the whole lens system.

The condition (a) determines the range of the focal length of the second group. If $f_2/f$ exceeded the lower limit (−2.2) downward, the convergence property would degenerate, in particular, at the corners of the two dimensional scanning region due to the insufficient correction of the coma and astigmatism by the second surface of the second group. Further, too small spherical aberration by the first surface of the second group would break the balance of the aberration among the groups. On the contrary, if $f_2/f$ exceeded the upper limit (−0.3), the breakdown of balance of the aberration among the groups would enhance the astigmatism especially. The deflection (first galvanomirror) at the farther point incurs large astigmatism, since the meridional image bends toward the under-side and the sagittal image bends toward the over-side. The astigmatism degenerates the convergence at the corners of the two-dimensional scanning region. The deflection (second galvanomirror) at the nearer point invites big field curvature bending toward the over-side by the meridional image displacing to the sagittal image.

Condition (b) relates to the condition of the focal length (refractive power) of the third group. If $f_3/f$ exceeded over the lower limit (0.4), the degradation would appear from the break of the balance of refractive power among the lens groups. The coma and the astigmatism would be large at the third group which destroys the balance with the second group. The imbalance would reduce the convergence at the corners of the rectangular scanning region. An improvement of the balance of the distortion would overcorrect the Petzval's sum and bend the image plane toward the over-side due to the higher order field curvature.

On the contrary, if $f_3/f$ exceeded over the upper limit (0.9), the balances of the spherical aberration, the coma and the astigmatism with other groups would be disturbed. Higher order aberration decreases the convergence widely in the scanning region. An improvement of the balance of the distortion would bear field curvature due to the positive Petzval's sum. Further, the front working distance would be shortened.

Condition (c) relates to the full length d of the lens system. If d/f exceeded the lower limit (1.8), negative distortion would grow too big to maintain the linearity of the fθ property even by the correction of higher order distortion. The d/f below the lower limit would shorten both the front working distance and the back working distance. Contrarily, an excess d/f over the upper limit (2.4) would invite too much coma and astigmatism by destroying the balance among the lens groups, which degrades the convergence. The d/f above the upper limit would degrade the fθ property and the field curvature.

The lenses are preferably made of zinc selenide (ZnSe) or germanium (Ge). Spherical lenses can be made of gallium arsenide (GaAs). These materials are endowed with high transparence and low absorption for infrared light of $CO_2$ lasers. The lenses made of these materials are suitable for high power $CO_2$ lasers. ZnSe is the most suitable, since it is transparent also for visible light, for example, the He—Ne laser light or visible semiconductor laser light which is utilized as guide light for the arrangement of optical parts. Fortunately, ZnSe, Ge and GaAs have high refractive index for the infrared $CO_2$ laser light. The refractive index of ZnSe is 2.403. The refractive index of Ge is 4.003. GaAs has a refractive index of 3.275. High refractive index enables the material to make thinner lenses with smaller curvature. Thinner lenses can alleviate weights. Smaller curvature enables the lenses to reduce all kinds of aberration further. This invention prefers such a material that has a high refractive index for the infrared $CO_2$ laser light. In any embodiments this invention employs the material having a high refractive index more than two for the reference wavelength. In the case of making ordinary lenses of f tan θ, it is more advantageous to utilize the materials of higher refractive indices.

Preferably, this invention makes fθ lenses of a high refractive index material e.g., germanium (Ge), gallium arsenide (GaAs) or zinc selenide (ZnSe). High refractive index material can realize strong refraction power even for small curvature. The reduction of curvature gives the freedom of decreasing various kinds of aberration, since aberration is caused not by the refractive index but by the large curvature. On the contrary, the refraction power is given by a product of the refractive index and the curvature. As already mentioned, various kinds of aberration accompany fθ lenses in complex modes, since the fθ lens includes a plurality of lenses having different roles. In special, two-dimensional scanning causes a large amount of aberration. The appearance of complex and big aberration is a new difficulty of two dimensionally-scanning fθ lenses. The small values of aberration facilitate the design of the fθ lenses. Germanium (Ge) has, in particular, a very high refractive index. It is convenient to employ the Ge lens as the third group lens which needs strong positive refractive power. Ge gives a thinner lens which has the equivalent function than ZnSe. The use of the high refractive index material as the third group lenses enables the fθ lens to suppress the field curvature.

Both zinc selenide (ZnSe) and germanium (Ge) have another advantage of excellent processibility which enables ultraprecision diamond turning to make aspherical lenses. The ultraprecision diamond turning shapes aspherical surfaces with a tolerance below submicron (<1 μm) with natural diamond crystal tools. Optimization of the tool tip shape and some parameters allows the diamond turning to give the aspherical surfaces the smoothness which is well equal to the smoothness formed by polishing.

Employment of aspherical lenses gives high freedom to the correction of aberration of lenses. Aspherical lenses are effective not only to the correction of residual spherical aberration but also to the correction of the off-axis aberrations. For example, aspherical lenses are useful for correcting astigmatism and field curvature occurring in the two-dimensional scanning. Besides, aspherical surfaces are suitable for the correction of the higher order aberration. Such effects will be realized by allotting at least one lens at least one aspherical surface.

The effect depends upon which lens should be provided with aspherical surfaces. In general, aspherical lenses for the first group and the second group are advantageous mainly for correcting spherical aberration or coma. Aspherical lenses for the third group are effective for correcting astigmatism, field curvature or distortion.

It is also preferable to give an aspherical surface to a strong refractive surface from the standpoint of correcting aberration. It is convenient to give aspherical surfaces to more than one lens for the sake of the freedom of giving big aberration intentionally to individual lenses, canceling the aberration and realizing high quality by the cancellation. The adoption of aspherical lenses is also effective to curtail the cost through decreasing the number of lenses or thinning the thicknesses of lenses. However, the aspherical lenses are more susceptible to the influence of production errors, for example, decentration. Attention should be paid to suppressing the production errors. Conditions on shaping, for example, curvature, lens diameter, sag may restrict the selection of the aspherical surfaces. But arbitrary surfaces of arbitrary lenses can be selected to be aspherical. The desired property, processibility or cost should be taken into account for deciding which surface should be aspherical.

The above explained fθ lens can satisfy all the requirements for boring microholes on printed circuit boards. Since this invention makes use of thinner lenses made of high refractive index materials, this invention succeeds in decreasing the cost. Further, the present invention can facilitate the fabrication of lenses and the installment of the lenses onto the mounts.

This invention, for the first time, proposes a new fθ lens converging a laser beam for perforating a plurality of microholes on an object board by scanning the object board in two dimensions by a strong infrared laser beam of, for example, a $CO_2$ laser. The fθ lens of the present invention is made of a refractory material which is transparent for the infrared light and has a higher refractive index for the infrared light than 2 (n>2). The fθ lens of the present invention is quite novel in the purpose, the function, the structure and the material. Prior printer fθ lenses sway the AlGaAs laser beam in the one dimensional line. The invention fθ lens scans the laser beam in the two dimensional space. The invention is the first, epochmaking two-dimension scanning fθ lens. Nobody can find any prior art of the two-dimension scanning fθ lens. The invention fθ lens can ensure small wavefront aberration less than λ/14 even at the corners on the image plane. The small wavefront aberration enables the laser beam to bore a plenty of round microholes at the exact spots in a rigorous vertical direction on the object printed circuit board.

The laser itself has a weak power of an order of a milliwatt (mW) for prior art laser printers. On the contrary, the laser power of the present invention is strong, i.e., of an order of a kilowatt (kW). The laser power of this invention is ten thousand times to million times as strong as the prior printer laser. Joule's heat yielded in the lenses of the invention is far greater than the conventional printer. This invention employs refractory, heat-resistant materials for composing lenses. Furthermore, the wavelengths are different. Laser printers for prior art adopt He—Ne lasers, Ar lasers or AlGaAs semiconductor lasers of 400 nm to 900 nm. This invention uses far infrared light of 9 μm (9000 nm) to 10.6 μm (10600 nm). Being refractory, the lenses of the present invention are transparent and unabsorptive to the far infrared light. Despite the strong irradiation of laser power, the high transparency enables the invention lenses to suppress heat generation. The refractory lenses resists against heating.

This invention succeeds in offering an excellent fθ lens for allowing the two-dimensional scanning of the laser beam for perforating microholes on printed circuit boards with the high fθ property, the rigorous telecentricity, the diffraction limited convergence.

BRIEF DESCRIPTION OF THE DRAWINGS

FIG. 1 is a sectional view of the fθ lens of showing the lens arrangement and the ray loci of Embodiment 1. $G_1$ is the first lens group. $G_2$ is the second lens group. $G_3$ is the third lens group. $L_1, L_2, L_3$ and $L_4$ are lenses composing Embodiment 1. Three parallel lines denote typical parallel rays starting from the point object at infinity. Three parallel rays are converged at a spot on the image plane.

FIG. 5 is a sectional view of the fθ lens of showing the lens arrangement and the ray loci of Embodiment 2. $G_1$ is the first lens group. $G_2$ is the second lens group. $G_3$ is the third lens group. $L_1, L_2, L_3$ and $L_4$ are lenses composing Embodiment 2.

FIG. 9 is a sectional view of the fθ lens of showing the lens arrangement and the ray loci of Embodiment 3. $G_1$ is the first lens group. $G_2$ is the second lens group. $G_3$ is the third lens group. $L_1, L_2, L_3$ and $L_4$ are lenses composing Embodiment 3.

FIG. 10 is a graph of the spherical aberration distribution of Embodiment 3 in the height direction on the lens. The ordinate is the ray height on the lens (one division means a 1.25 mm length). The abscissa is the spherical aberration.

FIG. 11 is a graph of the angular distribution of the astigmatism of Embodiment 3. The ordinate is the incidence angle θ of the parallel rays (one division corresponds to two degrees). The abscissa denotes the meridional focus by ΔM and the sagittal focus by ΔS. The difference between ΔM and ΔS is the astigmatism.

FIG. 12 is a graph showing the dependence of the fθ property upon angles of Embodiment 3. The ordinate is the incidence angel θ of the parallel rays into the lens (one division corresponds to two degrees). The abscissa is the deviation (%) from the fθ property.

FIG. 13 is a sectional view of the fθ lens of showing the lens arrangement and the ray loci of Embodiment 4. $G_1$ is the first lens group. $G_2$ is the second lens group. $G_3$ is the third lens group. $L_1, L_2$ and $L_3$ are lenses composing Embodiment 4.

FIG. 21 is a sectional view of the fθ lens of showing the lens arrangement and the ray loci of Embodiment 6. $G_1$ is the first lens group. $G_2$ is the second lens group. $G_3$ is the third lens group. $L_1, L_2, L_3$ and $L_4$ are lenses composing Embodiment 6.

FIG. 25 is a sectional view of the fθ lens of showing the lens arrangement and the ray loci of Comparison Example A. $G_1$ is the first lens group. $G_2$ is the second lens group. $G_3$ is the third lens group. $L_1$, $L_2$ and $L_3$ are lenses composing Comparison Example A.

FIG. 29 is a sectional view of the fθ lens of showing the lens arrangement and the ray loci of Comparison Example B. $G_1$ is the first lens group. $G_2$ is the second lens group. $G_3$ is the third lens group. $L_1$, $L_2$, $L_3$ and $L_4$ are lenses composing Comparison Example B.

FIG. 33 is a sectional view of the fθ lens of showing the lens arrangement and the ray loci of Comparison Example C. $G_1$ is the first lens group. $G_2$ is the second lens group. $G_3$ is the third lens group. $L_1$, $L_2$, $L_3$ and $L_4$ are lenses composing Comparison Example C.

DETAILED DESCRIPTION OF THE PREFERRED EMBODIMENTS

The following are Embodiments 1 to 6 and Comparison Examples A to F. All the embodiments and the comparison examples have common properties of the focal length f=100 mm, the F-number=4, the scanning area=50 mm×50 mm and the wavelength λ=10.6 μm ($CO_2$ laser light).

The embodiments and the comparison examples assume parallel incidence beams which have the object point at an infinitely long distance. The fθ lens of the invention can also be used for a finite distant object point (Mask imaging configuration), which is usually used for perforating printed circuit boards. But the image curvature and the fθ property are different between the infinitely long distanced object point and the finite distant object point. The parameters should be changed to be suitable for the finite distant object point. The converged spot diameter cannot be given by Eq.(30). The diameter depends upon the pin hole mask diameter, the magnification, the size of the diffracted beam from the pinhole and the entrance pupil diameter of the lens.

Tables 1 to 11 denote the data of lenses and the data of aspherical coefficients of the embodiments and the comparison examples. FIG. 1 to FIG. 24 show the sectional views and the aberration curves of the embodiments and the comparison examples. An aspherical surface z(x,y) is expressed by a definition equation, $$Z = \frac{cr^2}{1+\sqrt{1-(1+k)c^2r^2}} + \sum_{i=2}^{5} \alpha_i r^{2i} \quad (34)$$

where c is a vertex curvature, k is a conic coefficient, $\alpha_i$ is an aspherical coefficient and $r=(X^2+y^2)^{1/2}$.

Since the laser beams scan on the lens in the two dimensional area, the aberration appears for every point in the two dimensional area. But the two dimensional aberration cannot be shown in a simple graph. Thus, the aberration curves show the aberration of one dimension scanning deflected around the front focus. Such graphs of the one-dimension aberration cannot fully show the lens properties. Then, Table 12 denotes the RMS (root mean square) values of the wavefront aberration at main points in the two dimensional scanning area. Table 12 shows that the RMS values for all the embodiments are less than the fourteenth of wavelength (λ/14) (=0.0714 λ). This means that the embodiments enjoy the excellent property of the convergence of the diffraction limit. The telecentric errors are less than five degrees (<5°) at all points in the two dimensional scanning area. Table 13 denotes the values of the conditions (a), (b) and (c) of the embodiments.

EMBODIMENT 1
(all spherical four lenses (FIG. 1 to FIG. 4))

Figure 4:
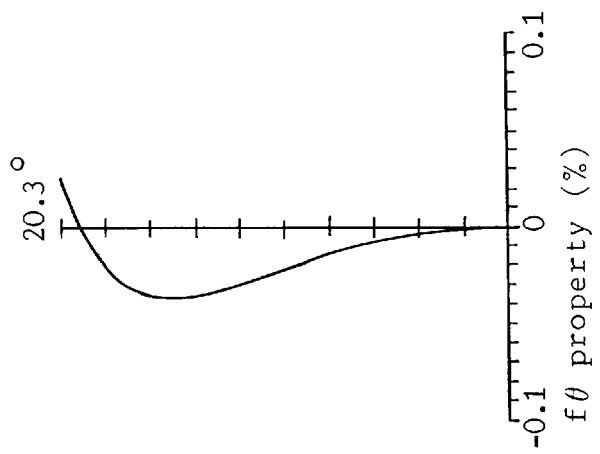
FIG. 4 is a graph showing the dependence of the fθ property upon angles of Embodiment 1. The ordinate is the incidence angel θ of the parallel rays into the lens (one division corresponds to two degrees). The abscissa is the deviation (%) from the fθ property.
Figure 3:
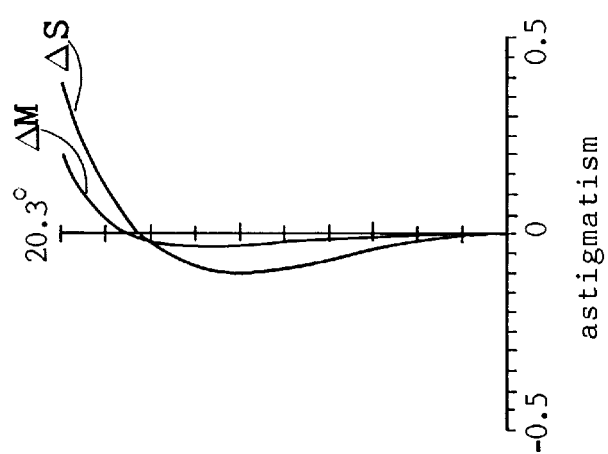
FIG. 3 is a graph of the angular distribution of the astigmatism of Embodiment 1. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 2:
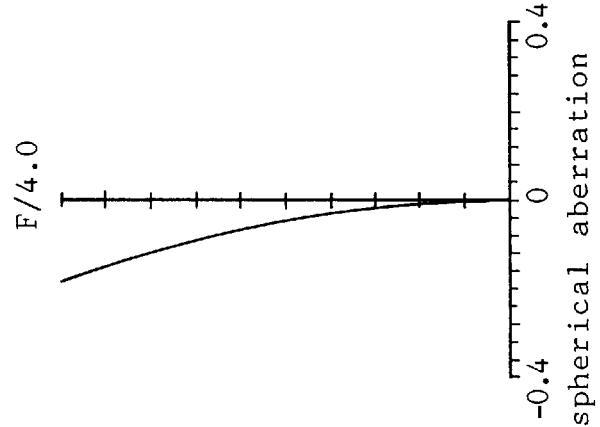
FIG. 2 is a graph of the spherical aberration distribution of Embodiment 1 in the height direction on the lens. The ordinate is the ray height on the lens (one division means a 1.25 mm length). The abscissa is the spherical aberration.

The advantages of high freedom of design and facile correction of aberration accompany the use of aspherical lenses, which has been explained before. However, the fθ lens of the present invention can be built with only spherical lenses. FIG. 1 shows the fθ lens of Embodiment 1. FIG. 2 is the graph of the dependence of the spherical aberration upon the beam height. The abscissa is the longitudinal aberration. The ordinate is the beam height. FIG. 3 denotes the incident angle distribution of the astigmatism. The abscissa is the longitudinal aberration. The ordinate is the beam incidence angel. FIG. 4 exhibits the fθ dependence on the incidence angle. The ordinate is the beam incidence angle. The abscissa is the deviation from the fθ property. ΔM shows the meridional image surface and ΔS denotes the sagittal image surface in FIG. 3. Thus, the astigmatism graph of FIG. 3 shows also the field curvature.

The astigmatism and the fθ property are shown in the figures for the angles in the meridional plane which includes the optical axis. In the case of one dimensional scanning, the curve would include all the scanning scope. But this invention aims at two dimensional scanning of beams. These graphs only show the one dimensional scanning by the galvanomirror at the front focus. It is impossible to show the aberration in the two dimensional scanning. However, one-dimensional representation hints the behavior of the aberration in two dimensional scanning. The aberration at point r implies the aberration at a point (X, Y) where $X^2+Y^2=r^2$. The appearance of the aberration in the two dimensional scanning is more complex than the one dimensional case. The analysis of the wavefront aberration shows the two dimensional distribution of aberration which is denoted in Table 12.

The fθ lens of Embodiment 1 has a focal length of 100 mm. The focal length is taken as a unit length 1 for denoting the length parameters to normalize the parameters. The focal length f=100 mm is convenient to normalize parameters. But the focal length is not restricted to be 100 mm in an actual case. The scan field has 50 mm×50 mm area. Since h=fθ, the scope of the incidence angle of the beams is 0.5 radian ×0.5 radian. In the unit of degrees, the image plane is 28.65 °×28.65° (−14.325 °≦$θ_x$≦+14.325 °, −14.325 °≦$θ_y$≦+14.325°). The orthogonal corner point has an angle of 20.25 ° which is a product of $2^{1/2}$ and 14.325°.

The lens groups are denoted by $G_1$, $G_2$ $G_3$ from the object side. The lenses are denoted as $L_1$, $L_2$, $L_3$ and $L_4$ from the object side. $L_1$ belongs to $G_1$. $L_2$ belongs to $G_2$. $L_3$ and $L_4$ bel to $G_3$. Embodiment 1 is an fθ lens consisting of four spherical lenses. Nine rays in FIG. 1 denote three sets of three parallel rays refracted by the lenses and converged on the image plane. The rays show three different incidence angles. Regarding each angle, the three rays (upper ray, middle ray and lower ray) are shown. Span of the three rays denotes the width of the entrance pupil. Besides the three rays, an infinite number of parallel rays are actually converged at the same points on the image plane. The relation is described simply by h=fθ.

Table 1 shows the parameters of Embodiment 1. One lens has two surfaces. Four lenses have eight surfaces. The eight surfaces are numbered in order as $S_1$, $S_2$, $S_3$, . . . , $S_8$ from the object side to the image side. The j-th lens $L_j$ has a front surface $S_{2j-1}$ and a rear surface $S_{2j}$. A spherical lens enables the curvature radius to define the surface shape. The curvature radius is represented in a unit of millimeter (mm). The sign of the curvature radius is determined to be positive for the curvature center lying on the image side and negative for the curvature center lying on the object side. Thus, the positive/negative signs are not the symbol whether the lens itself is convex or concave.

TABLE 1

Lens data of the fθ lens of Embodiment 1

| Group No. | Lens No. | Surface No. | Curvature Radius (mm) | Thickness Spacing (mm) | Refractive Index n |
|---|---|---|---|---|---|
| | | front focus | | 42.618 | |
| $G_1$ | $L_1$ | $S_1$ | 82.933 | 6.700 | 2.403 |
| | | $S_2$ | 147.995 | 28.900 | |
| $G_2$ | $L_2$ | $S_3$ | −264.850 | 4.000 | 2.403 |
| | | $S_4$ | 129.451 | 16.300 | |
| $G_3$ | $L_3$ | $S_5$ | −3994.603 | 7.900 | 4.003 |
| | | $S_6$ | −217.271 | 1.800 | |
| | $L_4$ | $S_7$ | 93.960 | 7.200 | 2.403 |
| | | $S_8$ | 124.297 | 72.143 | |

In the fifth column, the thickness and the spacing signify either spatial distance between neighboring lenses or the thickness of a lens, for example, the distance from the entrance pupil (deflection point) to the first lens $L_1$, the thickness of the first lens $L_1$, the distance between the first lens $L_1$ and the second lens $L_2$, the thickness of the second lens $L_2$, . . . , the distance from the fourth lens $L_4$ to the image plane. The first spacing 42.618 mm is the distance between the front focus and the $S_1$ surface of $L_1$. The second spacing 6.700 mm is the thickness of the lens $L_1$. Thicknesses at all points on $L_1$ are determined by the front curvature, the rear curvature and the central thickness. Third spacing 28.900 mm is the distance between $S_2$ of $L_1$ and $S_3$ of $L_2$. The final 72.143 mm means the distance between the $S_8$ of $L_4$ and the image plane. The sixth column denotes the refractive index of lenses. The first value says that the refractive index of $L_1$ is 2.403. $L_1$, $L_2$ and $L_4$ have refractive index n=2.403. This means that $L_1$, $L_2$ and $L_4$ are made of ZnSe. $L_3$ of n=4.003 is made of germanium (Ge). The refractive index of the spacings is, of course, 1, which is omitted in Table 1.

The first group $G_1$ consists of only a positive lens $L_1$ being convex to the object side. The "positive" and "convex to object" are known by the curvature radii 82.933 mm ($S_1$) and 147.995 mm ($S_2$). Positive signs mean that both surfaces $S_1$ and $S_2$ of $L_1$ are convex to the object side. The forward curvature radius $S_1$ is shorter than the rear curvature radius $S_2$ ($S_1 < S_2$). The lens has positive refractive power. Positive refractive power lens means a convergent lens.

In general, if the lens $L_j$ has a relation of $0 < S_{2j-1} < S_{2j}$, $S_{2j-1} > 0 > S_{2j}$ or $0 > S_{2j} > S_{2j} > S_{2j-1}$ between the forward radius $S_{2j-1}$ and the rear radius $S_{2j}$, the lens $L_j$ is a positive lens which has positive refractive power (convergent). A "bi-convex" lens is defined by a positive $S_{2j-1}$ and a negative $S_{2j}$. A "meniscus" lens is defined by a positive $S_{2j-1}$ and a positive $S_{2j}$ or a negative $S_{2j-1}$ and a negative $S_{2j}$.

A negative lens is a divergent lens which diverges rays. If the lens $L_j$ has a relation of $0 > S_{2j-1} > S_{2j}$, $S_{2j-1} < 0 < S_{2j}$ or $0 < S_{2j} < S_{2j-1}$ between the forward radius $S_{2j-1}$ and the rear radius $S_{2j}$, the lens $L_j$ is a negative lens which has negative refractive power (divergent). A "bi-concave" lens is defined by a negative $S_{2j-1}$ and a positive $S_{2j}$. A negative meniscus lens is a negative refractive meniscus lens.

One feature of the present invention is the first positive refractive lens being convex to the objective side, i.e., $S_1 > 0$ and $S_1 < S_2$. Since $S_1 = 82.993$ mm and $S_2 = 147.995$ mm, the first lens $L_1$ is a positive meniscus. $L_1$ is made of zinc selenide (ZnSe) of n=2.403.

Prior art fθ lenses of No.5, No.6 and No.7 explained before all place a concave negative first lens for diverging incidence rays and obtaining a wide beam from the beginning. This is a conspicuous difference between the present invention and the prior art. Prior art of No.4 takes a concave positive first lens for converging rays without distortion. All prior art were used to select a concave lens as a first lens.

Unlike prior art, this invention chooses a positive object side convex lens as a first lens $L_1$ ($G_1$). The positive convex $L_1$ aims at obtaining the fθ property through giving "negative"distortion at first. Conventional No.4, 5, 6 and 7 fθ lenses differ from the present invention at this point. However, prior art No.1 to No.3 have a common feature of the positive convex first lens. The present invention has other different points from the prior art with regard to lens groups 2 to 4.

The second lens group consists of a negative refractive power lens $L_2$ ($G_2$), which is another characteristic of the present invention. The rays once converged by $L_1$ ($G_1$) are diverged by the negative $L_2$ ($G_2$). $S_3 = -264.850$ mm and $S_4 = 129.451$ mm signify that $L_2$ is negative. $L_1$ makes an image of the entrance pupil at a point which lies on the object side of $L_2$. $L_2$ suppresses coma and astigmatism by the negative surface ($S_3 < 0$). The negative surface $S_3$ yields positive spherical aberration intentionally for canceling the negative spherical aberration which will later be produced by the third group $G_3$. The second surface $S_4$ (129.451 mm) raises coma and astigmatism for balancing the aberration with other lens groups. $L_2$ of $G_2$ generates negative field curvature (negative Petzval's sum) for canceling the positive field curvature (positive Petzval's sum) by the third group $G_3$.

The concave second group lens $L_2$ raises positive distortion due to the concavity to the object side. The second lens $L_2$ is assigned with a positive role for generating the positive spherical aberration, the positive distortion and the negative field curvature. For the purpose, the focal length $f_2$ of $L_2(G_2)$ is enough short. The focal length $f_2$ should be longer than 0.3f but shorter than 2.2f. Since $f_2$ is negative, the condition is simply represented by an inequality $0.3f \leq |f_2| \leq 2.2f$ which is equivalent to Inequality (31). This implies a big curvature of the negative lens $L_2$. In general, a thin lens having spherical surfaces has a focal length f $$\frac{1}{f} = (n-1)\left(\frac{1}{\rho_1} - \frac{1}{\rho_2}\right) \quad (35)$$

where $\rho_1$ and $\rho_2$ are the curvature radii of the front and rear surfaces of $L_2$ and n is the refractive index. Since n=2.403, $\rho_1 = -264.850$ mm and $\rho_2 = 129.451$ mm, f=−62 mm for a thin $L_2$. The short focus gives strong refractive power to the concave $L_2$.

This calculation implies also the merit of the large refractive index n. Quartz which has been widely used for the optical network has a low refractive index of about n=1.4. (n−1) is only 0.4 for quartz. The same focal length f=−62 mm could be obtained by quite big curvatures $\rho_1 = \rho_2 = -78$ mm and large thickness for quartz.

Embodiment 1 assumes the whole focal length to be f=100 mm. The second group has a short focal length $f_2 = -63$ mm. A short focal length signifies a large curvature. In the embodiment, $f_2/f = -0.63$ which lies in the above-mentioned range (31) between $-2.2 \leq f_2/f \leq -0.3$.

The third lens group aligns two positive lenses $L_3$ and $L_4$ in series. $L_3$ seems a plano-convex lens. But the front surface $S_5$ is concave a little. $L_3$ seems a thin lens but has a strong refractive power because of a Ge lens. Ge has a big coefficient (n−1)=3.003 which is seven times as big as (n−1)=0.4 of quartz. This means that $L_3$ has the same refraction power as the quartz lens having a seven times larger curvature. $\rho_1 = -3994.603$ mm and $\rho_2 = -217.271$ mm give $L_3$ a short focal length 76.5 mm. Another lens $L_4$ of the third group is a positive meniscus lens. $L_4$ is made of ZnSe (n=2.403). $L_4$ has a focal length long 274 mm, since $\rho_1$=93.960 mm and $\rho_2$=124.297 mm.

The focal length of the third group is $f_3$=57 mm by coupling 76.5 mm of $L_3$ and 274 mm of $L_4$. This is a positive, quite short focal length having power bending rays inward to the central axis. The strong refraction generates strong negative spherical aberration and strong positive field curvature in the third group. The condition (b) requires a small $f_3$ and a strong positive refraction power. Embodiment 1 gives the rate $f_3/f$=0.56 for the whole focal length f=100 mm. The rate $f_3/f$=0.57 falls in the scope between 0.4 and 0.9 of the condition (b).

EMBODIMENT 2
(all aspherical four lenses (FIG. 5 to FIG. 8))

Figure 8:
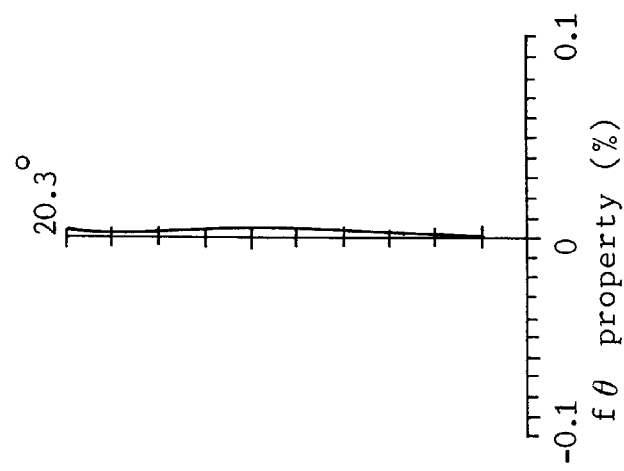
FIG. 8 is a graph showing the dependence of the fθ property upon angles of Embodiment 2. The ordinate is the incidence angel θ of the parallel rays into the lens (one division corresponds to two degrees). The abscissa is the deviation (%) from the fθ property.
Figure 7:
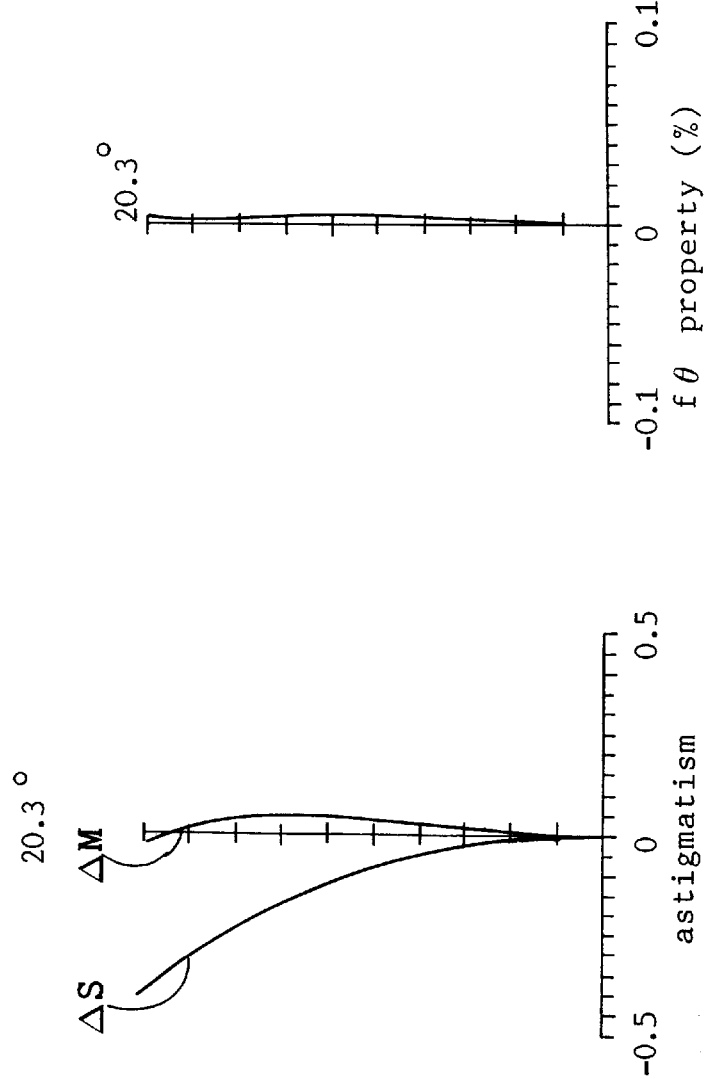
FIG. 7 is a graph of the angular distribution of the astigmatism of Embodiment 2. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 6:
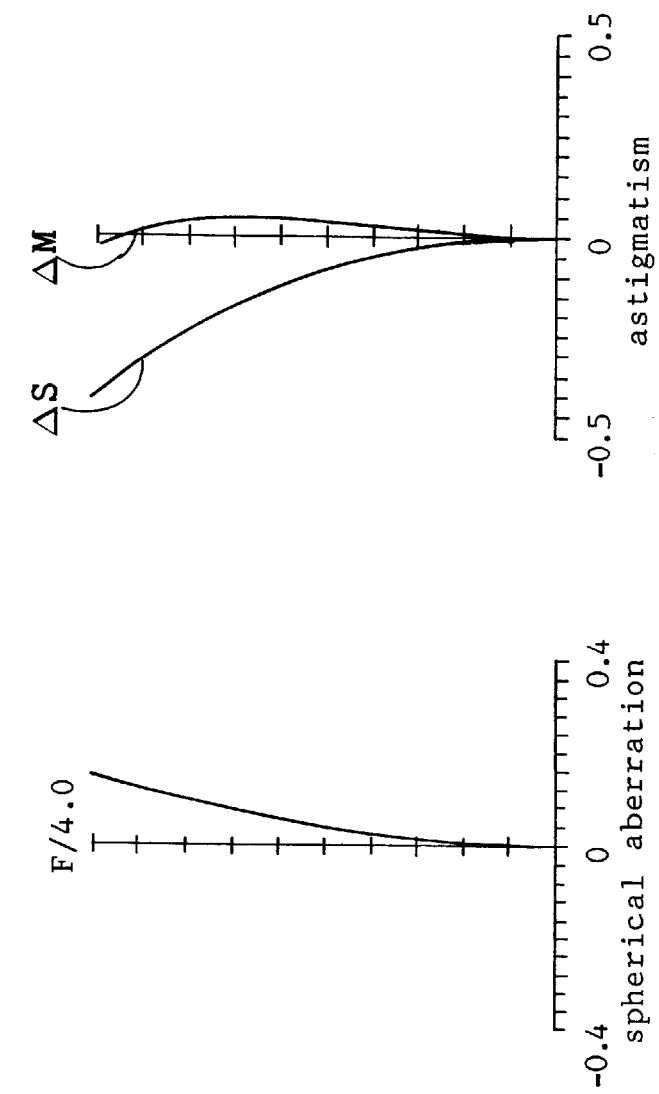
FIG. 6 is a graph of the spherical aberration distribution of Embodiment 2 in the height direction on the lens. The ordinate is the ray height on the lens (one division means a 1.25 mm length). The abscissa is the spherical aberration.

An assembly of four aspherical lenses can realize this invention. FIG. 5 shows the lens composition of Embodiment 2. FIG. 6 denotes the spherical aberration. FIG. 7 shows the astigmatism. FIG. 8 exhibits the fθ property.

As explained before, the use of aspherical lenses enhances the freedom of design and facilities the cancellation of aberration. Embodiment 2 uses four lenses $L_1$, $L_2$, $L_3$ and $L_4$ which all have at least one aspherical surface. Table 2 denotes the parameters of Embodiment 2. Aspherical surfaces are assigned to the image-side surface $S_2$ of $L_1$, the image-side surface $S_4$ of $L_2$, the image-side surface $S_6$ of $L_3$ and the object-side surface $S_7$ of $L_4$. Table 3 shows the aspherical coefficients of Embodiment 2.

Among four lenses, the first lens $L_1$, the second lens $L_2$ and the fourth lens $L_4$ are made of zinc selenide ZnSe of n=2.403. The third lens $L_3$ is made of germanium Ge of n=4.003. The focal lengths and the distance are f=100 mm, $f_2$=−169 mm, $f_3$=85 mm and d=226 mm. Thus, the normalized focal lengths and the normalized distance are $f_2/f$=−1.69, $f_3/f$=0.85 and d/f=2.26. These parameters lie in the scopes defined by the conditions (a) to (c). The parameter $f_3/f$=0.85 exists near the upper limit (0.9). The astigmatism ΔS on the sagittal direction increases at more than 12 degrees. Other kinds of aberration are satisfactory. The fθ property is sufficient. The deviation is less than 0.005% in the fθ property.

EMBODIMENT 3
(two aspherical lenses and two spherical lenses (FIG. 9 to FIG. 12))

Two of four lenses are aspherical. The other two lenses are spherical. FIG. 9 shows the lens composition of Embodiment 3. FIG. 10 denotes the spherical aberration. FIG. 11 shows the astigmatism. FIG. 12 exhibits the fθ property.

Embodiment 3 uses four lenses $L_1$, $L_2$, $L_3$ and $L_4$. $L_1$ and $L_2$ have aspherical surfaces. The image-side $S_2$ of $L_1$ and the image-side $S_4$ of $L_2$ are aspherical. The other surfaces are spherical. Table 4 shows the lens parameters of Embodiment 3. Table 5 exhibits the aspherical coefficients.

TABLE 2

Lens data of the f θ lens of Embodiment 2

| Group No. | Lens No. | Surface No. | Curvature Radius (mm) | Thickness Spacing (mm) | Refractive Index n |
|---|---|---|---|---|---|
| | | front focus | | 42.851 | |
| $G_1$ | $L_1$ | $S_1$ | 107.305 | 6.800 | 2.403 |
| | | $S_2$ | Table 3 | 11.600 | |
| $G_2$ | $L_2$ | $S_3$ | −104.489 | 11.600 | 2.403 |
| | | $S_4$ | Table 3 | 29.800 | |
| $G_3$ | $L_3$ | $S_5$ | −6388.903 | 15.200 | 4.003 |
| | | $S_6$ | Table 3 | 1.000 | |
| | $L_4$ | $S_7$ | Table 3 | 11.800 | 2.403 |
| | | $S_8$ | 320.612 | 95.111 | |

TABLE 4

Lens data of the f θ lens of Embodiment 3

| Group No. | Lens No. | Surface No. | Curvature Radius (mm) | Thickness Spacing (mm) | Refractive Index n |
|---|---|---|---|---|---|
| | | front focus | | 59.027 | |
| $G_1$ | $L_1$ | $S_1$ | 150.734 | 14.700 | 2.403 |
| | | $S_2$ | Table 5 | 7.800 | |
| $G_2$ | $L_2$ | $S_3$ | −176.602 | 11.800 | 2.403 |
| | | $S_4$ | Table 5 | 12.700 | |
| $G_3$ | $L_3$ | $S_5$ | −303.574 | 13.700 | 4.003 |
| | | $S_6$ | −131.461 | 4.800 | |
| | $L_4$ | $S_7$ | 166.440 | 12.200 | 2.403 |
| | | $S_8$ | 204.861 | 90.549 | |

TABLE 3

Aspherical lens data of Embodiment 2

| Surface No. | 1/c (mm) | k | $\alpha_2$ | $\alpha_3$ | $\alpha_4$ | $\alpha_5$ |
|---|---|---|---|---|---|---|
| $S_2$ | 142.057 | 4.779 | −1.787E−7 | −3.659E−11 | 4.576E−15 | −1.651E−18 |
| $S_4$ | −199.370 | 3.174 | 2.284E−7 | −1.121E−11 | −1.191E−14 | 2.557E−19 |
| $S_6$ | −193.332 | −2.056 | 2.004E−8 | 7.040E−13 | −3.550E−17 | 4.456E−20 |
| $S_7$ | 2363.909 | 0.000 | 2.967E−8 | −1.581E−13 | −5.356E−16 | 1.611E−19 |

TABLE 5

Aspherical lens data of Embodiment 3

| Surface No. | 1/c (mm) | k | $\alpha_2$ | $\alpha_3$ | $\alpha_4$ | $\alpha_5$ |
|---|---|---|---|---|---|---|
| $S_2$ | 451.116 | 32.787 | 4.089E−7 | −3.651E−11 | 6.611E−14 | −8.339E−18 |
| $S_4$ | 241.510 | −32.792 | −1.362E−7 | −3.961E−11 | 6.371E−15 | −5.189E−18 |

Among four lenses, the first lens $L_1$, the second lens $L_2$ and the fourth lens $L_4$ are made of zinc selenide (ZnSe) of n=2.403. The third lens $L_3$ is made of germanium (Ge) of n=4.003. The focal lengths and the distance are f=100 mm, $f_2$=−72 mm, $f_3$=62 mm and d=227 mm. Thus, the normalized focal lengths and the normalized distance are $f_2/f$=−0.72, $f_3/f$=0.62 and d/f =2.27. These parameters lie in the scopes defined by the conditions (a) to (c). The parameter d/f=2.27 exists near the upper limit (2.4). The spherical aberration is somewhat big. The field curvature ΔM on the meridional direction takes the maximum 0.18 at 12 degrees. Other kinds of aberration are satisfactory. The fθ property shows the largest value 0.085% at 14 degrees.

EMBODIMENT 4
(all aspherical three lenses (FIG. 13 to FIG. 16))

Figure 16:
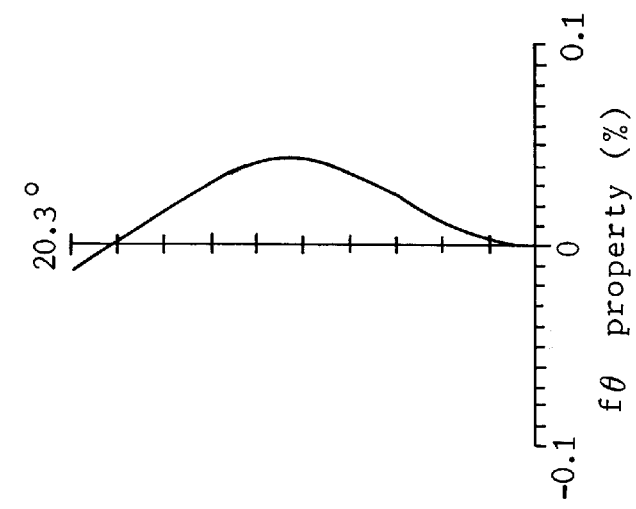
FIG. 16 is a graph showing the dependence of the fθ property upon angles of Embodiment 4. The ordinate is the incidence angel θ of the parallel rays into the lens (one division corresponds to two degrees). The abscissa is the deviation (%) from the fθ property.
Figure 15:
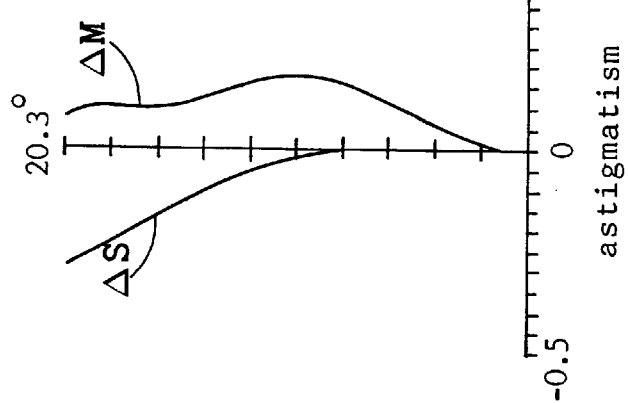
FIG. 15 is a graph of the angular distribution of the astigmatism of Embodiment 4. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 14:
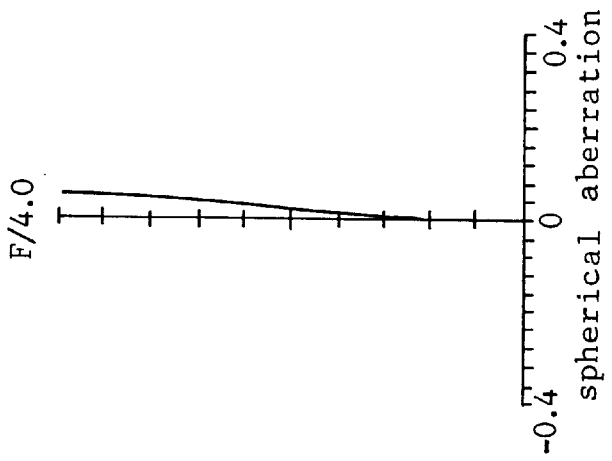
FIG. 14 is a graph of the spherical aberration distribut on of Embodiment 4 in the height direction on the lens. The ordinate is the ray height on the lens (one division means a 1.25 mm length). The abscissa is the spherical aberration.

FIG. 13 shows the lens composition of Embodiment 4. FIG. 14 denotes the spherical aberration. FIG. 15 shows the astigmatism. FIG. 16 exhibits the fθ property.

Embodiment 4 uses three lenses $L_1$, $L_2$ and $L_3$. The third group consists of the lens $L_3$ unlike the former embodiments. All the lenses $L_1$, $L_2$ and $L_3$ have an aspherical surface on either side. The object-side $S_1$ of $L_1$, the image-side $S_4$ of $L_2$ and the image-side $S_6$ of $L_3$ are aspherical. The other surfaces are spherical. Table 6 shows the lens parameters of Embodiment 4. Table 7 exhibits the aspherical coefficients.

TABLE 6

Lens data of the f θ lens of Embodiment 4

| Group No. | Lens No. | Surface No. | Curvature Radius (mm) | Thickness Spacing (mm) | Refractive Index n |
|---|---|---|---|---|---|
| | | front focus | | 46.515 | |
| $G_1$ | $L_1$ | $S_1$ | Table 7 | 6.700 | 2.403 |
| | | $S_2$ | 65.995 | 20.100 | |
| $G_2$ | $L_2$ | $S_3$ | −96.051 | 9.200 | 2.403 |
| | | $S_4$ | Table 7 | 15.100 | |
| $G_3$ | $L_3$ | $S_5$ | −646.708 | 14.200 | 4.003 |
| | | $S_6$ | Table 7 | 101.416 | |

Among three lenses, the first lens $L_1$ and the second lens $L_2$ are made of zinc selenide ZnSe of n=2.403. The third lens $L_3$ is made of germanium Ge of n=4.003. The focal lengths and the distance are f=100 mm, $f_2$=−215 mm, $f_3$=80 mm and d=213 mm. Thus, the normalized focal lengths and the normalized distance are $f_2/f$=−2.15, $f_3/f$=0.80 and d/f=2.13. These parameters lie in the scopes defined by the conditions (a) to (c). The parameter $f_2/f$=−2.15 exists near the lower limit (−2.2) of the condition (a). The field curvature ΔM on the meridional direction takes the maximum 0.16 at 12 degrees. The field curvature ΔS on the sagittal direction takes the maximum 0.3 at 20.3 degrees. Other kinds of aberration are satisfactory. The fθ property shows the largest value 0.04% at 10 degrees.

EMBODIMENT 5
(four lenses, all aspherical lenses, all ZnSe (FIG. 17 to FIG. 20))

Figure 17:
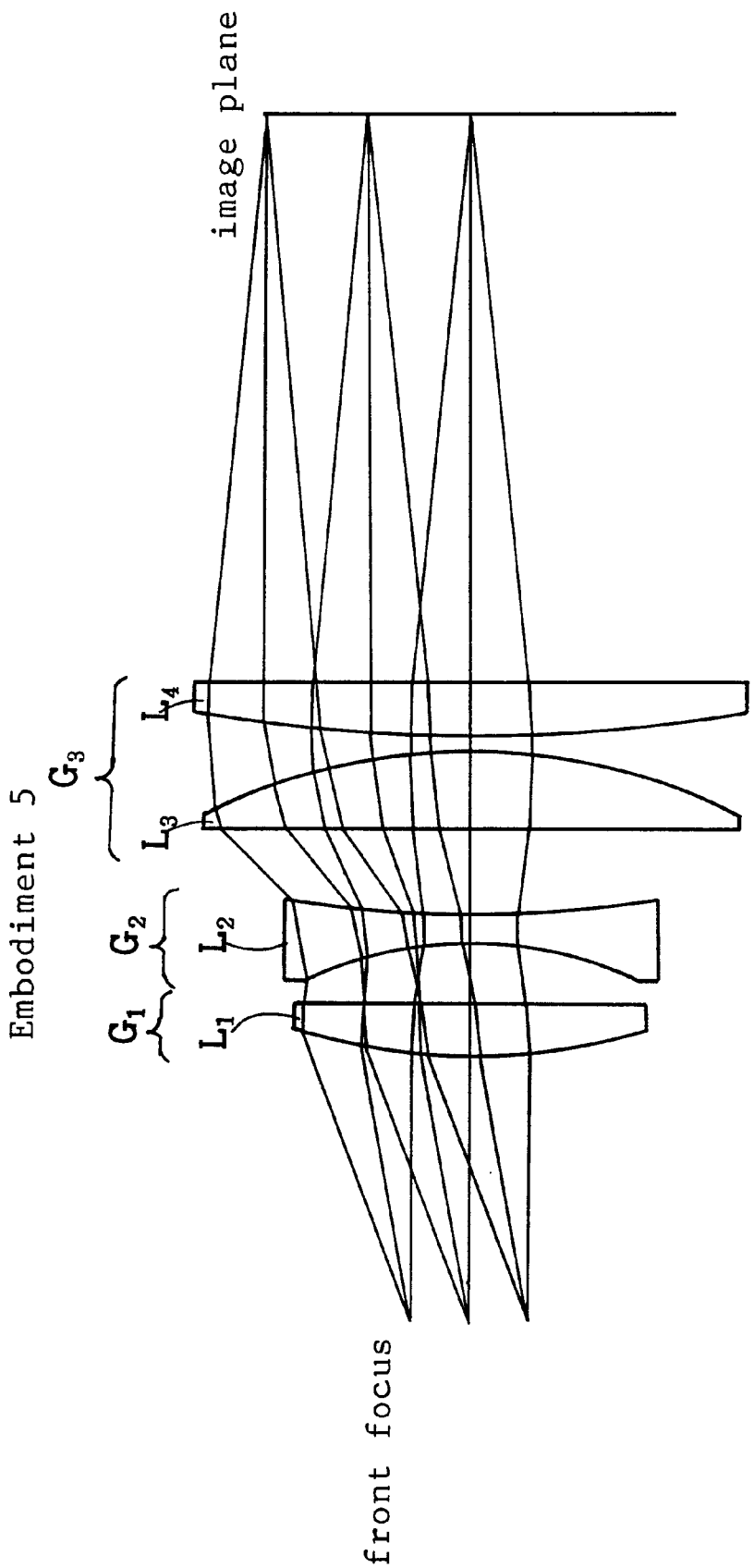
FIG. 17 is a sectional view of the fθ lens of showing the lens arrangement and the ray loci of Embodiment 5. $G_1$ is the first lens group. $G_2$ is the second lens group. $G_3$ is the third lens group. $L_1, L_2, L_3$ and $L_4$ are lenses composing Embodiment 5.
Figure 20:
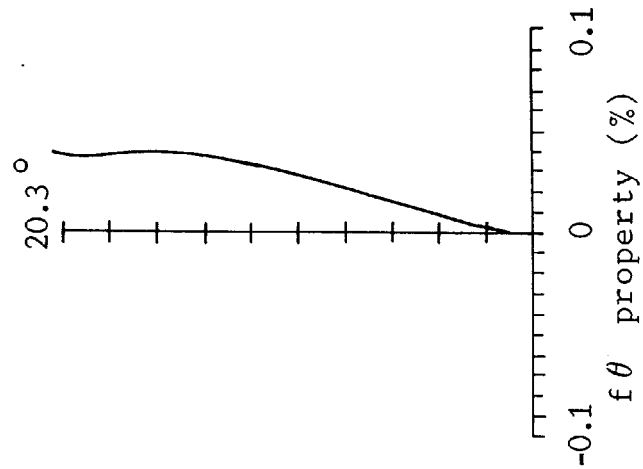
FIG. 20 is a graph showing the dependence of the fθ property upon angles of Embodiment 5. The ordinate is the incidence angel θ of the parallel rays into the lens (one division corresponds to two degrees). The abscissa is the deviation (%) from the fθ property.
Figure 19:
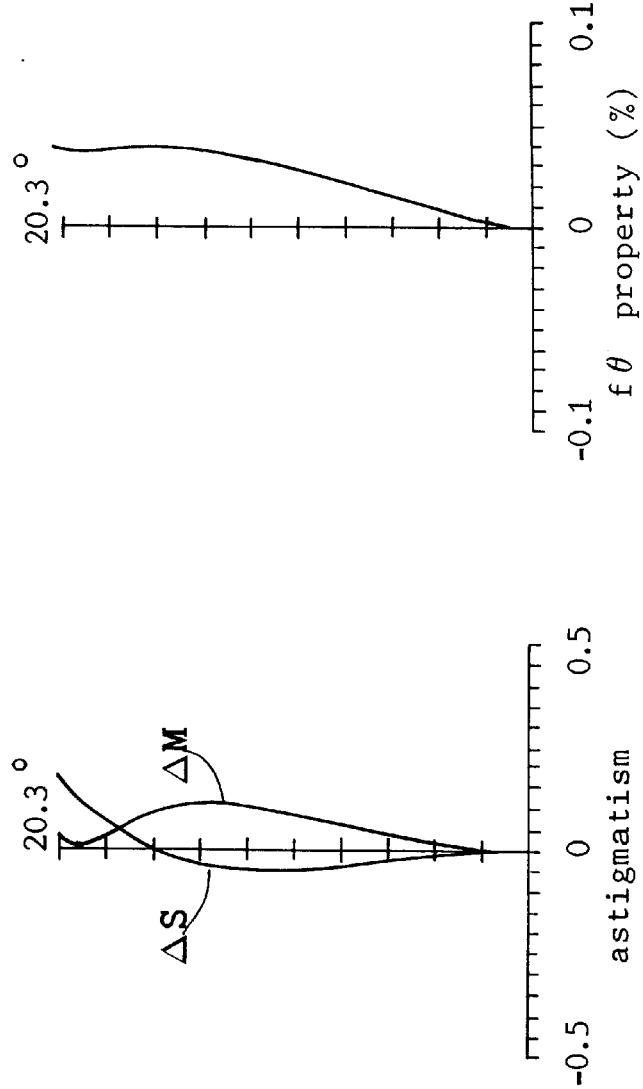
FIG. 19 is a graph of the angular distribution of the astigmatism of Embodiment 5. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 18:
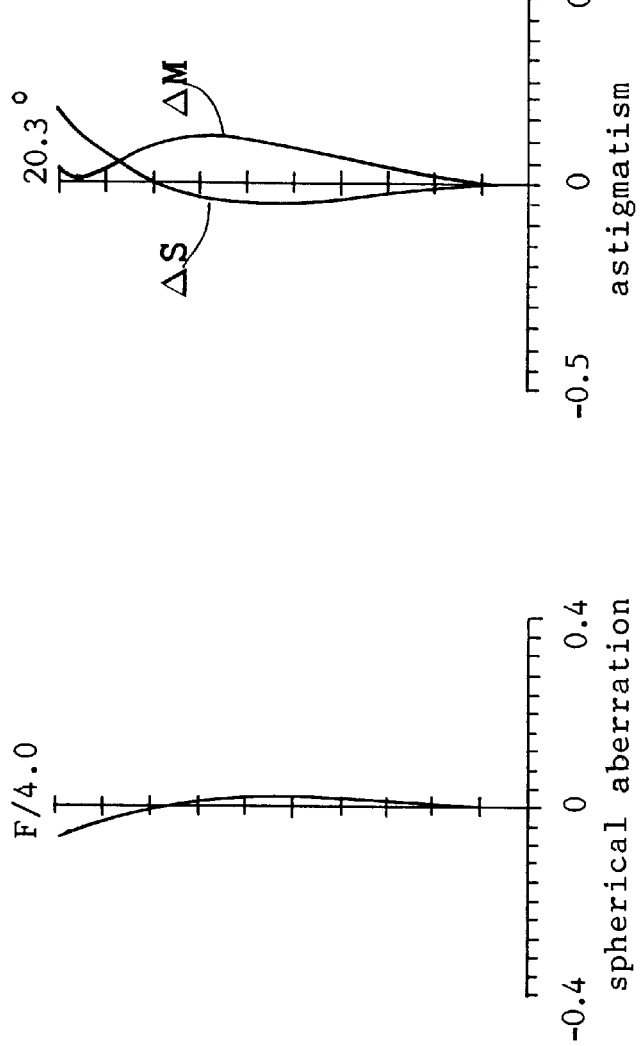
FIG. 18 is a graph of the spherical aberration distribution of Embodiment 5 in the height direction on the lens. The ordinate is the ray height on the lens (one division means a 1.25 mm length). The abscissa is the spherical aberration.

FIG. 17 shows the lens composition of Embodiment 5. FIG. 18 denotes the spherical aberration. FIG. 19 shows the astigmatism. FIG. 20 exhibits the fθ property.

As mentioned before, the use of aspherical lenses enhances the freedom of designing the fθ lens. Embodiment 5 uses four lenses $L_1$, $L_2$, $L_3$ and $L_4$. The third group consists of lenses $L_3$ and $L_4$. All the lenses $L_1$, $L_2$, $L_3$ and $L_4$ have an aspherical surface on either side. The object-side surface $S_1$ of $L_1$, the object-side $S_3$ of $L_2$, the image-side $S_6$ of $L_3$ and the object-side $S_7$ of $L_4$ are aspherical. The other surfaces are spherical. Table 8 shows the lens parameters of Embodiment 5. Table 9 exhibits the aspherical coefficients.

TABLE 8

Lens data of the f θ lens of Embodiment 5

| Group No. | Lens No. | Surface No. | Curvature Radius (mm) | Thickness Spacing (mm) | Refractive Index n |
|---|---|---|---|---|---|
| | | front focus | | 46.609 | |
| $G_1$ | $L_1$ | $S_1$ | Table 9 | 9.300 | 2.403 |
| | | $S_2$ | ∞ | 10.300 | |
| $G_2$ | $L_2$ | $S_3$ | Table 9 | 4.900 | 2.403 |

TABLE 7

Aspherical lens data of Embodiment 4

| Surface No. | 1/c (mm) | k | $\alpha_2$ | $\alpha_3$ | $\alpha_4$ | $\alpha_5$ |
|---|---|---|---|---|---|---|
| $S_1$ | 64.995 | −0.369 | −1.243E−8 | −2.489E−11 | 3.776E−14 | −1.219E−17 |
| $S_4$ | −148.807 | −1.365 | −3.133E−8 | −5.488E−11 | −5.037E−15 | 6.088E−18 |
| $S_6$ | −177.287 | −1.359 | −3.708E−9 | 1.504E−12 | 1.890E−15 | −6.390E−19 |

TABLE 8-continued

Lens data of the f θ lens of Embodiment 5

| Group No. | Lens No. | Surface No. | Curvature Radius (mm) | Thickness Spacing (mm) | Refractive Index n |
|---|---|---|---|---|---|
| | | $S_4$ | 194.596 | 14.900 | |
| $G_3$ | $L_3$ | $S_5$ | ∞ | 13.500 | 2.403 |
| | | $S_6$ | Table 9 | 2.500 | |
| | $L_4$ | $S_7$ | Table 9 | 9.400 | 2.403 |
| | | $S_8$ | ∞ | 99.034 | |

TABLE 9

Aspherical lens data of Embodiment 5

| Surface No. | 1/c (mm) | k | $\alpha_2$ | $\alpha_3$ | $\alpha_4$ | $\alpha_5$ |
|---|---|---|---|---|---|---|
| $S_1$ | 98.295 | −1.816 | 7.959E−9 | 3.459E−10 | −3.229E−13 | 1.928E−16 |
| $S_3$ | −56.823 | −5.536 | −7.420E−7 | 3.117E−11 | 2.827E−13 | −2.458E−16 |
| $S_6$ | −98.286 | −0.602 | 1.004E−7 | −7.903E−11 | 2.823E−14 | −5.878E−18 |
| $S_7$ | 224.939 | −0.509 | −2.286E−7 | 1.134E−11 | 6.130E−15 | −2.419E−18 |

All four lenses $L_1$, $L_2$, $L_3$ and $L_4$ are made of zinc selenide (ZnSe) of n=2.403. The focal lenghts and the distance are f=100 mm, $f_2$=−31 mm, $f_3$=49 mm and d=210 mm. Thus, the normalized focal lengths and the normalized distance are $f_2/f$=−0.31, $f_3/f$=0.49 and d/f=2.10. These parameters exist in the scopes defined by the conditions (a) to (c). The parameter $f_2/f$=−0.31 lies near the upper limit (−0.3) of the condition (a). Another parameter $f_3/f$=0.49 lies near the lower limit (0.4) of the condition (b). $L_3$ made of ZnSe is endowed with the short focal length $f_3$ due to the curvature of the image-side $S_6$. The field curvature ΔM and ΔS are small. The fθ property shows good linearity with small deviation less than 0.04%.

EMBODIMENT 6

(four lenses, all aspherical lenses, all ZnSe (FIG. 21 to FIG. 24))

Figure 22:
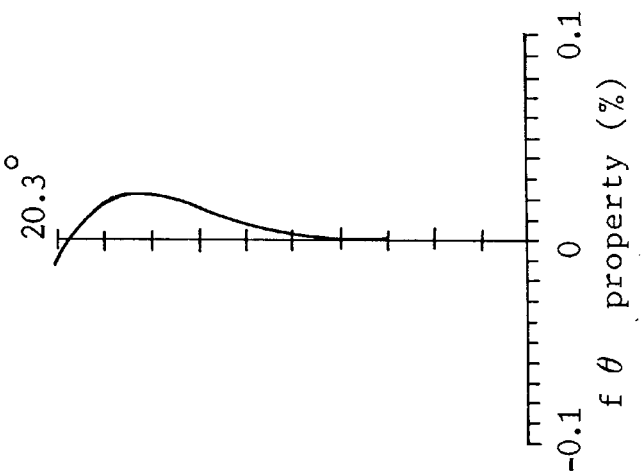
FIG. 22 is a graph of the spherical aberration distribution of Embodiment 6 in the height direction on the lens. The ordinate is the ray height on the lens (one division means a 1.25 mm length). The abscissa is the spherical aberration.
Figure 23:
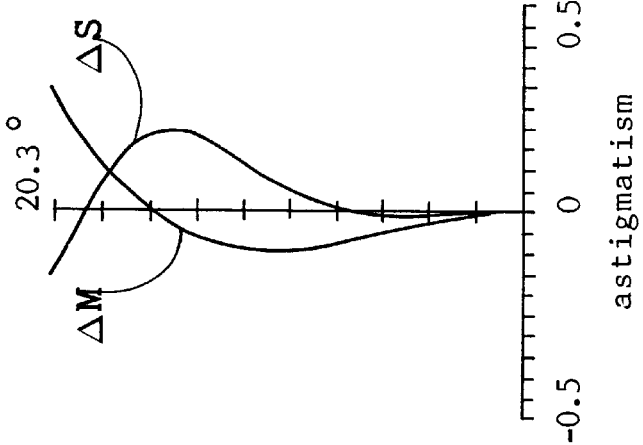
FIG. 23 is a graph of the angular distribution of the astigmatism of Embodiment 6. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 24:
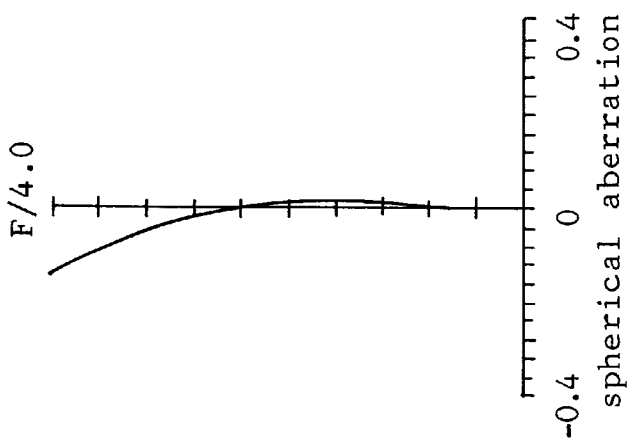
FIG. 24 is a graph showing the dependence of the fθ property upon angles of Embodiment 6. The ordinate is the incidence angel θ of the parallel rays into the lens (one division corresponds to two degrees). The abscissa is the deviation (%) from the fθ property.

FIG. 21 shows the lenses composition of Embodiment 6. FIG. 22 denotes the spherical aberration. FIG. 23 shows the astigmatism. FIG. 24 exhibits the fθ property.

Embodiment 6 has a lens structure similar to Embodiment 5. All lenses have an aspherical surface on either side. Embodiment 5 uses four lenses $L_1$, $L_2$, $L_3$ and $L_4$. The object-side surface $S_1$ of $L_1$, the object-side $S_3$ of $L_2$, the image-side $S_6$ of $L_3$ and the object-side $S_7$ of $L_4$ are aspherical. The other surfaces are spherical. Table 10 shows the lens parameters of Embodiment 6. Table 11 exhibits the aspherical coefficients.

TABLE 10

Lens data of the f θ lens of Embodiment 6

| Group No. | Lens No. | Surface No. | Curvature Radius (mm) | Thickness Spacing (mm) | Refractive Index n |
|---|---|---|---|---|---|
| | | front focus | | 45.075 | |
| $G_1$ | $L_1$ | $S_1$ | Table 11 | 15.700 | 2.403 |
| | | $S_2$ | ∞ | 14.600 | |
| $G_2$ | $L_2$ | $S_3$ | Table 11 | 4.100 | 2.403 |
| | | $S_4$ | 194.437 | 11.100 | |
| $G_3$ | $L_3$ | $S_5$ | ∞ | 13.600 | 2.403 |
| | | $S_6$ | Table 11 | 2.100 | |
| | $L_4$ | $S_7$ | Table 11 | 9.300 | 2.403 |
| | | $S_8$ | ∞ | 91.771 | |

TABLE 11

Aspherical lens data of Embodiment 6

| Surface No. | 1/c (mm) | k | $\alpha_2$ | $\alpha_3$ | $\alpha_4$ | $\alpha_5$ |
|---|---|---|---|---|---|---|
| $S_1$ | 120.118 | −2.994 | −4.383E−8 | 2.335E−10 | −3.533E−13 | 1.202E−16 |
| $S_3$ | −58.739 | −5.649 | −4.140E−7 | 9.640E−11 | 3.347E−13 | −1.385E−16 |
| $S_6$ | −91.244 | −0.909 | 1.329E−7 | −9.518E−11 | 3.095E−14 | −4.770E−18 |
| $S_7$ | 190.869 | −0.285 | −2.098E−7 | 1.719E−11 | 4.429E−15 | −1.408E−18 |

All four lenses $L_1$, $L_2$, $L_3$ and $L_4$ are made of zinc selenide (ZnSe) of n=2.403. The focal lengths and the distance are f=100 mm, $f_2$=−32 mm, $f_3$=45 mm and d=207 mm. Thus, the normalized focal lengths and the normalized distance are $f_2/f$=−0.32, $f_3/f$=0.45 and d/f=2.07. These parameters exist in the scopes defined by the conditions (a) to (c). These parameters are similar to Embodiment 5. The parameter $f_2/f$=−0.32 lies near the upper limit (−0.3) of the condition (a). The parameter $f_3/f$=0.45 lies near the lower limit (0.4) of the condition (b). $L_3$ made of ZnSe is endowed with the short focal length $f_3$ due to the strong curvature of the image-side $S_6$. The spherical aberration is smaller. The field curvature ΔM and ΔS are larger than Embodiment 5. The fθ property is further improved better than Embodiment 5. The fθ deviation rises from 0 degree, takes the maximum 0.02 at 17 degrees and decreases.

[Wavefront aberration in the two-dimensional scanning region in the embodiments]

Table 12 shows the root mean squares (RMS; $(<\Sigma\Delta_{ij}^2/N>)^{1/2}$) of the wavefront aberration at four points in images of Embodiments 1 to 6. (i,j) means a point in the scanning region. $\Delta_{ij}$ is an error of the wavefront from the ideal wavefront which is estimated by a rate to a wavelength $\lambda$ at (i,j). Since the beam scanning is two dimensional, there are a plenty of scanning points unlike the conventional one-dimensional scanning in laser printers or laser COMs. In spite of a large number of scanning points, it is possible to calculate the wavefront aberration at all points. The Inventor of the present invention has calculated the wavefront aberration at all points for all embodiments and all comparison examples described here. However, the result is too enormous to write all in this description. The scanning region is −25 mm to +25 mm in the X-direction and −25 mm to +25 mm in the Y-direction. The region is described by the coordinate system having an origin at the center point. The region is divided into four subregions (x>0, y>0; x<0, y>0; x<0, y<0; x>0, y<0). These subregions are symmetric. Thus, it is sufficient to show the data of the wavefront aberration in the first subregion of x>0, y>0. The wavefront aberration is denoted at four points (0, 0), (25, 0), (0, 25) and (25, 25) in the first subregion. (0, 0) is the original point. (25, 0) is the end point on the X-axis. (0, 25) is the end point on the Y-axis. (25, 25) is the corner point on the orthogonal line. The unit of the coordinate is here millimeter (mm). The two-dimensional coordinate is defined on the image plane. The laser beam is swayed by the swaying (scanning) device, i.e., galvanomirrors in practice. The distance h in the image plane is proportional to the swaying angle $\theta$ as shown by h=f$\theta$. In an ideal one dimensional scanning, the angle at the corners would be 0.25 radian which is equal to 14.32 degrees. This invention, however, takes two-dimensional scanning and corrects angles at the corners in the X-direction and in the Y-direction. Thus, the angles at the corners are slightly different from the above value.

The RMS gives the minimum at the center (origin point; $\theta$=0) of the image. Any comparison examples give the RMS which is smaller than $\lambda/14$ (0.0714$\lambda$). Since the wavelength is $\lambda$=10.6 $\mu$m, $\lambda/14$ is 0.7571 $\mu$m. All the embodiments give the RMS of the wavefront aberration less than 0.15 $\mu$m at the origin.

An increase of swaying angle $\theta$ from the origin raises the wavefront aberration. But the increase of the aberration is neither monotonous nor simple. The mode of the increase or decrease of the wavefront aberration is different for each embodiment. The wavefront aberration takes the maximum at the end (25, 25) of the orthogonal line which is the corner of the scanning region. Embodiment 5 has small wavefront aberration (nearly equal to $\lambda/22$) even at the end orthogonal line. Consisting of spherical lenses, Embodiment 1 has the largest spherical aberration 0.070 $\lambda$ at the corner among the embodiments. But the wavefront aberration of Embodiment 1 is also less than $\lambda/14$ at the end (corner point) of the orthogonal line. This invention requires that the wavefront aberration should be smaller than $\lambda/14$. All the embodiments satisfy the requirement of the wavefront aberration being less than $\lambda/14$.

TABLE 12

RMS of wavefront aberration at typical points in the two-dimensional scanning region in the embodiments

| Embodiment No. | (0, 0) | (25, 0) | (0, 25) | (25, 25) |
|---|---|---|---|---|
| 1 | 0.006 | 0.024 | 0.016 | 0.070 |
| 2 | 0.005 | 0.032 | 0.030 | 0.050 |
| 3 | 0.013 | 0.039 | 0.035 | 0.052 |
| 4 | 0.002 | 0.033 | 0.034 | 0.052 |
| 5 | 0.003 | 0.006 | 0.008 | 0.043 |
| 6 | 0.006 | 0.010 | 0.029 | 0.060 |

[List of three conditions of the embodiments]

This invention requires the following three conditions (a) to (c) on the embodiments in common;

$$f_2/f = -2.2 \text{ to } -0.3 \quad (-2.2 \leq f_2/f \leq -0.3) \tag{a}$$

$$f_3/f = 0.4 \text{ to } 0.9 \quad (0.4 \leq f_3/f \leq 0.9) \tag{b}$$

$$d/f = 1.8 \text{ to } 2.4 \quad (1.8 \leq d/f \leq 2.4) \tag{c}$$

There are so many embodiments that it is difficult to understand the differences of the parameters (a) to (c) among the embodiments. Table 13 shows the related parameters of the embodiments.

TABLE 13

Parameters of conditions (a) to (c) of the six embodiments

| Embodiment No. | $f_2/f$ | $f_3/f$ | d/f |
|---|---|---|---|
| 1 | −0.62 | 0.57 | 1.88 |
| 2 | −1.69 | 0.85 | 2.26 |
| 3 | −0.72 | 0.62 | 2.27 |
| 4 | −2.15 | 0.80 | 2.13 |
| 5 | −0.31 | 0.49 | 2.10 |
| 6 | −0.32 | 0.45 | 2.07 |

[Comparison Example A ($f_2/f$ exceeds the lower limit; $f_2/f$ = −2.4)]

The f$\theta$ lens of the present invention requires the conditions (a) to (c) for $f_2$, $f_3$ and d. This invention declares that the f$\theta$ lens should have the parameters within the scope defined by (a) to (c). Long trial and error has taught the inventor the optimum conditions of (a) to (c). In a series of experiments, the inventor has made many f$\theta$ lenses having the parameters without the desired scope of (a) to (c). A part of the failure f$\theta$ lenses are now explained as comparison examples. The comparison examples have a parameter beyond the scope. But another parameters exist within the desired scope for clarifying the significance of the limits of the desired parameters. For all the comparison examples, the focal length is f=100 mm, the F-number is F=4, the scanning region is a square of 50 mm×50 mm and the wavelength is $\lambda$=10.6$\mu$m.

Figure 28:
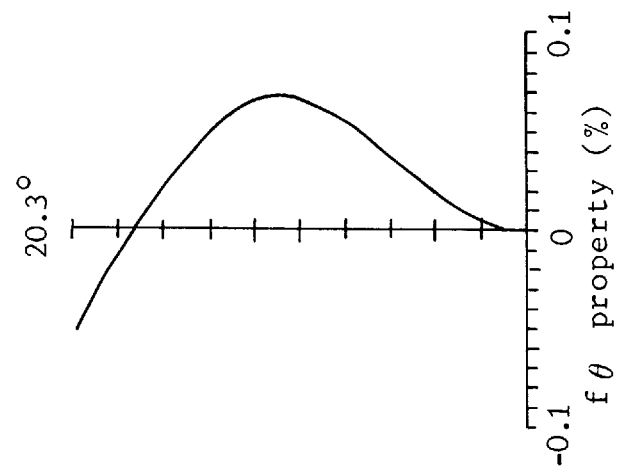
FIG. 28 is a graph showing the dependence of the fθ property upon angles of Comparison Example A. The ordinate is the incidence angel θ of the parallel rays into the lens (one division corresponds to two degrees). The abscissa is the deviation (%) from the fθ property.
Figure 27:
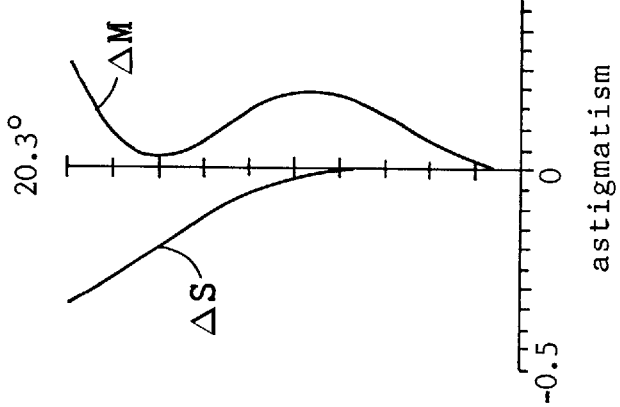
FIG. 27 is a graph of the angular distribution of the astigmatism of Comparison Example A. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 26:
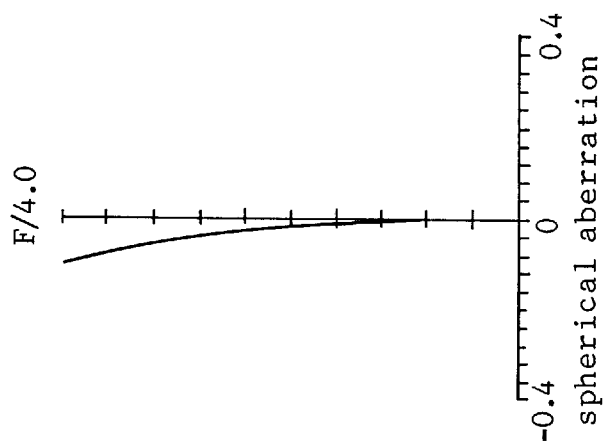
FIG. 26 is a graph of the spherical aberration distribution of Comparison Example A in the height direction on the lens. The ordinate is the ray height on the lens (one division means a 1.25 mm length). The abscissa is the spherical aberration.

The condition (a) requires $f_2/f$ should be restricted within the scope between −2.2 and −0.3. Comparison Example A has $f_2/f$=−2.4 which is smaller than the lower limit (−2.2) of $f_2/f$ FIG. 25 demonstrates the lens disposition of Comparison Example A. FIG. 26 shows the spherical aberration. FIG. 27 shows the astigmatism. FIG. 28 denotes the f$\theta$ property. Comparison Example A resembles Embodiment 4 ($f_2/f$=−2.15). The concave lens $L_2$ has the surfaces having smaller curvature difference between the front surface and the rear surface than Embodiment 4.

$L_2$ of $G_2$ has a focal length of $f_2$=−240 mm. Thus, $f_2/f$ is −2.4. Comparison of FIG. 27 (Comparison Example A) with FIG. 15 (Embodiment 4) implies an increase of the astigmatism in Comparison Example A. The deviation from the linearity of the fθ property is the largest at about 10 degrees.

TABLE 14

Lens data of the f θ lens of Comparison Example A

| Group No. | Lens No. | Surface No. | Curvature Radius (mm) | Thickness Spacing (mm) | Refractive Index n |
|---|---|---|---|---|---|
| | | front focus | | 50.034 | |
| $G_1$ | $L_1$ | $S_1$ | Table 15 | 7.400 | 2.403 |
| | | $S_2$ | 69.623 | 18.900 | |
| $G_2$ | $L_2$ | $S_3$ | −96.885 | 9.700 | 2.403 |
| | | $S_4$ | Table 15 | 13.800 | |
| $G_3$ | $L_3$ | $S_5$ | −599.818 | 12.600 | 4.003 |
| | | $S_6$ | Table 15 | 100.203 | |

TABLE 15

Aspherical lens data of Comparison Example A

| Surface No. | 1/c (mm) | k | $\alpha_2$ | $\alpha_3$ | $\alpha_4$ | $\alpha_5$ |
|---|---|---|---|---|---|---|
| $S_1$ | 68.183 | −0.370 | −1.118E−8 | −3.032E−11 | 3.891E−14 | −1.742E−18 |
| $S_4$ | −96.885 | −1.303 | −3.236E−8 | −5.099E−11 | −1.274E−15 | 1.390E−17 |
| $S_6$ | −176.599 | −1.330 | −4.038E−9 | 1.087E−12 | 1.479E−15 | −7.510E−19 |

In Comparison Example A, $f_2/f$ exceeds the lower limit (−2.2), which means smaller concave curvature of the second group lens $L_2$. The smaller curvature of $L_2$ causes a deficit in the corrections of the coma and the astigmatism of the second surface of the second lens group. The convergence of the beams is degraded at the corners (ends of the orthogonal lines) of the two-dimensional scanning region. The reason why $f_2/f$ should be restricted above −2.2 ($-2.2 \leq f_2/f$) has been clarified. The delinquency of($-2.2 \leq f_2/f$) would break the balance of $L_2$ to other groups due to too small spherical aberration of the first surface of $L_2$.

[Comparison Example B ($f_2/f$ exceeds the upper limit; $f_2/f=-0.26$)]

Figure 30:
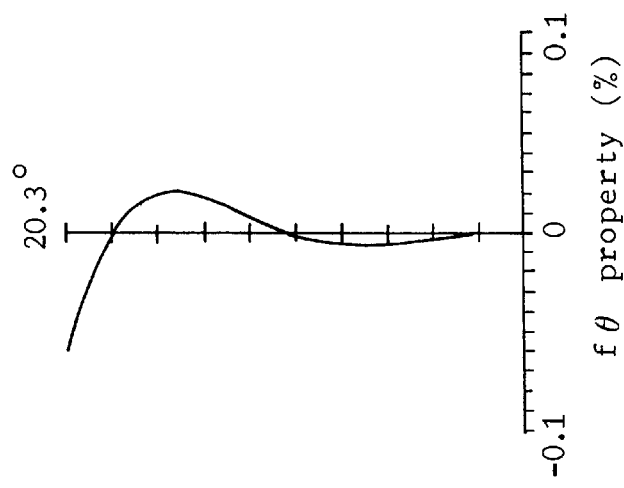
FIG. 30 is a graph of the spherical aberration distribution of Comparison Example B in the height direction on the lens. The ordinate is the ray height on the lens (one division means a 1.25 mm length). The abscissa is the spherical aberration.
Figure 31:
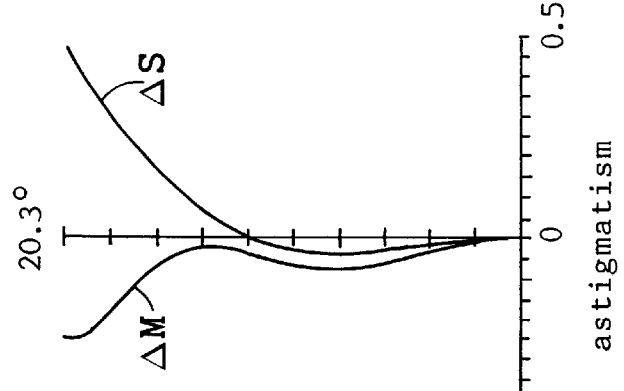
FIG. 31 is a graph of the angular distribution of the astigmatism of Comparison Example B. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 32:
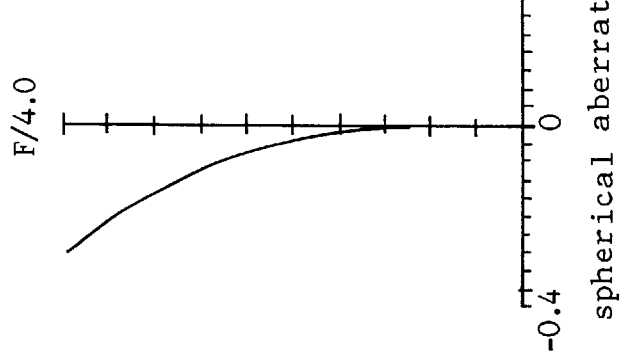
FIG. 32 is a graph showing the dependence of the fθ property upon angles of Comparison Example B. The ordinate is the incidence angel θ of the parallel rays into the lens (one division corresponds to two degrees). The abscissa is the deviation (%) from the fθ property.

The condition (a) requires $f_2/f$ should be restricted within the scope between −2.2 and −0.3. Unlike Comparison Example A, Comparison Example B has $f_2/f=-0.26$ which is larger than the upper limit −0.3 of $f_2/f$. FIG. 29 demonstrates the lens disposition of Comparison Example B. FIG. 30 shows the spherical aberration. FIG. 31 shows the astigmatism. FIG. 32 denotes the fθ property. Comparison Example B resembles Embodiment 5 ($f_2/f=-0.31$). The concave lens $L_2$ has the surfaces having larger curvature difference between the front surface and the rear surface than Embodiment 5.

$L_2$ of $G_2$ has a focal length of $f_2=-26$ mm. Thus, $f_2/f$ is −0.26. Comparison of FIG. 31 (Comparison Example B) with FIG. 19 (Embodiment 5) implies an increase of the astigmatism in Comparison Example B. The spherical aberration is also large. The deviation from the linearity of the fθ property is the largest at the corner (20.3 degrees).

TABLE 16

Lens data of the f θ lens of Comparison Example B

| Group No. | Lens No. | Surface No. | Curvature Radius (mm) | Thickness Spacing (mm) | Refractive Index n |
|---|---|---|---|---|---|
| | | front focus | | 43.391 | |
| $G_1$ | $L_1$ | $S_1$ | Table 17 | 9.700 | 2.403 |
| | | $S_2$ | −709.678 | 10.400 | |

TABLE 16-continued

Lens data of the f θ lens of Comparison Example B

| Group No. | Lens No. | Surface No. | Curvature Radius (mm) | Thickness Spacing (mm) | Refractive Index n |
|---|---|---|---|---|---|
| $G_2$ | $L_2$ | $S_3$ | Table 17 | 4.000 | 2.403 |
| | | $S_4$ | 148.754 | 13.900 | |
| $G_3$ | $L_3$ | $S_5$ | 10784.700 | 15.100 | 2.403 |
| | | $S_6$ | Table 17 | 5.600 | |
| | $L_4$ | $S_7$ | Table 17 | 9.200 | 2.403 |
| | | $S_8$ | −2143.0427 | 97.063 | |

TABLE 17

Aspherical lens data of Comparison Example B

| Surface No. | 1/c (mm) | k | $\alpha_2$ | $\alpha_3$ | $\alpha_4$ | $\alpha_5$ |
|---|---|---|---|---|---|---|
| $S_1$ | 94.402 | −1.618 | 7.165E−8 | 4.020E−10 | −3.176E−13 | 2.303E−16 |
| $S_3$ | −49.081 | −4.700 | −9.143E−7 | 8.370E−12 | 2.531E−13 | −2.408E−16 |
| $S_6$ | −90.991 | −0.444 | 9.650E−8 | −9.498E−11 | 2.444E−14 | −4.136E−18 |
| $S_7$ | 238.841 | −1.428 | −2.472E−7 | 4.967E−12 | 8.059E−15 | −2.910E−18 |

In Comparison Example B, $f_2/f$ exceeds the upper limit (−0.3), which means larger concave curvature of the second group lens $L_2$. The larger curvature of $L_2$ can be easily noticed by a glimpse of FIG. 17 (Embodiment 5) and FIG. 29 (Comparison Example B). The excess $f_2/f$ beyond the upper limit causes imbalance among the different kinds of aberration and, in particular, enhances the astigmatism. Among two deflecting points, the farther deflecting point from the lens has a tendency of bending the meridional image plane toward the under-side and bending the sagittal image toward the over-side, which induces large astigmatism, as shown in FIG. 31.

The excess $f_2/f$ (>−0.3) decreases the convergence at the corners of the two-dimensional scanning region. On the contrary, the nearer deflecting point from the lens has a tendency of bending the meridional image plane toward the sagittal direction and inducing the higher order image curvature aberration. The image deforms to the over-side. The reason why $f_2/f$ should be restricted below −0.3 ($f_2/f \leq -0.3$) has been clarified.

[Comparison Example C ($f_3/f$ exceeds the lower limit; $f_3/f=0.38$)]

Figure 36:
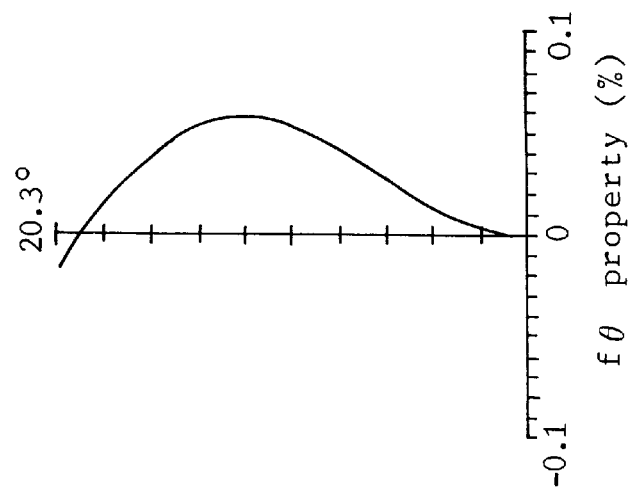
FIG. 36 is a graph showing the dependence of the fθ property upon angles of Comparison Example C. The ordinate is the incidence angel θ of the parallel rays into the lens (one division corresponds to two degrees). The abscissa is the deviation (%) from the fθ property.
Figure 35:
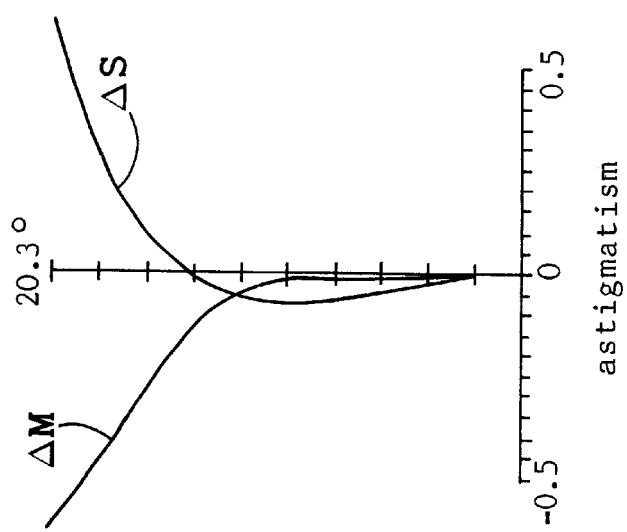
FIG. 35 is a graph of the angular distribution of the astigmatism of Comparison Example C. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 34:
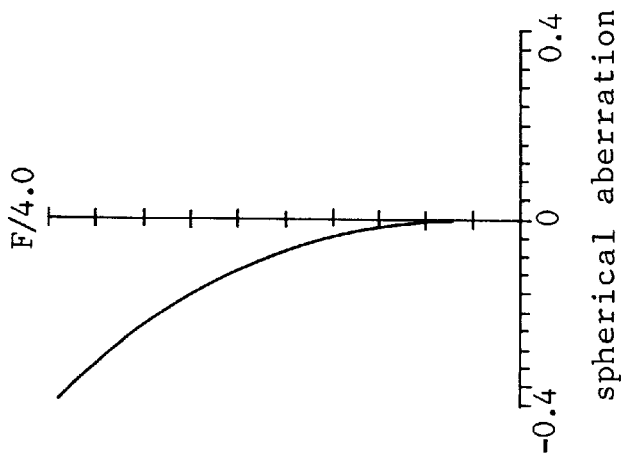
FIG. 34 is a graph of the spherical aberration distribution of Comparison Example C in the height direction on the lens. The ordinate is the ray height on the lens (one division means a 1.25 mm length). The abscissa is the spherical aberration.

The condition (b) requires $f_3/f$ should be restricted within the scope between 0.4 and 0.9. Comparison Example C has $f_3/f=0.38$ which is smaller than the lower limit 0.4 of $f_3/f$ FIG. 33 demonstrates the lens disposition of Comparison Example C. FIG. 34 shows the spherical aberration. FIG. 35 shows the astigmatism. FIG. 36 denotes the fθ property. Comparison Example C resembles Embodiment 6 ($f_3/f=0.45$). Two plano-convex lens $L_3$ and $L_4$ included $G_3$ have larger curvature. The large curvature of $L_3$ shortens the focal length $f_3$. The focal length of $G_3(L_3$ and $L_4)$ is $f_3=38$ mm. Thus, $f_3/f=0.38$ which is smaller than 0.4. Comparison of FIG. 34 (Comparison Example C) with FIG. 22 (Embodiment 6) implies a conspicuous increase of the spherical aberration in Comparison Example C. The excess over 12 degrees induces large astigmatism (FIG. 35). Deviation from the linearity of the fθ property is the largest at the corner points.

In Comparison Example C, $f_3/f$ exceeds the lower limit (0.4), which means too large curvature of the third group lens $G_3$. The $f_3/f$ below 0.4 ($f_3/f<0.4$) disturbs the balance of the refractive power among lenses. The imbalance causes the decrease of the properties. Too strong curvature of the third group $G_3$ raises the coma and the astigmatism of $G_3$. The big coma and the big astigmatism of $G_3$ destroy the balance of the astigmatism and the coma with $G_2$. The imbalance decreases the convergence at the corners of two dimensional scanning region. An improvement of balancing the distortion with $G_2$ would induce an over correction of Petzval's sum, which would bend the image toward the over-side due to the higher order field curvature.

[Comparison Example D ($f_3/f$ exceeds the upper limit; $f_3/f=0.99$)]

Figure 37:
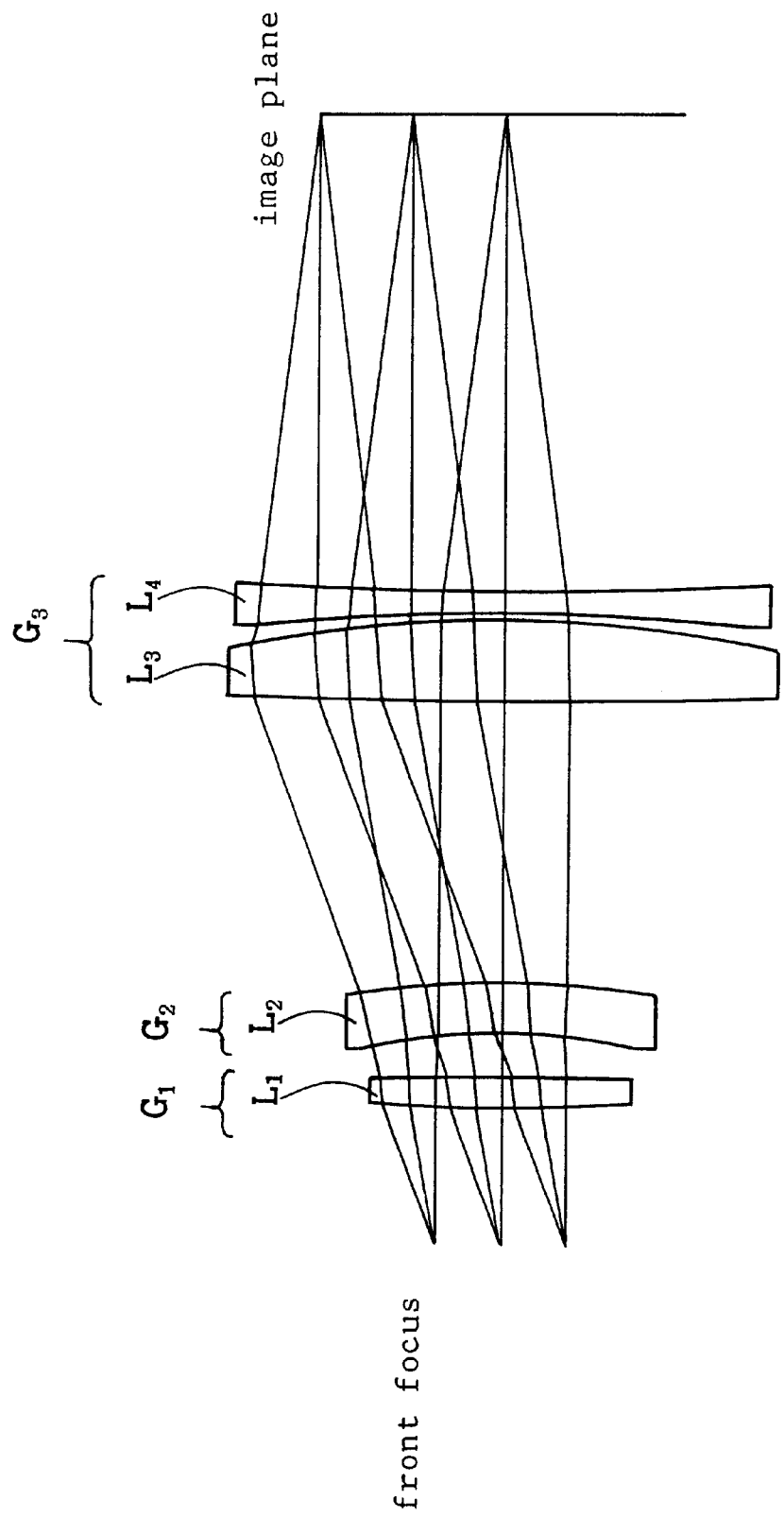
FIG. 37 is a sectional view of the fθ lens of showing the lens arrangement and the ray loci of Comparison Example D. $G_1$ is the first lens group. $G_2$ is the second lens group. $G_3$ is the third lens group. $L_1$, $L_2$, $L_3$ and $L_4$ are lenses composing Comparison Example D.
Figure 40:
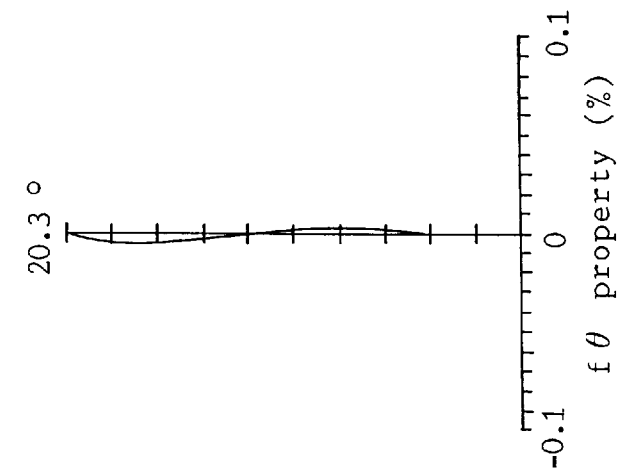
FIG. 40 is a graph showing the dependence of the fθ property upon angles of Comparison Example D. The ordinate is the incidence angel θ of the parallel rays into the lens (one division corresponds to two degrees). The abscissa is the deviation (%) from the fθ property.
Figure 39:
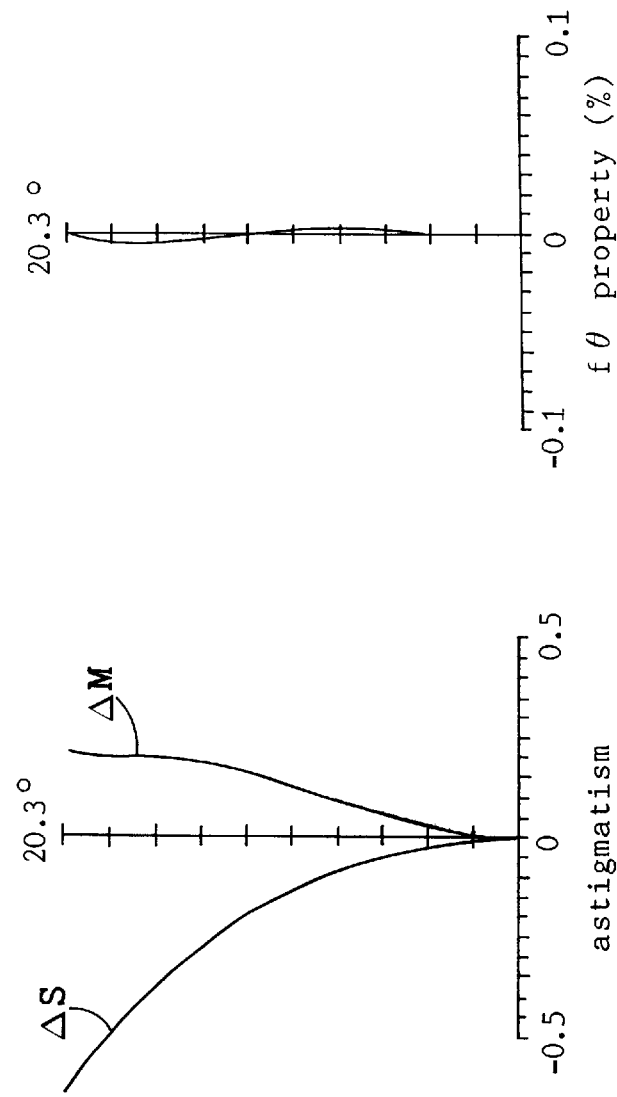
FIG. 39 is a graph of the angular distribution of the astigmatism of Comparison Example D. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 38:
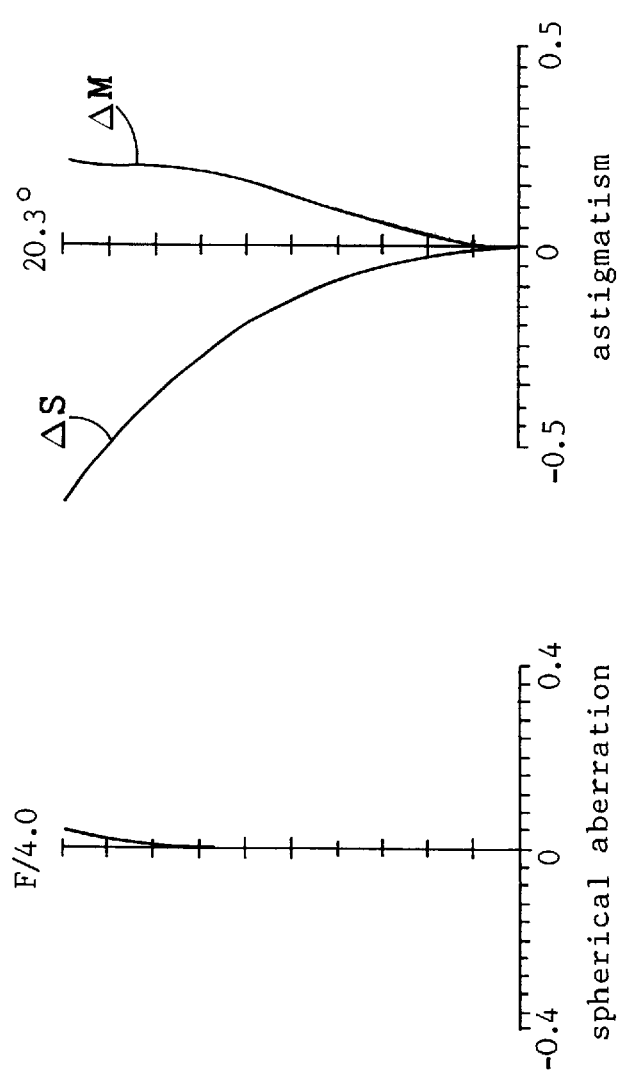
FIG. 38 is a graph of the spherical aberration distribution of Comparison Example D in the height direction on the lens. The ordinate is the ray height on the lens (one division means a 1.25 mm length). The abscissa is the spherical aberration.

The condition (b) requires $f_3/f$ should be restricted within the scope between 0.4 and 0.9. Unlike Comparison Example C, Comparison Example D has $f_3/f=0.99$ which is bigger than the upper limit 0.9 of $f_3/f$. FIG. 37 demonstrates the lens disposition of Comparison Example D. FIG. 38 shows the spherical aberration. FIG. 39 shows the astigmatism. FIG. 40 denotes the fθ property. Comparison Example D resembles Embodiment 2 ($f_3/f=0.85$). The refractive power of $G_3$ is weaker than Embodiment 2.

The focal length of $G_3$ ($L_3+L_4$) is $f_3=99$ mm. The ratio $f_3/f$ is 0.99. Comparison Example D (FIG. 39) has larger astigmatism than Embodiment 2 (FIG. 7). FIG. 38 suggests small spherical aberration. FIG. 40 implies good fθ property.

TABLE 18

Lens data of the f θ lens of Comparison Example C

| Group No. | Lens No. | Surface No. | Curvature Radius (mm) | Thickness Spacing (mm) | Refractive Index n |
|---|---|---|---|---|---|
| | | front focus | | 53.054 | |
| $G_1$ | $L_1$ | $S_1$ | Table 19 | 16.000 | 2.403 |
| | | $S_2$ | ∞ | 15.700 | |
| $G_2$ | $L_2$ | $S_3$ | Table 19 | 4.000 | 2.403 |
| | | $S_4$ | 185.510 | 6.600 | |
| $G_3$ | $L_3$ | $S_5$ | ∞ | 12.200 | 2.403 |
| | | $S_6$ | Table 19 | 1.000 | |
| | $L_4$ | $S_7$ | Table 19 | 15.900 | 2.403 |
| | | $S_8$ | ∞ | 87.913 | |

TABLE 20

Lens Data of the f θ Lens of Comparison Example D

| Group No. | Lens No. | Surface No. | Curvature Radius (mm) | Thickness Spacing (mm) | Refractive Index n |
|---|---|---|---|---|---|
| | | front focus | | 26.287 | |
| $G_1$ | $L_1$ | $S_1$ | 402.071 | 5.900 | 2.403 |
| | | $S_2$ | Table 21 | 8.700 | |
| $G_2$ | $L_2$ | $S_3$ | −104.444 | 9.200 | 2.403 |
| | | $S_4$ | Table 21 | 53.800 | |
| $G_3$ | $L_3$ | $S_5$ | 2113.454 | 15.800 | 4.003 |
| | | $S_6$ | Table 21 | 1.000 | |
| | $L_4$ | $S_7$ | Table 21 | 4.300 | 2.403 |
| | | $S_8$ | 855.181 | 92.083 | |

TABLE 19

Aspherical lens data of Comparison Example C

| Surface No. | 1/c (mm) | k | $\alpha_2$ | $\alpha_3$ | $\alpha_4$ | $\alpha_5$ |
|---|---|---|---|---|---|---|
| $S_1$ | 128.123 | −3.653 | −6.420E−8 | 1.741E−10 | −3.876E−13 | 1.493E−16 |
| $S_3$ | −52.547 | −5.405 | 5.288E−7 | 2.524E−10 | 1.471E−13 | −9.366E−17 |
| $S_6$ | −79.491 | −1.845 | 2.960E−7 | −1.547E−10 | 3.787E−14 | −3.389E−18 |
| $S_7$ | 158.967 | −0.010 | −2.186E−7 | 3.366E−11 | −5.764E−15 | 1.804E−18 |

TABLE 21

Aspherical lens data of Comparison Example D

| Surface No. | 1/c (mm) | k | $\alpha_2$ | $\alpha_3$ | $\alpha_4$ | $\alpha_5$ |
|---|---|---|---|---|---|---|
| $S_2$ | −942.046 | 0.000 | −1.134E−7 | 4.600E−11 | 4.115E−14 | 1.009E−18 |
| $S_4$ | −170.218 | 2.496 | 2.300E−7 | −2.217E−11 | −1.919E−14 | −7.905E−18 |
| $S_6$ | −229.588 | −2.149 | 2.136E−8 | 3.543E−13 | −8.137E−17 | 6.073E−20 |
| $S_7$ | −449.455 | 0.000 | 2.204E−8 | 1.480E−12 | −3.712E−16 | 1.285E−19 |

In Comparison Example D, $f_3/f$ exceeds the upper limit (0.9), which means too small curvature of the third group lens $G_3$. The excess $f_3/f$ ($f_3/f>0.9$) disturbs the balance of the spherical aberration, the coma and the astigmatism among $G_3$ and other lens groups. The imbalance causes the decrease of the convergence property all over the scanning region. An improvement of balancing the distortion with $G_2$ would induce positive Petzval's sum, which would invite field curvature and shorten the front working distance.

[Comparison Example E (d/f exceeds the lower limit; d/f= 1.77)]

Figure 41:
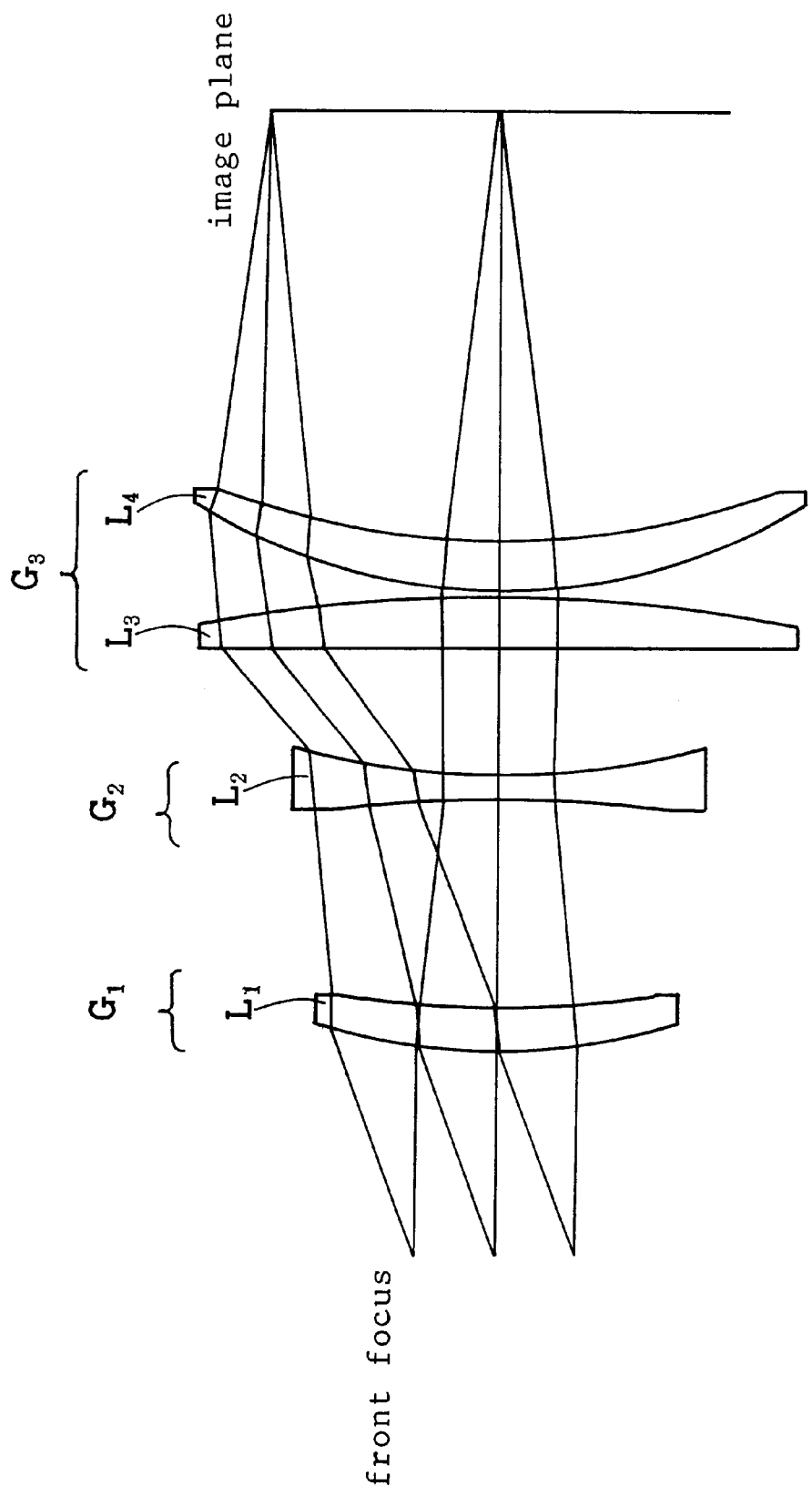
FIG. 41 is a sectional view of the fθ lens of showing the lens arrangement and the ray loci of Comparison Example E. $G_1$ is the first lens group. $G_2$ is the second lens group. $G_3$ is the third lens group. $L_1$, $L_2$, $L_3$ and $L_4$ are lenses composing Comparison Example E.
Figure 44:
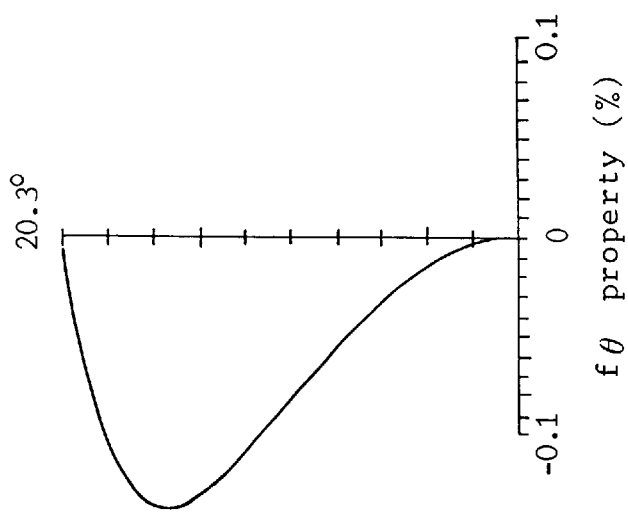
FIG. 44 is a graph showing the dependence of the fθ property upon angles of Comparison Example E. The ordinate is the incidence angel θ of the parallel rays into the lens (one division corresponds to two degrees). The abscissa is the deviation (%) from the fθ property.
Figure 43:
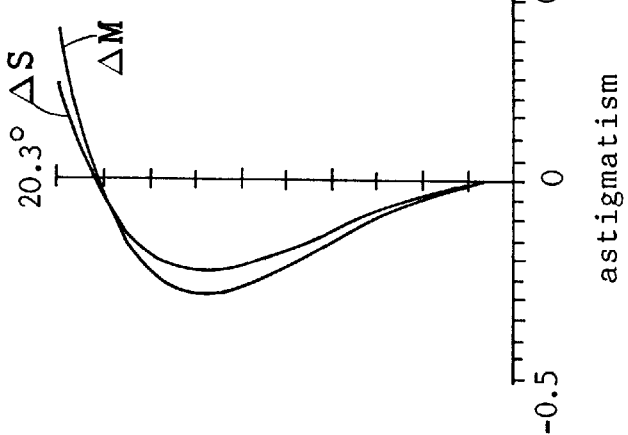
FIG. 43 is a graph of the angular distribution of the astigmatism of Comparison Example E. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 42:
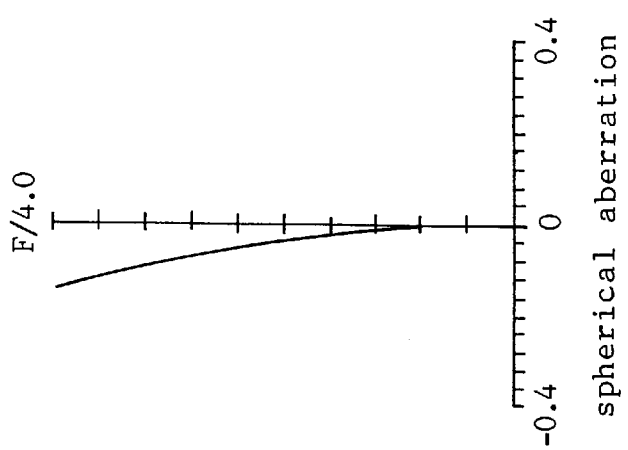
FIG. 42 is a graph of the spherical aberration distribution of Comparison Example E in the height direction on the lens. The ordinate is the ray height on the lens (one division means a 1.25 mm length). The abscissa is the spherical aberration.

The condition (c) requires d/f should be restricted within the scope between 1.8 and 2.4, which denotes a sufficiently long front working distance and back working distance. Comparison Example E has too small d/f=1.77 which is smaller than the lower limit 1.8. FIG. 41 demonstrates the lens disposition of Comparison Example E. FIG. 42 shows the spherical aberration. FIG. 43 shows the astigmatism. FIG. 44 denotes the fθ property. Comparison Example E resembles Embodiment 1 (d/f=1.88) Dispensing with aspherical lenses, Comparison Example E constructs the fθ lens system with only spherical lenses. Since d=177 mm, the ratio d/f is d/f=1.77. Too short d is caused by the short interval 31.750 mm between the front focus and L, and the short internal 66.420 mm between $L_3$ and the image plane.

Comparison Example E (FIG. 43) has larger astigmatism than Embodiment 1 (FIG. 3). Comparison of FIG. 2 with FIG. 42 suggests that Comparison Example E has better spherical aberration than Embodiment 1. FIG. 44, however, implies bad fθ property.

In Comparison Example E, d/f (1.77) exceeds down the lower limit (1.8), which incurs too strong negative distortion aberration. An improvement by inviting higher order positive distortion for balancing the negative distortion would degenerate the linearity of the fθ property, as shown in FIG. 44. The d/f below 1.8 shortens both the front working distance and the back working distance.

[Comparison Example F (d/f exceeds the upper limit; d/f =2.43)]

Figure 45:
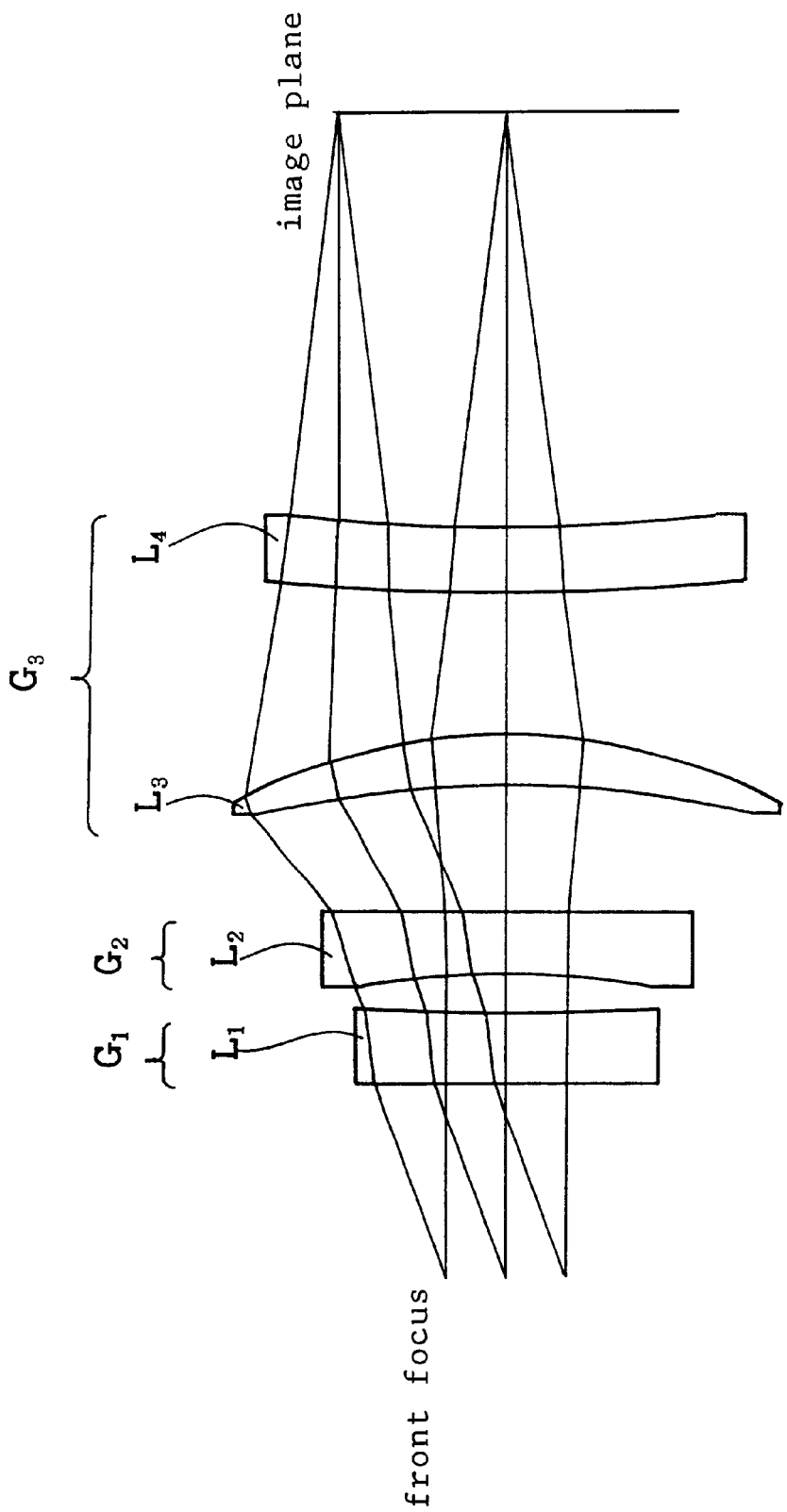
FIG. 45 is a sectional view of the fθ lens of showing the lens arrangement and the ray loci of Comparison Example F. $G_1$ is the first lens group. $G_2$ is the second lens group. $G_3$ is the third lens group. $L_1$, $L_2$, $L_3$ and $L_4$ are lenses composing Comparison Example F.
Figure 48:
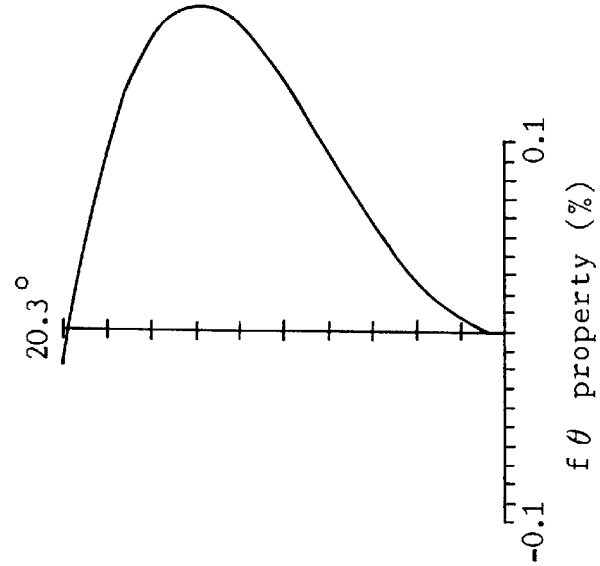
FIG. 48 is a graph showing the dependence of the fθ property upon angles of Comparison Example F. The ordinate is the incidence angel θ of the parallel rays into the lens (one division corresponds to two degrees). The abscissa is the deviation (%) from the fθ property.
Figure 47:
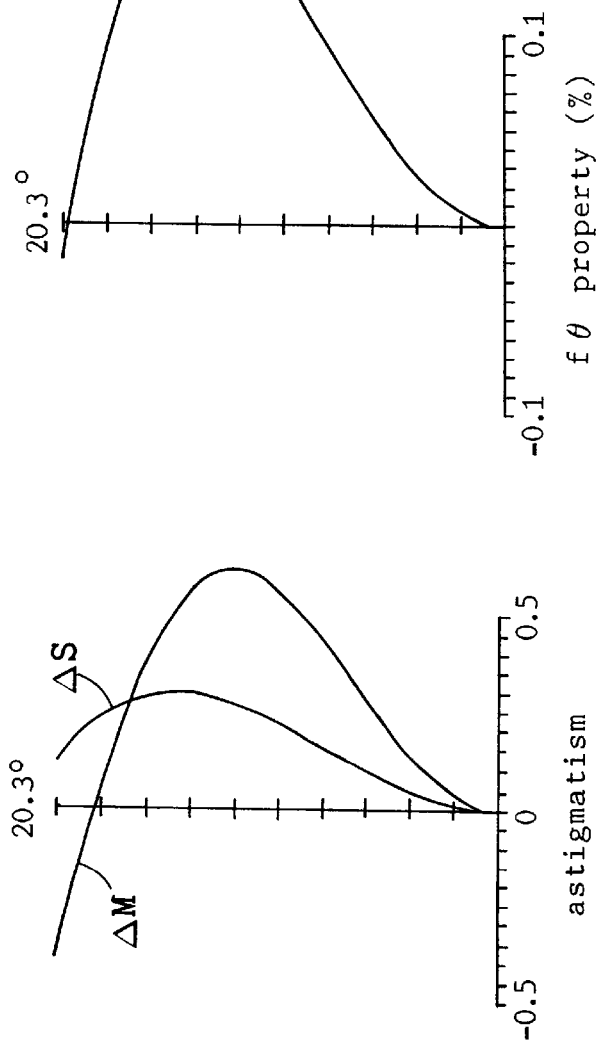
FIG. 47 is a graph of the angular distribution of the astigmatism of Comparison Example F. The ordinate is the incidence angle θ of the parallel rays (one division corresponds to two degrees). The abscissa denotes the meridional focus by ΔM and the sagittal focus by ΔS. The difference between ΔM and ΔS is the astigmatism.
Figure 46:
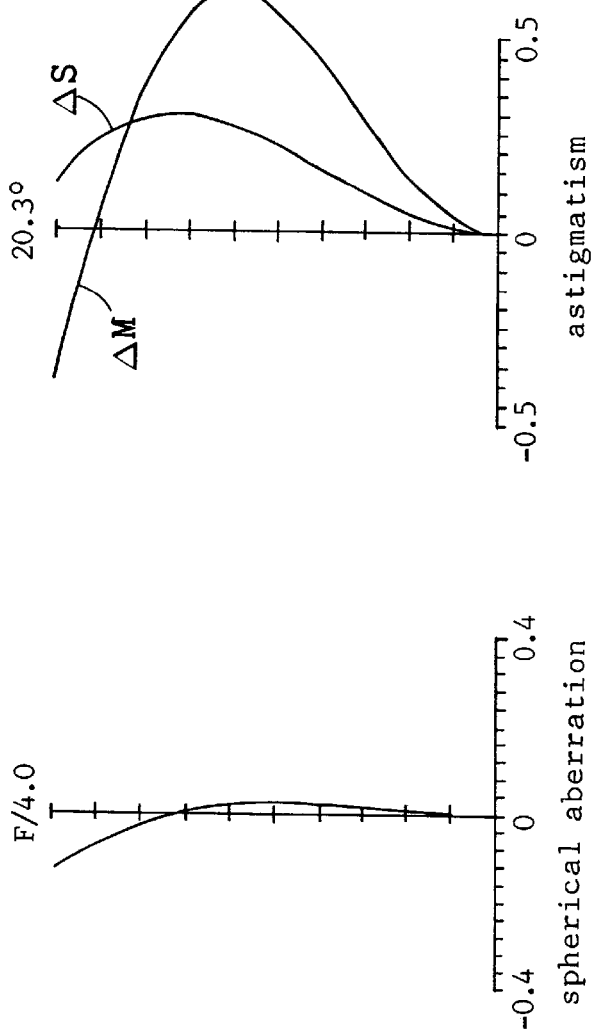
FIG. 46 is a graph of the spherical aberration distribution of Comparison Example F in the height direction on the lens. The ordinate is the ray height on the lens (one division means a 1.25 mm length). The abscissa is the spherical aberration.

The condition (c) requires d/f should be restricted within the scope between 1.8 and 2.4, which ensures a sufficiently long front working distance and back working distance. Too long d invites another drawback. Comparison Example F has too long d/f=2.43 which is longer than the upper limit 2.4 unlike Comparison Example E. FIG. 45 demonstrates the lens disposition of Comparison Example E. FIG. 46 shows the spherical aberration. FIG. 47 shows the astigmatism. FIG. 48 denotes the fθ property. Since d=243 mm, the ratio d/f is d/f=2.43. Too long d is caused by the long interval 25.500 mm between L, and $L_3$ and the long interval 29.500 mm between $L_3$ and $L_4$.

FIG. 47 shows large field curvature both for the sagittal aberration and the meridional rays even for small angles. ΔM takes the largest deviation 0.6 at 12 degrees and a negative large value −0.4 at 20 degrees. ΔS takes a big deviation 0.3 al 15 degrees. FIG. 48 suggests very poor fθ property. 14 degrees invites 0.16% of the deviation of the fθ property from the linearity, which is caused by too small refractive power and too small negative distortion of $L_1$.

TABLE 22

Lens data of the f θ lens of Comparison Example E

| Group No. | Lens No. | Surface No. | Curvature Radius (mm) | Thickness Spacing (mm) | Refractive Index n |
|---|---|---|---|---|---|
| | | front focus | | 31.750 | |
| $G_1$ | $L_1$ | $S_1$ | 89.694 | 6.900 | 2.403 |
| | | $S_2$ | 189.736 | 31.600 | |
| $G_2$ | $L_2$ | $S_3$ | −275.509 | 4.000 | 2.403 |
| | | $S_4$ | 125.159 | 19.300 | |
| $G_3$ | $L_3$ | $S_5$ | 3311.345 | 8.100 | 4.003 |
| | | $S_6$ | −254.034 | 1.000 | |
| | $L_4$ | $S_7$ | 90.907 | 7.500 | 2.403 |
| | | $S_8$ | 118.211 | 66.420 | |

TABLE 23

Lens data of the f θ lens of Comparison Example F

| Group No. | Lens No. | Surface No. | Curvature Radius (mm) | Thickness Spacing (mm) | Refractive Index n |
|---|---|---|---|---|---|
| | | front focus | | 40.403 | |
| $G_1$ | $L_1$ | $S_1$ | 2267.589 | 15.400 | 2.403 |
| | | $S_2$ | Table 24 | 7.200 | |
| $G_2$ | $L_2$ | $S_3$ | −198.551 | 13.400 | 2.403 |
| | | $S_4$ | Table 24 | 25.500 | |
| $G_3$ | $L_3$ | $S_5$ | −261.605 | 11.000 | 4.003 |
| | | $S_6$ | −120.401 | 29.500 | |
| | $L_4$ | $S_7$ | 557.056 | 13.600 | 2.403 |
| | | $S_8$ | 408.639 | 86.601 | |

TABLE 24

Aspherical lens data of Comparison Example F

| Surface No. | 1/c (mm) | k | $a_2$ | $a_3$ | $a_4$ | $a_5$ |
|---|---|---|---|---|---|---|
| $S_2$ | −2267.589 | 0.000 | 8.099E−7 | −1.005E−11 | 3.288E−13 | −1.719E−16 |
| $S_4$ | 1301.160 | 0.000 | −2.232E−7 | −8.339E−11 | 6.789E−15 | 2.241E−18 |

In Comparison Example F, d/f (=2.43) exceeds the upper limit (2.4), which incurs strong coma and astigmatism and a decrease of convergence. Comparison Example F is suffering from the strong image curvature and bad fθ property. [Wavefront aberration in two-dimensional scanning region in the comparison examples]

Table 25 shows the root mean squares (RMS; $(<\Sigma\Delta_{ij}^2/N>)^{1/2}$) of wavefront aberration $\Delta_{ij}$ at four points in image plane of Comparison Examples A to F. Table 25 corresponds to Table 12 of the embodiments. The scanning region on the image plane is a square of 25 mm×25 mm. The scanning region contains the first quadrant (x≧0, y≧0), the second quadrant (x≦0, y≧0), the third quadrant (x≦0, y≦0) and the fourth quadrant (x≧0, y≦0). Since the RMSs are symmetric for all the four quadrants, Table 25 denotes only the RMS in the first quadrant (x≧0, y≧0). The inventor has calculated the wavefront aberration on all the points at which the microholes should be perforated. In short, Table 25 shows the wavefront aberration at typical four points: the origin (0,0), the end point (25,0) on the X-axis, the end point (0,25) on the Y-axis and the corner point (25,25) (end of the orthogonal line).

TABLE 25

RMS of wavefront aberration at typical points in the two-dimensional scanning region in the comparison examples (unit: λ)

| Comparison Example | (0, 0) | (25, 0) | (0, 25) | (25, 25) |
|---|---|---|---|---|
| A | 0.004 | 0.044 | 0.036 | 0.078 |
| B | 0.008 | 0.033 | 0.041 | 0.103 |
| C | 0.012 | 0.026 | 0.051 | 0.121 |
| D | 0.004 | 0.058 | 0.065 | 0.110 |
| E | 0.015 | 0.046 | 0.042 | 0.048 |
| F | 0.016 | 0.048 | 0.117 | 0.120 |

The RMS takes the minimum at the center (origin point; θ=0) of the image for all the comparison examples. Any comparison examples give the RMS which is smaller than λ/14 (0.0714 λ) at the origin. Since the wavelength is λ=10.6 μm and λ/14 is 0.7571 μm, all the comparison examples give less than 0.016 λ of the RMS of the wavefront aberration at the origin. An increase of swaying angle θ from the origin raises the wavefront aberration. The wavefront aberration exceeds λ/14 at the corners (25, 25) (ends of the orthogonal lines) for Comparison Examples A, B, C, D and F. The wavefront aberration surpasses λ/14 at (0, 25) in Comparison Example F. This invention requires the wavefront aberration to be less than λ/14 at all points in the image. The comparison examples cannot satisfy the requirements (a) to (c). Comparison Example E succeeds in suppressing the wavefront aberration at all points on the image below λ/14. But Comparison Example E is suffering from poor fθ property, too a short front working distance and too a short back working distance. The short distance between the lens and the image plane allows burning ash borne by the laser power to fly and adhere to the lens. The short front working distance forbids the fθ lens to allow the enough space to install two galvanomirrors.

[List of three conditions of the comparison examples] This invention requires three conditions for the embodiments;

$$f_2/f = -2.2 \text{ to } -0.3 \quad (-2.2 \leq f_2/f \leq -0.3) \quad (a)$$

$$f_3/f = 0.4 \text{ to } 0.9 \quad (0.4 \leq f_3/f \leq 0.9) \quad (b)$$

$$d/f = 1.8 \text{ to } 2.4 \quad (1.8 \leq d/f \leq 2.4). \quad (c)$$

All the comparison examples have a parameter deviating from the desired ranges. The parameters of the comparison examples are listed on Table 26 for understanding the relation of the parameters at a glimpse. Comparison of Table 26 and Table 13 denotes the differences between the embodiments and the comparison examples.

TABLE 26

Parameters of conditions (a) to (c) of the comparison examples

| Comparison Example | $f_2/f$ | $f_3/f$ | d/f |
|---|---|---|---|
| A | *−2.40 | 0.82 | 2.13 |
| B | *−0.26 | 0.47 | 2.08 |
| C | *−0.29 | *0.38 | 2.12 |
| D | −2.10 | *0.99 | 2.17 |
| E | −0.61 | 0.58 | *1.77 |
| F | −1.22 | 0.71 | *2.43 |

* denotes the values deviating from the requisites (a), (b) and (c).

What is claimed is:

1. An fθ lens for converging two-dimensionally scanning $CO_2$ laser or YAG laser infrared light beams and shooting an object with the converged beams for perforating a plurality of holes on the object, containing;
   a first lens group having an object-side convex positive lens;
   a second lens group having an object-side concave negative lens;
   a third lens group having a positive refractive power, the third lens group being a single positive lens, an assembly of a positive lens and a negative lens or another assembly of a positive lens and another positive lens;
   the lenses being made of a material of a refractive index higher than two and;
   a root mean square (RMS) of wavefront aberration being less than a fourteenth of a wavelength λ(λ/14) at all points on an image plane.

2. An fθ lens as claimed in claim 1, wherein the lens is made of zinc selenide (ZnSe) or germanium (Ge).

3. An fθ lens as claimed in claim 2, wherein at least one lens is aspherical.

4. An fθ lens as claimed in claim 2, satisfying a condition of $$-2.2 \leq f_2/f \leq -0.3,$$

where $f_2$ is a focal length of the second lens group and f is a focal length of whole lens system.

5. An fθ lens as claimed in claim 4, satisfying another condition of $$0.4 \leq f_3/f \leq 0.9$$

where $f_3$ is a focal length of the third group.

6. An fθ lens as claimed in claim 5, satisfying a further condition of $$1.8 \leq d/f \leq 2.4,$$

where d is a distance from a front focus to an image plane.

7. An fθ lens as claimed in claim 6, wherein tolerance of telecentric error is less than six degrees.

* * * * *